United States Patent
Babaei

(10) Patent No.: US 12,069,721 B2
(45) Date of Patent: *Aug. 20, 2024

(54) SCHEDULING REQUEST AND CONSISTENT LBT FAILURE RECOVERY

(71) Applicant: Apex Beam Technologies LLC, Marshall, TX (US)

(72) Inventor: Alireza Babaei, Fairfax, VA (US)

(*) Notice: Subject to any disclaimer, the term of this patent is extended or adjusted under 35 U.S.C. 154(b) by 477 days.

This patent is subject to a terminal disclaimer.

(21) Appl. No.: 17/384,842

(22) Filed: Jul. 26, 2021

(65) Prior Publication Data

US 2021/0352720 A1    Nov. 11, 2021

Related U.S. Application Data

(63) Continuation of application No. 17/200,983, filed on Mar. 15, 2021, now Pat. No. 11,109,412, which is a continuation of application No. 17/105,597, filed on Nov. 26, 2020, now Pat. No. 10,980,059.

(60) Provisional application No. 62/942,188, filed on Dec. 1, 2019.

(51) Int. Cl.
| | |
|---|---|
| *H04W 74/0808* | (2024.01) |
| *H04W 76/11* | (2018.01) |
| *H04W 76/19* | (2018.01) |
| *H04W 80/02* | (2009.01) |

(52) U.S. Cl.
CPC ........ *H04W 74/0808* (2013.01); *H04W 76/11* (2018.02); *H04W 76/19* (2018.02); *H04W 80/02* (2013.01)

(58) Field of Classification Search
CPC . H04W 74/0808; H04W 76/19; H04W 76/11; H04W 80/02
See application file for complete search history.

(56) References Cited

U.S. PATENT DOCUMENTS

| | | | |
|---|---|---|---|
| 2012/0142336 A1 | 6/2012 | Van Phan et al. | |
| 2016/0233989 A1* | 8/2016 | Belghoul | ................ H04L 5/001 |
| 2018/0279340 A1 | 9/2018 | Skordeman et al. | |
| 2019/0208429 A1* | 7/2019 | Hong | ...................... H04L 5/001 |
| 2020/0107335 A1 | 4/2020 | Xue et al. | |
| 2020/0221495 A1* | 7/2020 | Chen | ............... H04W 36/00835 |

(Continued)

OTHER PUBLICATIONS

3GPP TS 38.211 V15.7.0 (Sep. 2019); Technical Specification; 3rd Generation Partnership Project; Technical Specification Group Radio Access Network; NR; Physical channels and modulation; (Release 15).

(Continued)

*Primary Examiner* — Siren Wei

(57) ABSTRACT

A wireless device may receive configuration parameters of a plurality of cells and a SR configuration. The SR configuration may be associated with recovery from consistent LBT failure. The SR configuration may be for requesting resources on one or more first cells of the plurality of cells and excluding resources on other cells of the plurality of cells. No resources on one or more cells for which the consistent LBT failure is not triggered may be available for transmission of an LBT failure control element. The wireless device may transmit a SR based on the SR configuration. The wireless device may receive an uplink grant for a first cell of the one or more first cells. The wireless device may transmit the LBT failure control element based on the uplink grant.

18 Claims, 45 Drawing Sheets

(56) References Cited

U.S. PATENT DOCUMENTS

| | | | | |
|---|---|---|---|---|
| 2021/0007146 | A1* | 1/2021 | Agiwal | H04W 74/0833 |
| 2022/0110159 | A1* | 4/2022 | Shi | H04W 72/044 |
| 2022/0400396 | A1* | 12/2022 | Alfarhan | H04W 74/0808 |

OTHER PUBLICATIONS

3GPP TS 38.212 V15.7.0 (Sep. 2019); Technical Specification; 3rd Generation Partnership Project; Technical Specification Group Radio Access Network; NR; Multiplexing and channel coding; (Release 15).

3GPP TS 38.213 V15.7.0 (Sep. 2019); Technical Specification; 3rd Generation Partnership Project; Technical Specification Group Radio Access Network; NR; Physical layer procedures for control; (Release 15).

3GPP TS 38.214 V15.7.0 (Sep. 2019); Technical Specification; 3rd Generation Partnership Project; Technical Specification Group Radio Access Network; NR; Physical layer procedures for data; (Release 15).

3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).

3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).

3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).

3GPP TSG-RAN WG2 Meeting #108; R2-1916371; Reno, NV, USA, Nov. 18-22, 2019; Title: Draft LS on consistent Uplink LBT failure detection indication mechanism; Release: Rel-16; Work Item: NR_unlic-Core; Source: Qualcomm [To be RAN2]; To: RAN1.

3GPP TSG-Ran WG2 Meeting #107bis; R2-1912095; Chongqing, China, Oct. 14-18, 2019; Agenda Item: 6.2.2.2; Source: OPPO; Title: Remaining issues of detecting uplink LBT failure in NR-U; Document for: Discussion, Decision.

3GPP TSG-RAN WG2 Meeting #107bis; R2-1912096; Chongqing, China, Oct. 14-18, 2019; Agenda Item: 6.2.2.2; Source: OPPO; Title: Uplink LBT failure recovery for NR-U; Document for: Discussion, Decision.

3GPP TSG-RAN WG2 Meeting #107bis; R2-1912177; Chongqing, China, Oct. 14-18, 2019; Source: vivo; Title: Remaining issues of uplink LBT failure; Agenda Item: 6.2.1.2; Document for: Discussion and Decision.

3GPP TSG-RAN2#107bis; R2-1912304; Chongqing, China, Oct. 14-18, 2019; Agenda item: 6.2.1.4; Source: Qualcomm Incorporated; Title: Details of the Uplink LBT failure mechanism; Document for: Discussion/Decision.

3GPP TSG-RAN WG2 107bis; R2-1912625; Chongqing, China, Oct. 14-18, 2019; Agenda Item: 6.2.1.2; Source: Intel Corporation; Title: Detecting and Handling of UL LBT failures; Document for: Discussion and Decision.

3GPP RAN WG2 Meeting #107bis; R2-1912889; Chongqing, China, Oct. 14-18, 2019; Revision of R2-1909604 Agenda Item: 6.2.2.2; Source: InterDigital; Title: Handling UL LBT Failures in MAC; Document for: Discussion, Decision.

3GPP TSG-RAN WG2 Meeting #107bis; R2-1912988; Chongqing, China, Oct. 14-18, 2019; Agenda item: 11.2.2.1; Source: Nokia, Nokia Shanghai Bell; Title: Consecutive failed connection attempts; WID/SID: NR_unlic-Core—Release 16; Document for: Discussion and Decision.

3GPP TSG-RAN WG2 Meeting #107bis; R2-1913260; Chongqing, China, Oct. 14-18, 2019; Agenda Item: 6.2.2.2; Source: MediaTek Inc.; Title: On consistent LBT failures; Document for: Discussion and decision.

3GPP TSG-RAN WG2 Meeting #107bis; R2-1913287; Chongqing, China, Oct. 14-18, 2019; Agenda item: 6.2.2.2; Source: Nokia, Nokia Shanghai Bell; Title: Remaining issues on UL LBT; WID/SID: NR_unlic-Core—Release 16; Document for: Discussion and Decision.

3GPP TSG-RAN WG2 Meeting #107bis; R2-1913649; Chongqing, China, Oct. 14-18, 2019; Agenda item: 6.2.2.2; Source: Charter Communications; Title: Remaining Issues on Consistent LBT Failure Detection in NRU; WID/SID: NR-U WID—Release 16; Document for: Discussion and Decision.

3GPP TSG-RAN WG2 Meeting #107-Bis; R2-1913913; Chongqing, China, Oct. 14-18, 2019; Agenda Item: 6.2.2.2; Source: ETRI; Title: Further considerations on handling UL LBT failures; Document for: Discussion and Decision.

3GPP RAN WG2 Meeting #107bis; R2-1914054; Chongqing, China, Oct. 14-18, 2019; Agenda Item: 6.2.2.2; Source: InterDigital; Title: Report of offline 504: Summary of discussion on UL LBT Failure; Document for: Discussion, Decision.

3GPP TSG-RAN WG2 meeting #108; R2-1914301; Agenda Item: 2.2; Source: ETSI MCC; Title: Report of 3GPP TSG RAN2#107bis meeting, Chongqing, China; Document for: Approval; Report of 3GPP TSG RAN WG2 meeting #107bis; Chongqing, China; Oct. 14-18, 2019.

3GPP TSG-RAN WG2 Meeting #108; R2-1914367; Reno, USA, Nov. 18-22, 2019; Source: vivo; Title: Remaining issues on uplink LBT failure; Agenda Item: 6.2.2.2; Document for: Discussion and Decision.

3GPP TSG-RAN WG2 Meeting #108; R2-1914400; Reno, USA, Nov. 18-22, 2019; Agenda Item: 6.2.2.2; Source: OPPO; Title: Remaining issues of consistent UL LBT failure; Document for: Discussion, Decision.

3GPP TSG-RAN WG2 108; R2-1914572; Reno, USA, Nov. 18-22, 2019; Agenda Item: 6.2.2.2; Source: Intel Corporation; Title: Handling of UL LBT failures; Document for: Discussion and Decision.

3GPP TSG RAN WG2 NR #108 Meeting; R2-1914791; Reno, USA, Nov. 18-22, 2019; Agenda Item: 6.2.2.2; Source: ZTE Corporation, Sanechips; Title: LBT failure report on SCell; Document for: Discussion and Decision.

3GPP TSG-RAN WG2 Meeting #108; R2-1914864; Reno, NV, USA, Nov. 18-22, 2019; Title: Draft LS on Uplink LBT failure indication; Release: Rel-16; Work Item: NR_unlic-Core; Source: Qualcomm [To be RAN2]; To: RAN1.

3GPP RAN WG2 Meeting #108; R2-191xxxx; Reno, U.S.A, Nov. 18-22, 2019; Agenda Item: 6.2.2.2; Source: InterDigital; Title: Handling UL LBT Failures in MAC; Document for: Discussion, Decision.

3GPP TSG-RAN WG2 Meeting 108; R2-1915141; Reno, USA, Nov. 18- 22, 2019; Agenda Item: 6.2.2.2; Source: Huawei, HiSilicon; Title: Handling of UL LBT failure; Document for: Discussion, Decision.

3GPP TSG-RAN WG2 Meeting #108; R2-1915177; Reno, USA, Nov. 18-22, 2019; Source: Panasonic; Title: Remaining issue on detecting UL LBT Failures; Agenda Item: 6.2.2.2; Document for: Discussion and Decision.

3GPP TSG-RAN WG2 Meeting #108; R2-1915197; Reno, USA, Nov. 18-22, 2019; Agenda item: 6.2.2.2; Source: CMCC; Title: Details on determining consistent LBT failure of a BWP; Document for: Discussion.

3GPP TSG-RAN WG2 Meeting #108; R2-1915544; Reno, USA, Nov. 18-22, 2019; Revision of R2-1913260; Agenda Item: 6.2.2.2; Source: MediaTek Inc.; Title: Remaining issues on consistent LBT failures; Document for: Discussion and decision.

3GPP TSG-RAN WG2 Meeting #108 Tdoc; R2-1915870; Reno, U.S., Nov. 18-22, 2019; Agenda Item: 6.2.2.2; Source: Ericsson; Title: Handling consistent UL LBT failures; Document for: Discussion, Decision.

3GPP TSG-RAN WG2 Meeting #108; R2-1915885; Reno, USA, Nov. 18-22, 2019; update of R2-1913287; Agenda item: 6.2.2.2; Source: Nokia, Nokia Shanghai Bell, InterDigital, MediaTek, OPPO; Title: UL LBT failure Detection; WID/SID: NR_unlic-Core—Release 16; Document for: Discussion and Decision.

3GPP TSG-RAN WG2 Meeting #108; R2-1915886; Reno, USA, Nov. 18-22, 2019; Agenda item: 6.2.2.2; Source: Nokia, Nokia

(56) References Cited

OTHER PUBLICATIONS

Shanghai Bell; Title: UL LBT failure report; WID/SID: LTE_NR_DC_CA_enh-Core—Release 16; Document for: Discussion and Decision.

* cited by examiner

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |
| For $p = 3, 4$, $T_{ulmcot,p} = 10$ms if the higher layer parameter absenceOfAnyOtherTechnology-r14 or absenceOfAnyOtherTechnology-r16 may be provided, otherwise, $T_{ulmcot,p} = 6$ms. ||||||
| When $T_{ulmcot,p} = 6$ms it may be increased to 8 ms by inserting one or more gaps. The minimum duration of a gap may be 100 μs. The maximum duration before including any such gap may be 6 ms. ||||||

FIG. 16

SCHEDULING REQUEST AND CONSISTENT LBT FAILURE RECOVERY

CROSS-REFERENCE TO RELATED APPLICATIONS

This application is a continuation of U.S. application Ser. No. 17/200,983, filed Mar. 15, 2021, which is a continuation of U.S. patent application Ser. No. 17/105,597, filed Nov. 26, 2020, which claims the benefit of claims the benefit of U.S. Provisional Application No. 62/942,188, filed Dec. 1, 2019, which is hereby incorporated by reference in its entirety.

BRIEF DESCRIPTION OF THE DRAWINGS

FIG. 16 shows example channel access parameters for listen before talk in accordance with several of various embodiments of the present disclosure.

DETAILED DESCRIPTION

The exemplary embodiments of the disclosed technology enable operation of a wireless device and/or one or more base stations in unlicensed or shared spectrum. The exemplary disclosed embodiments may be implemented in the technical field of wireless communication systems. More particularly, the embodiment of the disclosed technology may relate to recovery from consistent uplink listen-before-talk (LBT) failure.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
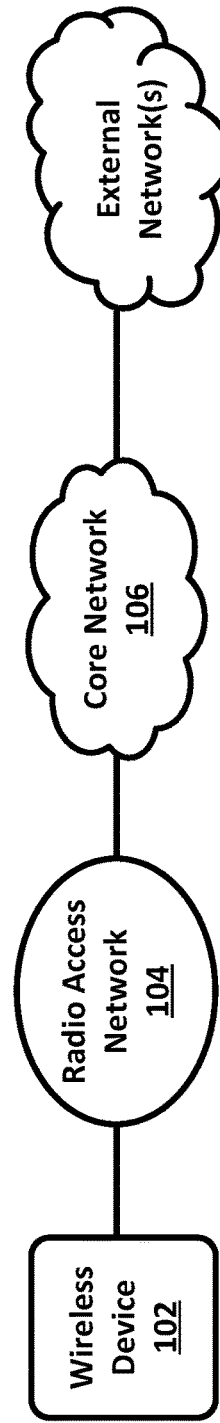
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
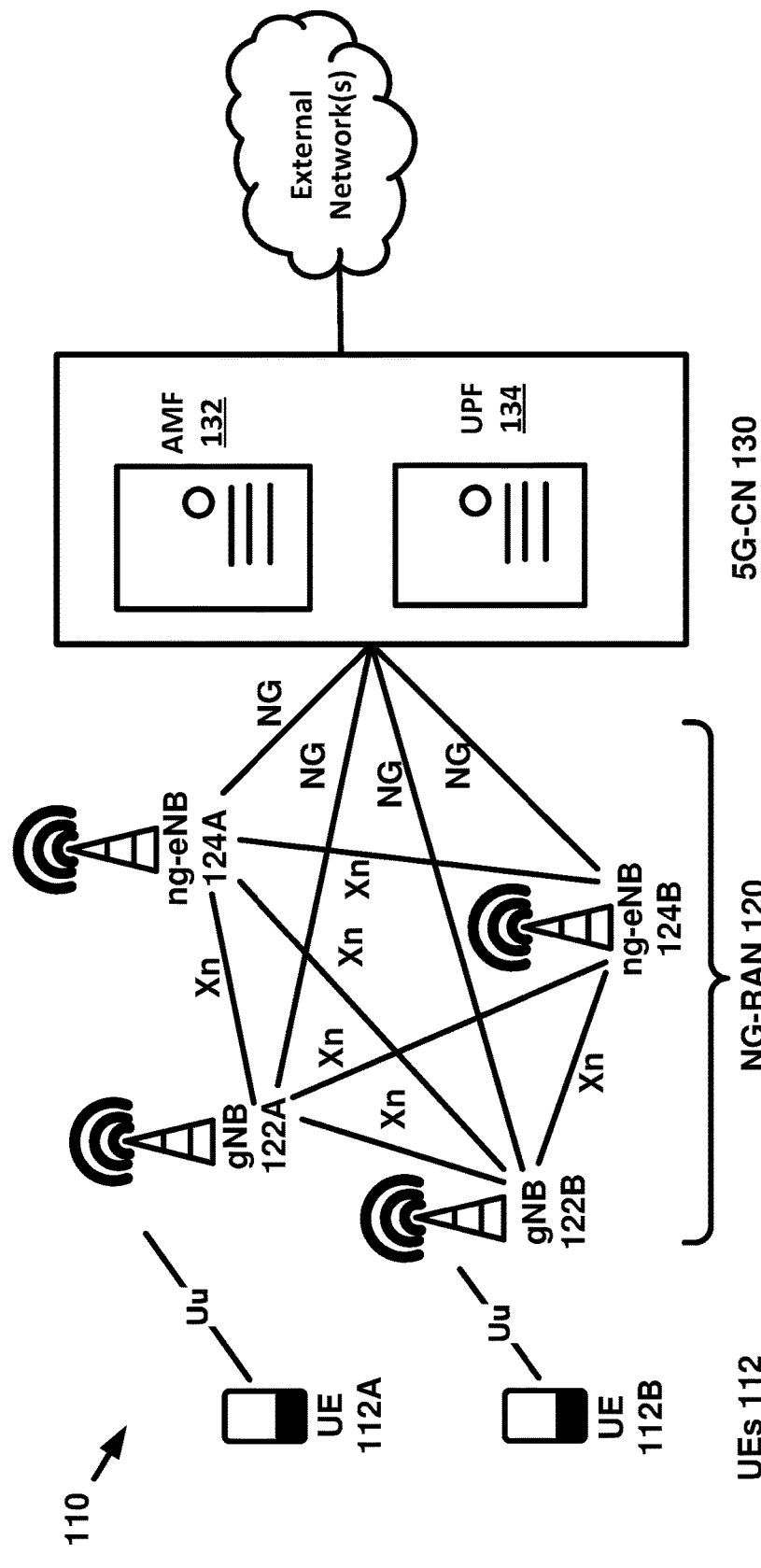

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
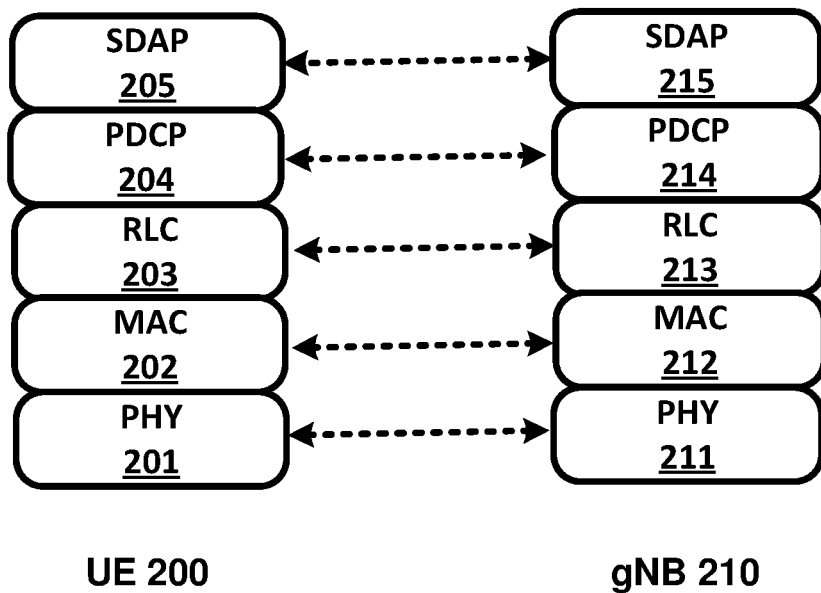
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
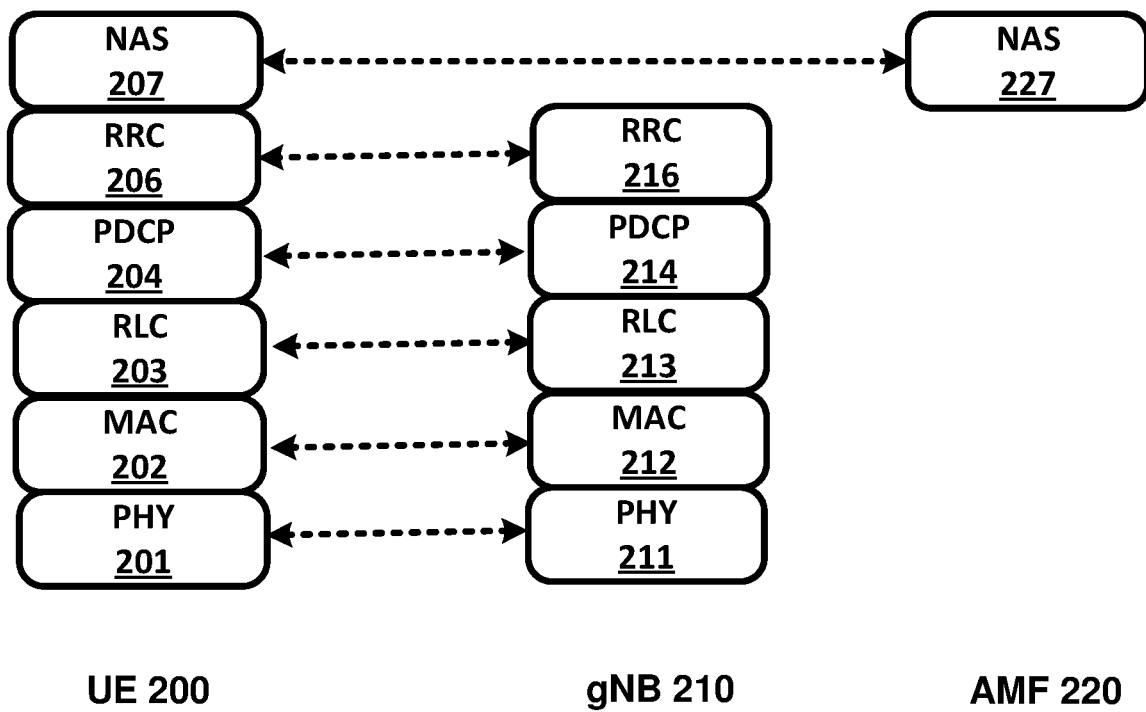

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
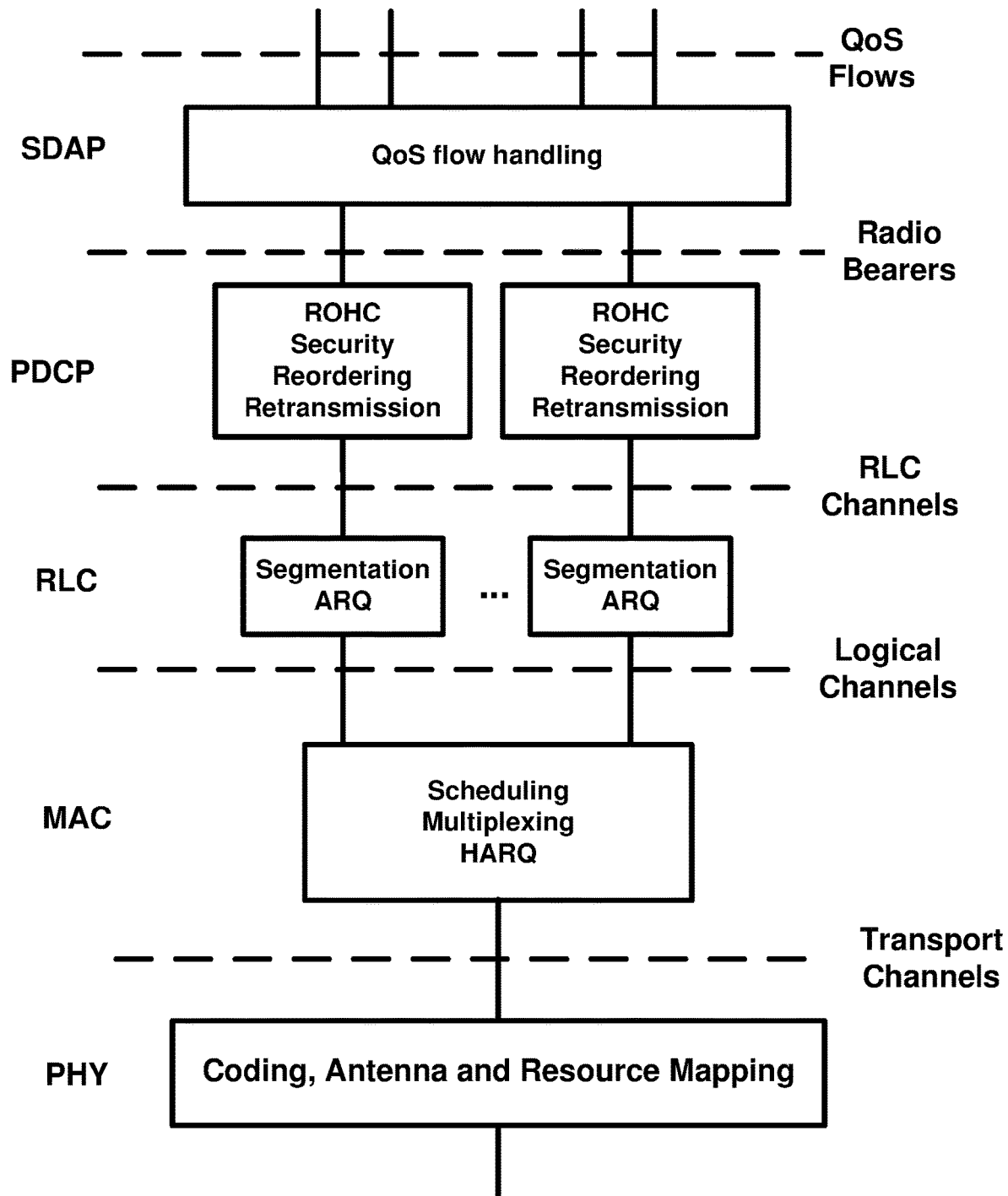
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARM), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
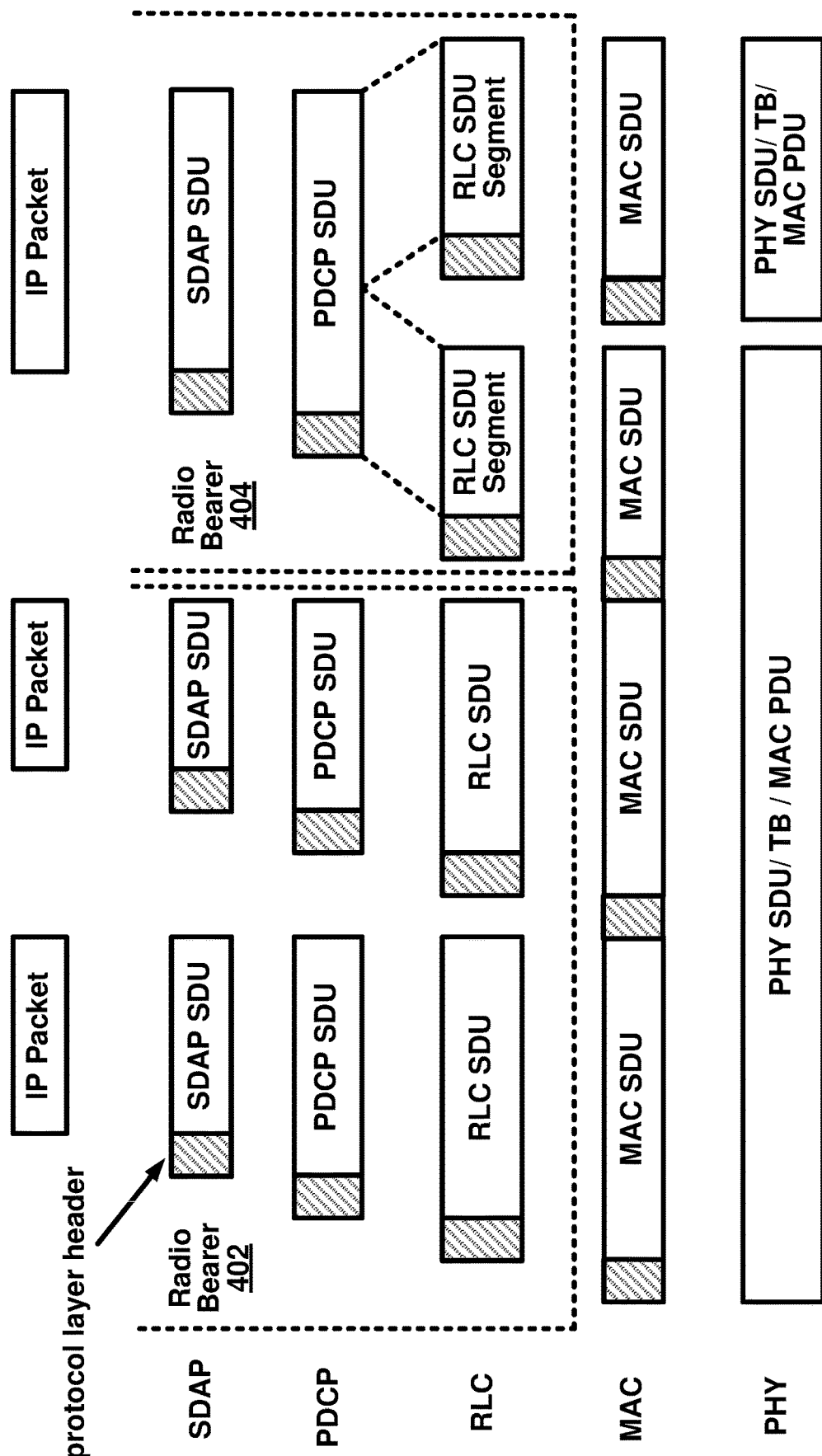
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
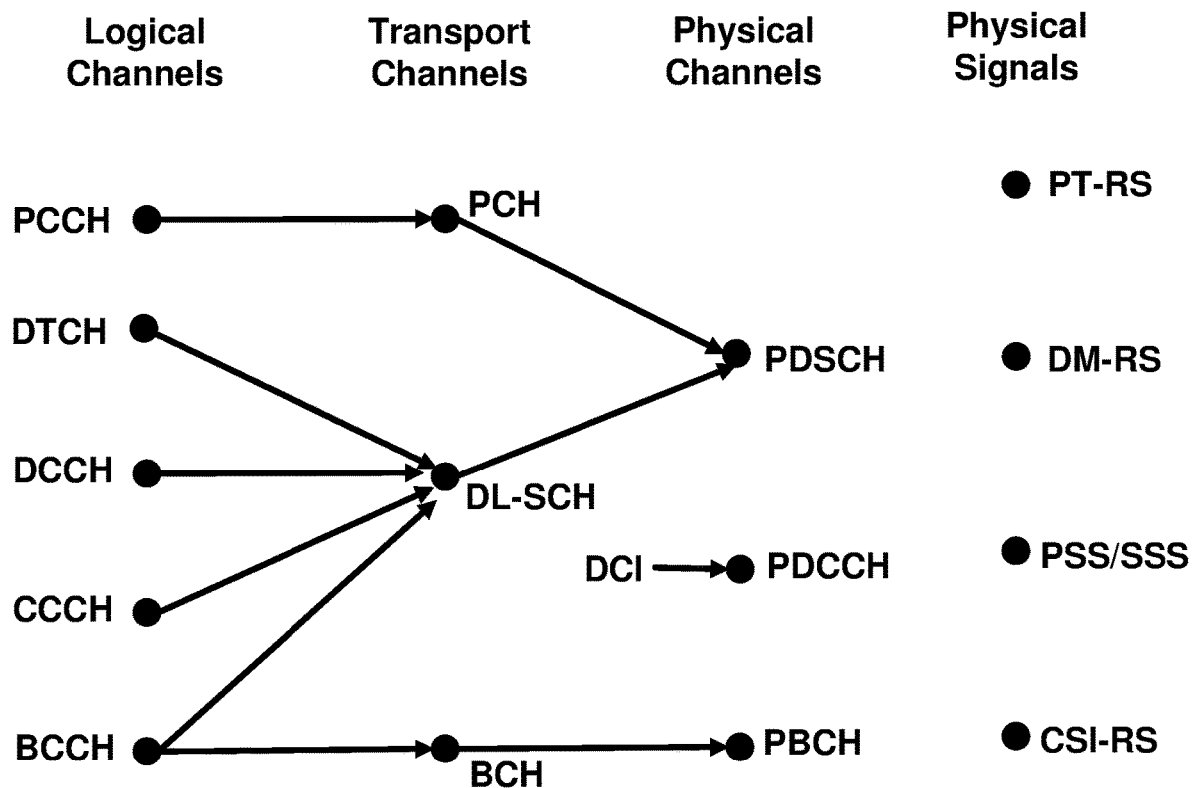
FIG. 5A shows example mapping of channels between layers of the protocol stack and different physical signals in downlink in accordance with several of various embodiments of the present disclosure.
Figure 5B:
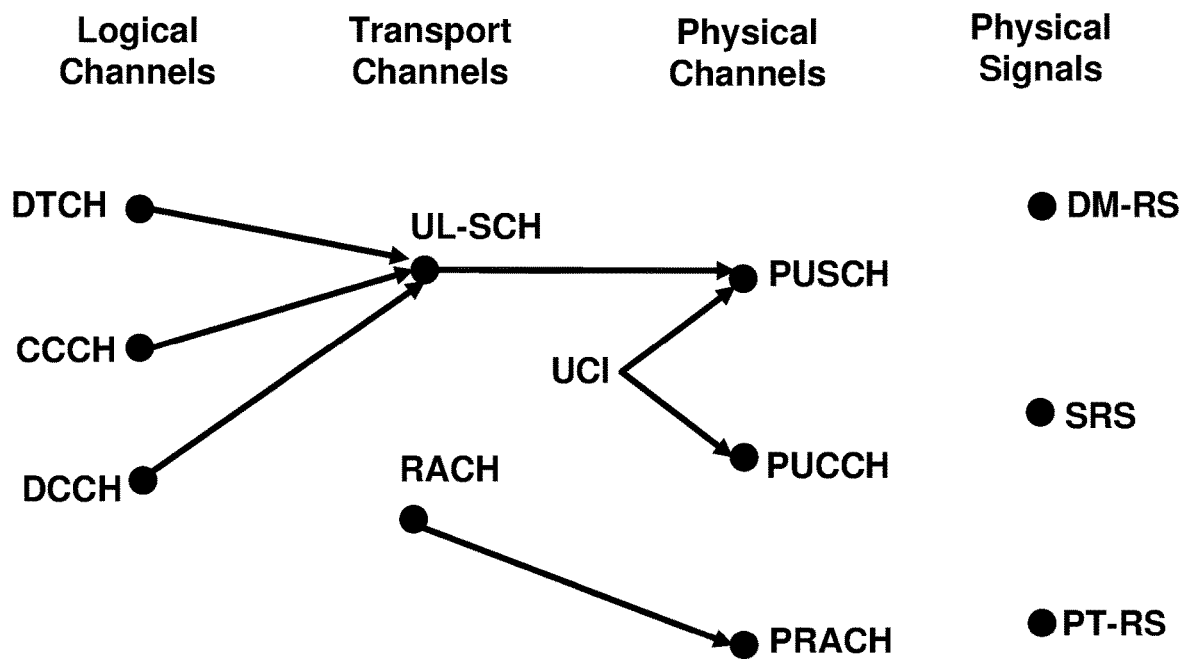
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
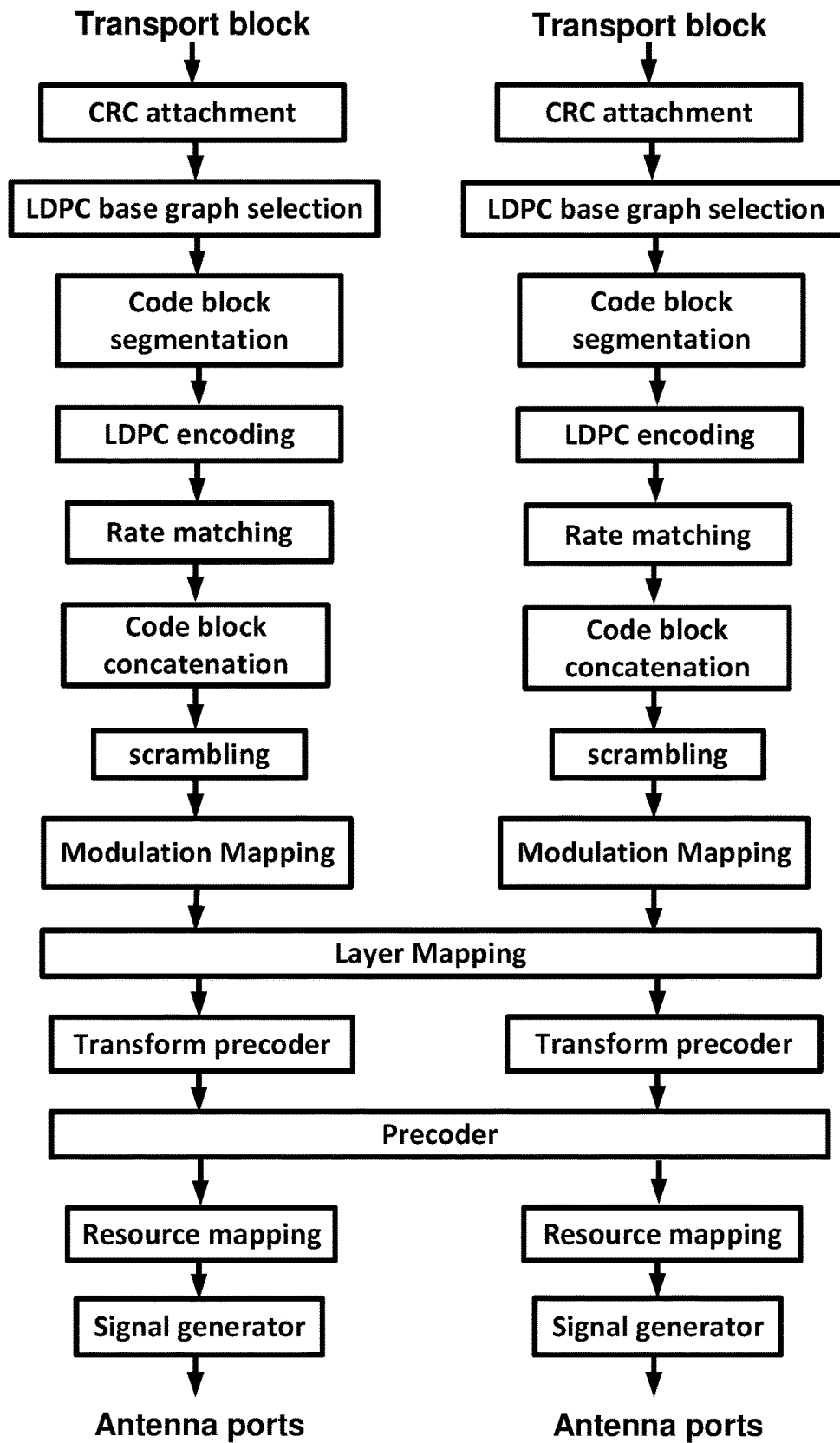
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
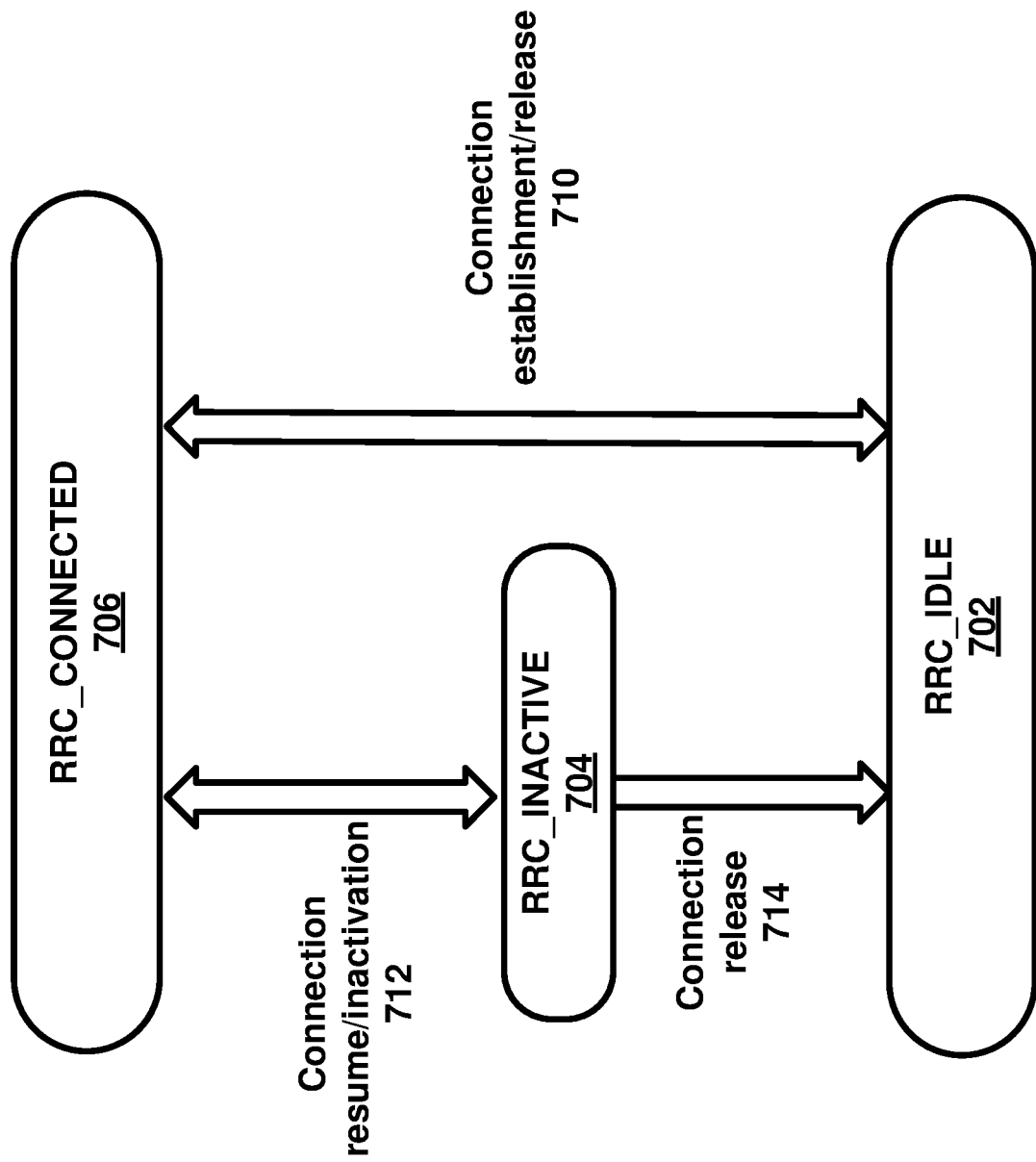
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu$=0, 1, 2, ...). Example subcarrier spacings used in NR include 15 KHz ($\mu$=0), 30 KHz ($\mu$=1), 60 KHz ($\mu$=2), 120 KHz ($\mu$=3) and 240 KHz ($\mu$=4). As discussed before, a duration of OFDM symbol is inversely proportional to the subcarrier spacing and therefor OFDM symbol duration may depend on the numerology (e.g. the μ value).

Figure 8:
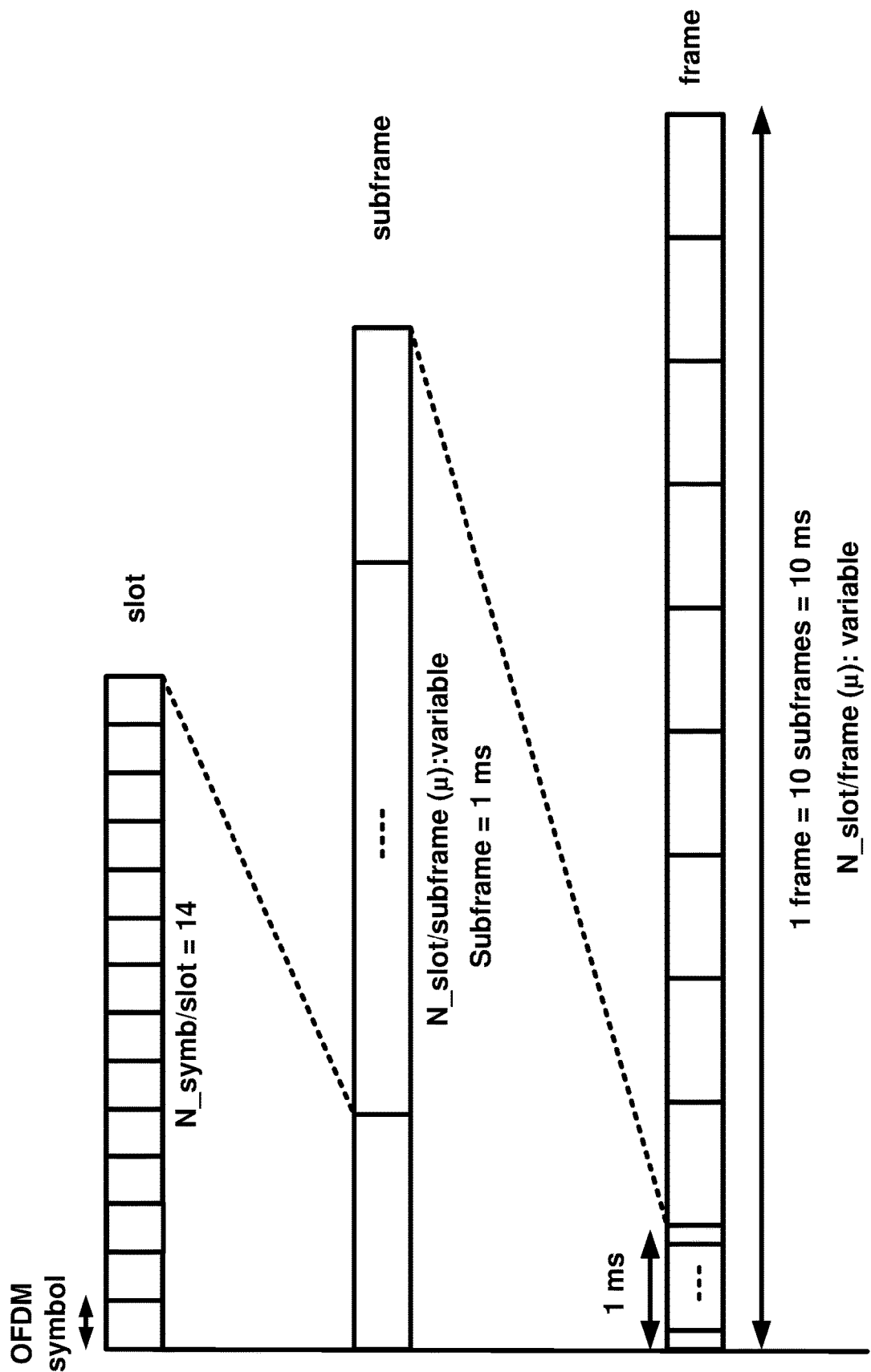
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
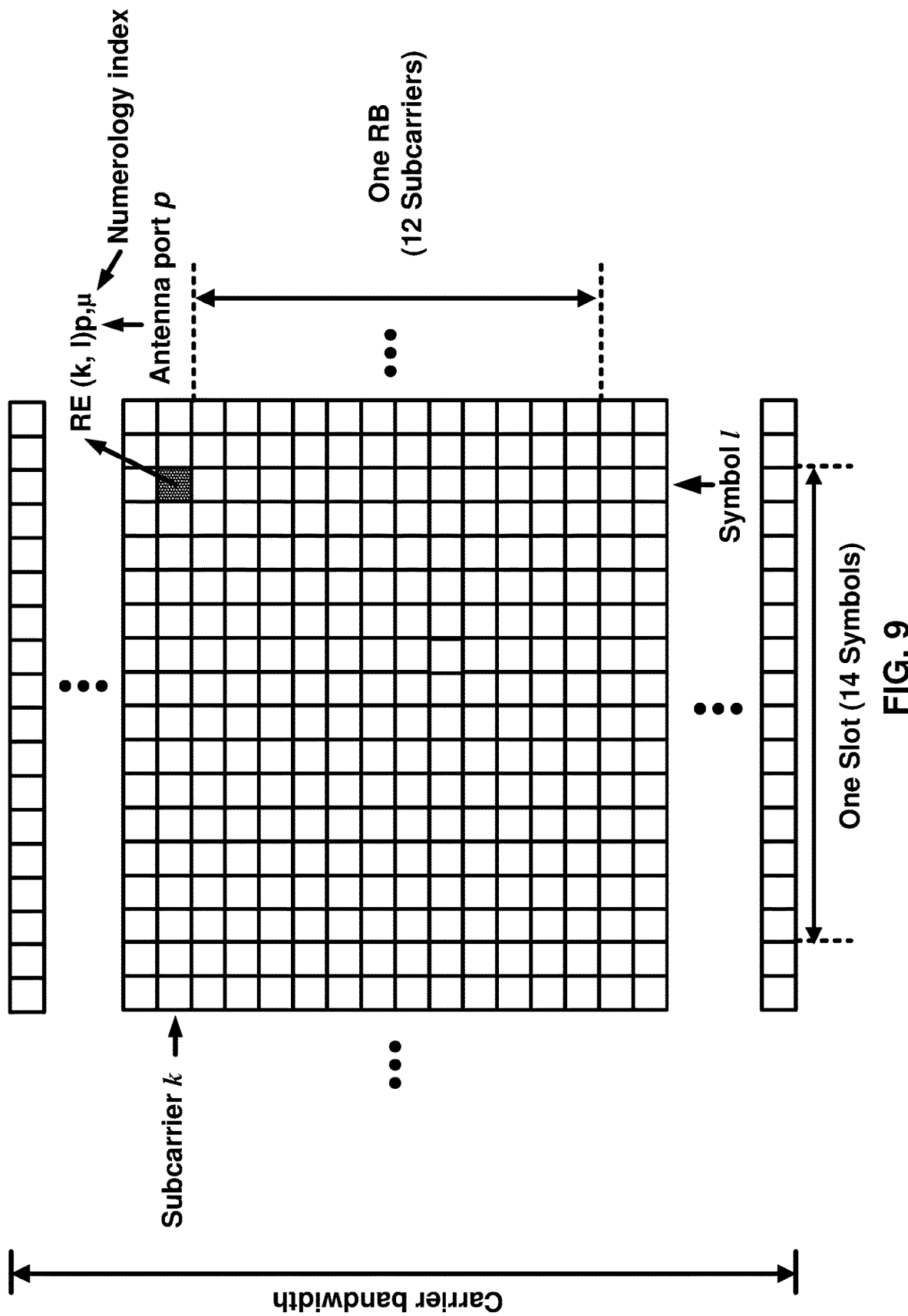
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k, l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g. shrink during period of low activity to save power); the location of the transmit and/or receive bandwidth may move in the frequency domain (e.g. to increase scheduling flexibility); and the subcarrier spacing of the transmit or receive bandwidth may change (e.g. to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
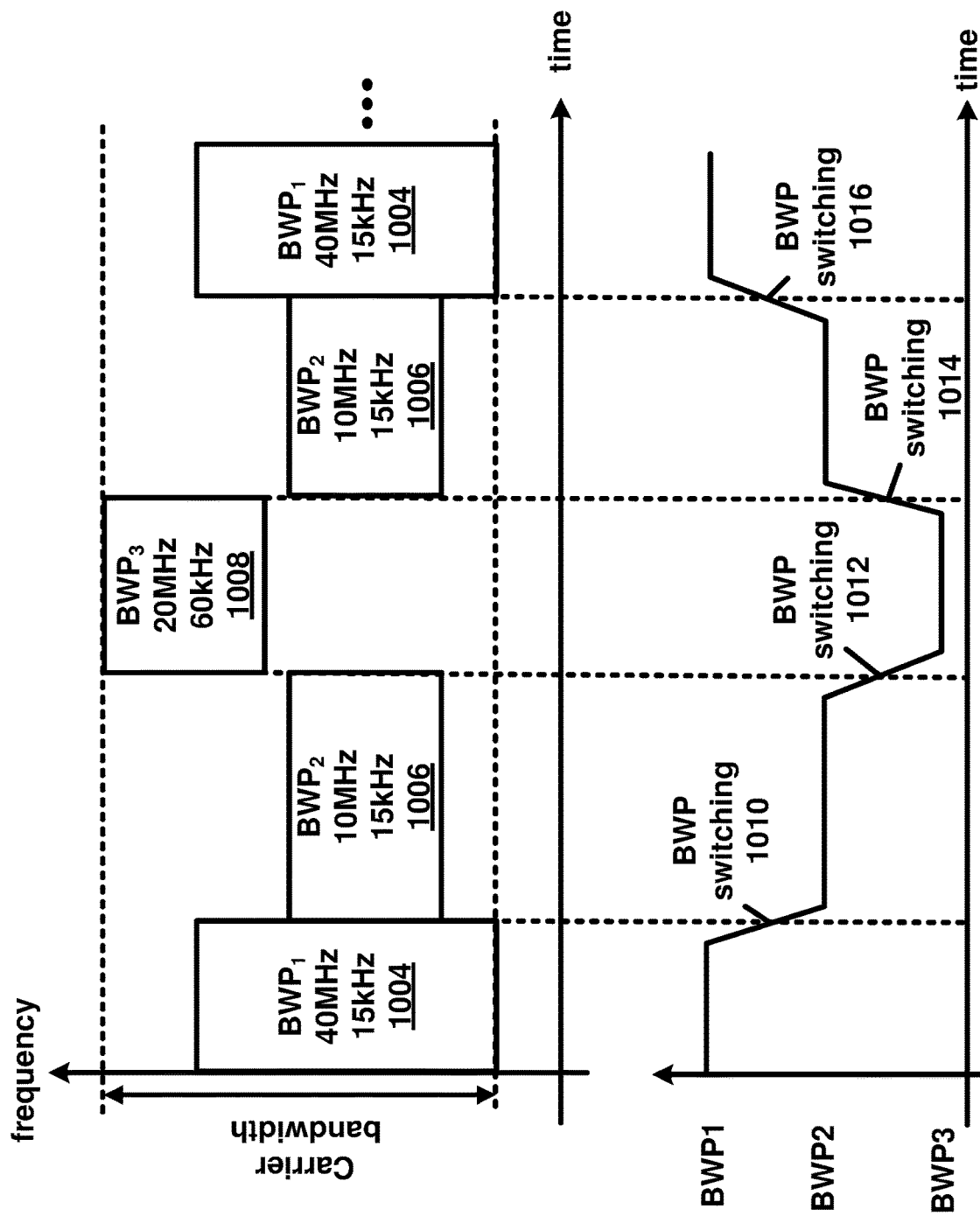
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
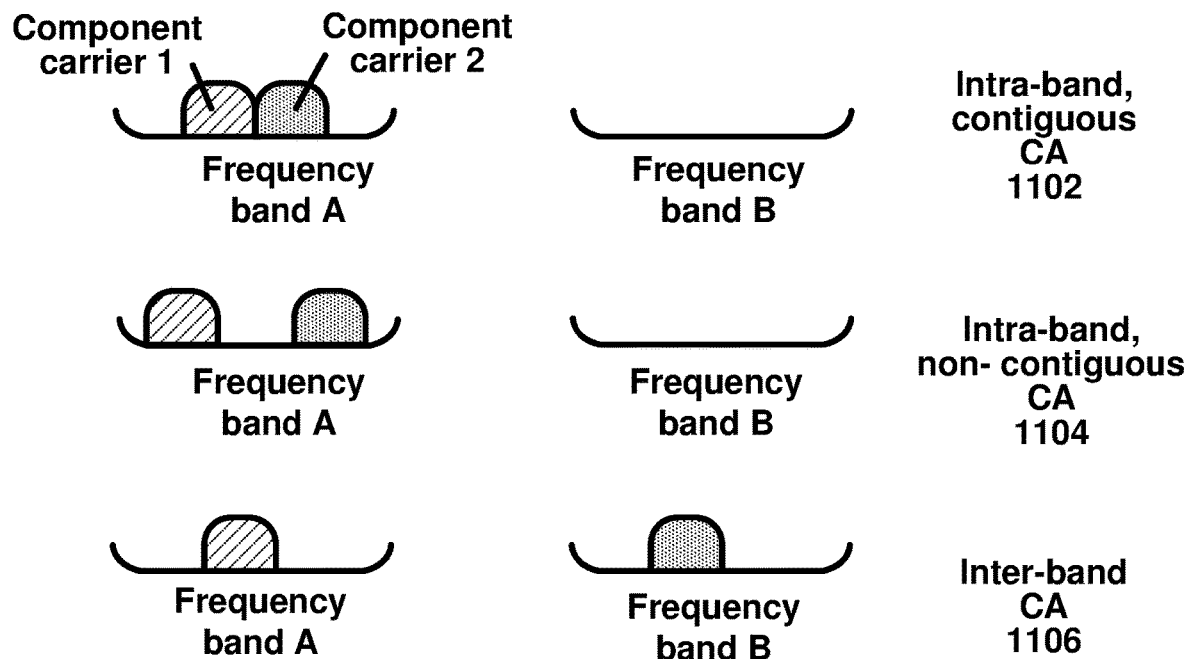
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
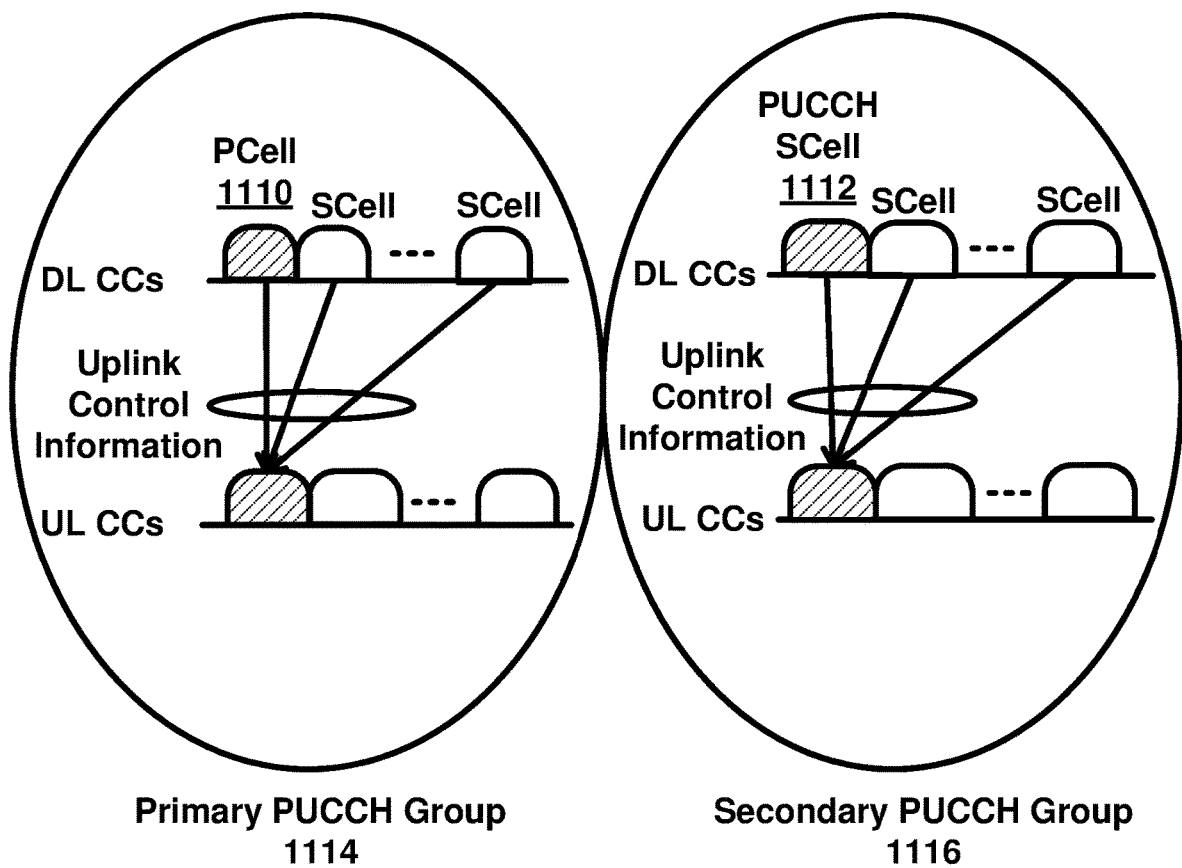
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
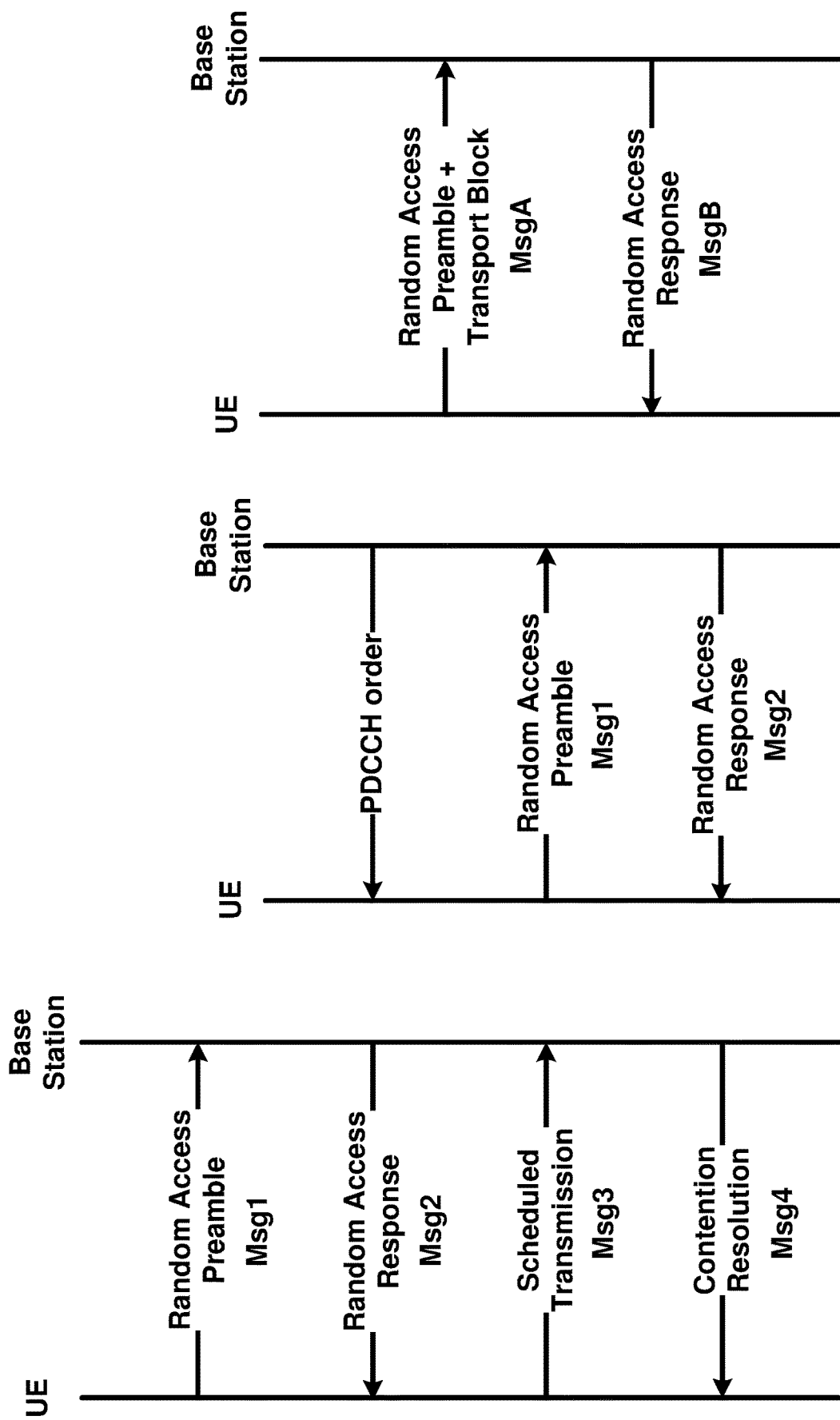
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
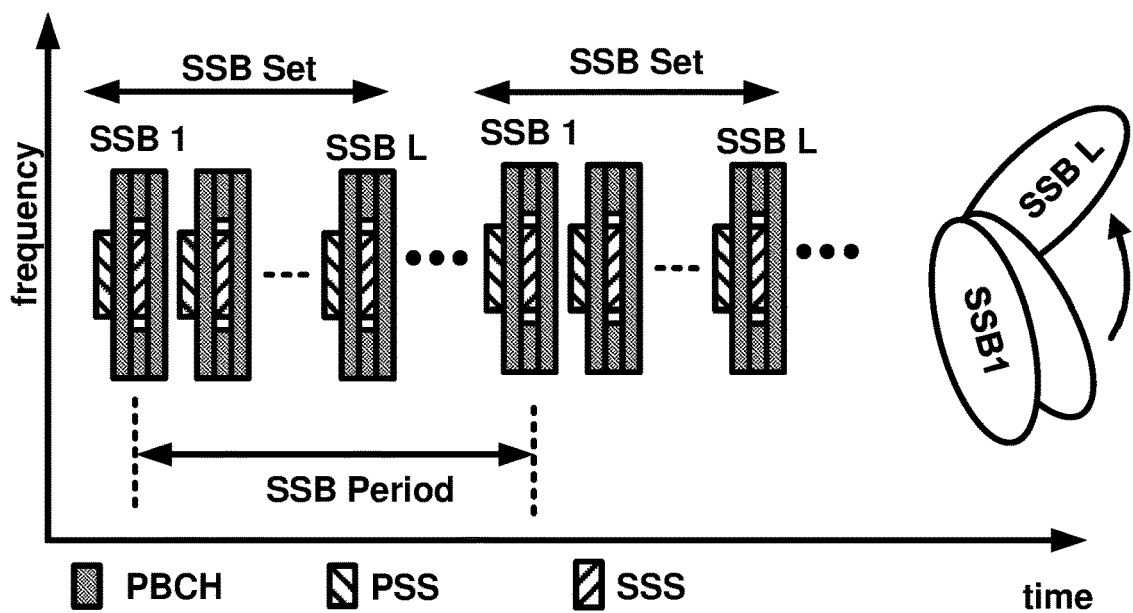
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
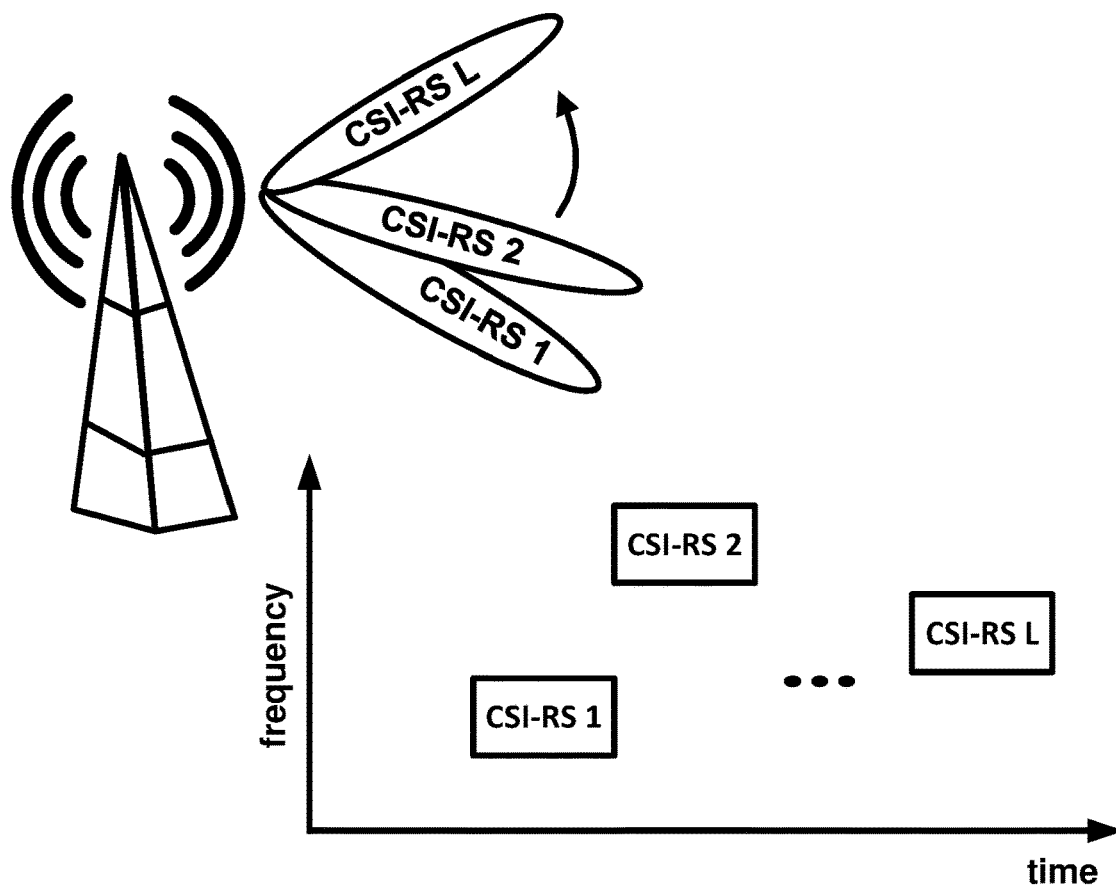
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
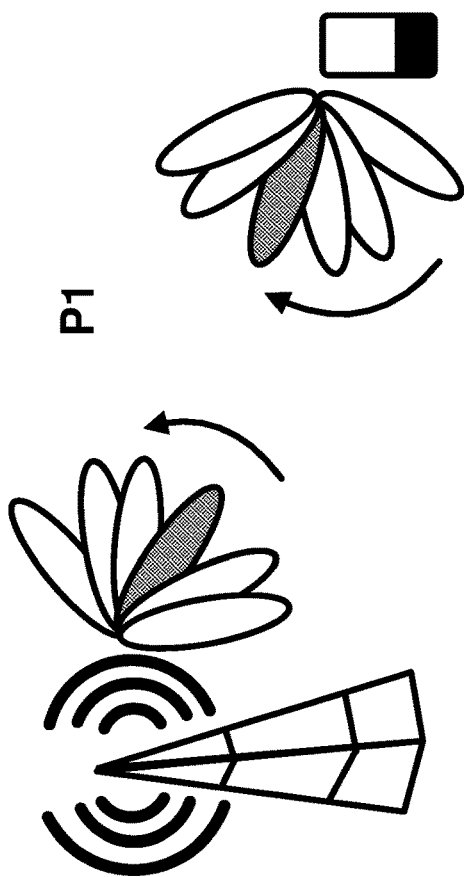
FIG. 14A, FIG. 14B and FIG. 14C show example beam management processes in accordance with several of various embodiments of the present disclosure.
Figure 14C:
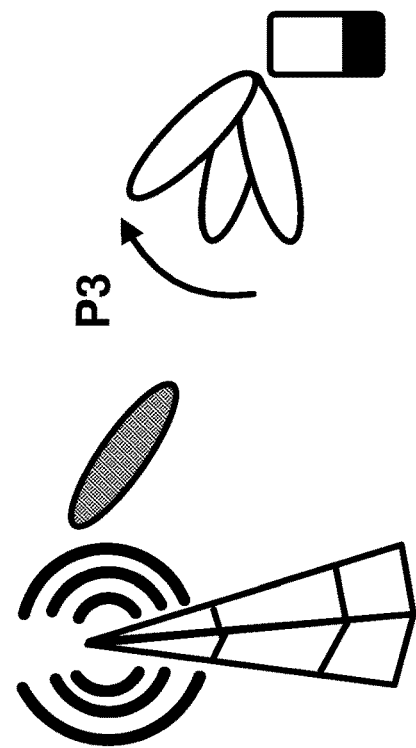
Figure 14B:
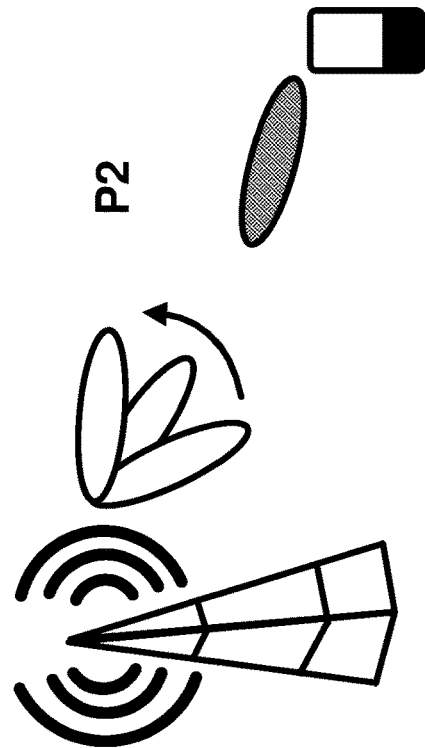

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configuring different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
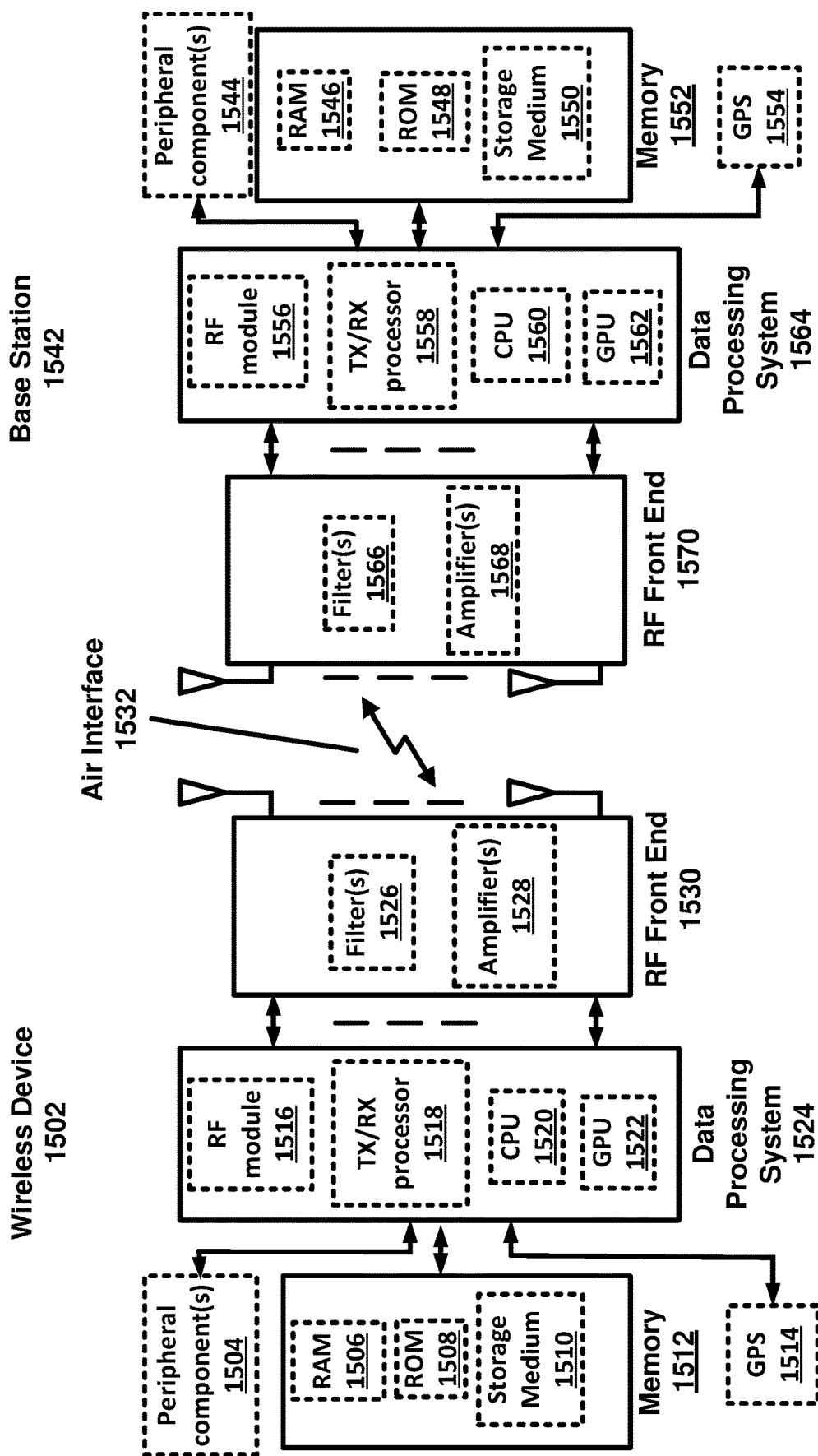
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System1524 at the wireless device 1502 and Data Processing System1564 at the base station 1542), Memory (e.g., Memory 1512 at the wireless device 1502 and Memory 1542 at the base station1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System1524 and/or the Data Processing System1564. One or more processes described in the present disclosure may be implemented by the Data Processing System1524 and/or the Data Processing System1564. A Data Processing System may include an RF module (RF module 1516 at the Data Processing System1524 and RF module 1556 at the Data Processing System1564) and/or a TX/RX processor (e.g., TX/RX processor 1518 at the Data Processing System1524 and TX/RX processor 1558 at the Data Processing System1566) and/or a central processing unit (CPU) (e.g., CPU 1520 at the Data Processing System1524 and CPU 1560 at the Data Processing System1564) and/or a graphical processing unit (GPU) (e.g., GPU 1522 at the Data Processing System1524 and GPU 1562 at the Data Processing System1564).

The Memory 1512 may have interfaces with the Data Processing System 1524 and the Memory 1552 may have interfaces with Data Processing System1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System1524 and Data Processing System1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System1524 and/or the Data Processing System1564 may be connected to other components such as a GPS module 1514 and a GPS module 1554, respectively, wherein the GPS module 1514 and a GPS module 1554 may enable delivery of location information of the wireless device 1502 to the Data Processing System1524 and location information of the base station 1542 to the Data Processing System1564. One or more other peripheral components (e.g., Peripheral Component(s) 1504 or Peripheral Component(s) 1544) may be configured and connected to the data Processing System1524 and data Processing System1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

The amount of licensed spectrum available for an operator to meet the demands may not be sufficient and obtaining licensed spectrum may be costly. Unlicensed spectrum is freely available subject to a set of rules, for example rules on maximum transmission power. Since the unlicensed spectrum is freely available, the interference situation may be more unpredictable compared to licensed spectrum. Achieving quality-of-service may be more challenging in unlicensed spectrum. WLANs and Bluetooth are examples of communication systems exploiting unlicensed spectrum in the lower-frequency range, e.g., 2.4 GHz or 5 GHz.

Some of the frequency bands used by an NR communications system may be unlicensed (e.g., in lower and/or higher frequency bands). Different deployment scenarios may be used in example embodiments. Example deployment scenarios include: carrier aggregation between licensed band NR (for example for PCell) and unlicensed band NR (NR-U) (for example for SCell), wherein NR-U SCell may have both DL and UL or may be DL-only; dual connectivity between licensed band LTE (e.g., PCell) and NR-U (e.g., PSCell); standalone NR-U, wherein PCell and SCell may be both in unlicensed bands; an NR cell with DL in unlicensed band and UL in licensed band; and dual connectivity between licensed band NR (e.g., PCell) and NR-U (e.g., PSCell).

In an example, the licensed spectrum may be used to provide wide-area coverage and quality-of-service guarantees, with unlicensed spectrum used as a local-area complement to increase user data rates and overall capacity without compromising on overall coverage, availability, and reliability. This may be referred to as License-Assisted Access (LAA).

In an example, to enable fair sharing of unlicensed spectra with other operators and/or systems (e.g., Wi-Fi), several mechanisms may be used in example embodiments. Example mechanisms may include dynamic frequency selection (DFS), where a network node may search and find a part of the unlicensed spectrum with low load. Example embodiments may employ listen-before-talk (LBT) based on example channel access procedures, where the transmitter ensures there are no ongoing transmissions on the carrier frequency prior to transmitting.

In an example, a channel may refer to a carrier or a part of a carrier on which a channel access procedure is performed. A channel access procedure is a procedure based on sensing that evaluates the availability of a channel for performing transmissions on. The basic unit for sensing may be a sensing slot with a duration $T_{sl}$=9 us. The sensing slot duration $T_{sl}$ may be considered to be idle if a base station or a wireless device senses the channel during the sensing slot duration, and determines that the detected power for at least a portion (e.g., 4 us) within the sensing slot duration is less than an energy detection threshold (e.g., $X_{Thresh}$). Otherwise, the sensing slot duration $T_{sl}$ may be considered to be busy.

A Channel Occupancy Time (COT) may refer to the total time for which eNB/gNB/UE and eNB/gNB/UEs sharing the channel occupancy can perform transmission(s) on a channel after an eNB/gNB/UE performs the corresponding channel access procedures. For determining a Channel Occupancy Time, if a transmission gap is less than 25 us, the gap duration may be counted in the channel occupancy time. A channel occupancy time may be shared for transmission between a base station and the corresponding wireless device(s). A DL transmission burst may be defined as a set of transmissions from a base station without gaps greater than 16 us. Transmissions from a base station separated by a gap of more than 16 us may be considered as separate DL transmission bursts. An UL transmission burst may be defined as a set of transmissions from a UE without gaps greater than 16 us. Transmissions from a wireless device separated by a gap of more than 16 us may be considered as separate UL transmission.

In an example, a wireless device may access a channel on which uplink transmission(s) are performed according to an uplink channel access procedure (e.g., one of Type 1 or Type 2 uplink channel access procedures). If an uplink grant scheduling a PUSCH transmission indicates Type 1 channel access procedure, the wireless device may use Type 1 channel access procedure for transmitting transmissions including the PUSCH transmission. A wireless device may use Type 1 channel access procedure for transmitting transmissions including autonomous PUSCH transmission on configured uplink resources. If an uplink grant scheduling a PUSCH transmission indicates Type 2 channel access procedure, the wireless device may use Type 2 channel access procedure for transmitting transmissions including the PUSCH transmission. A wireless device may use Type 1 channel access procedure for transmitting SRS transmissions not including a PUSCH transmission. In an example, uplink channel access priority class p=1, as shown in FIG. 16, may be used for SRS transmissions not including a PUSCH.

In an example, if a wireless device is scheduled by a base station to transmit PUSCH and SRS in contiguous transmissions without gaps in between, and if the wireless device cannot access the channel for PUSCH transmission, the wireless device may attempt to make SRS transmission according to uplink channel access procedures for SRS transmission.

In an example, a wireless device may use Type 1 channel access procedure for PUCCH only transmissions or PUSCH only transmissions without UL-SCH with UL channel access priority class p=1 in FIG. 16.

In an example, a wireless device may use Type 1 channel access procedure for transmissions related to random access procedure with uplink channel access priority class p=1 in FIG. 16.

In an example, the total duration of autonomous uplink transmission(s) obtained by the channel access procedure, including the following DL transmission if the UE sets 'COT sharing indication' in AUL-UCI to '1' in a subframe within the autonomous uplink transmission(s), may not exceed $T_{ulmcot,p}$, where $T_{ulmcot,p}$ is given in FIG. 16.

In an example, a wireless device may detect 'UL duration and offset' field in a DCI. If the UL duration and offset' field indicates an 'UL offset' l and an 'UL duration' d for subframe n, then the scheduled UE may use channel access Type 2 for transmissions in subframes n+l+i where i=0, 1, . . . d−1, irrespective of the channel access Type signalled in the UL grant for those subframes, if the end of wireless device transmission occurs in or before subframe n+l+d−1.

In an example, if the 'UL duration and offset' field indicates an 'UL offset' l and an 'UL duration' d for subframe n and the 'COT sharing indication for AUL' field is set to '1', a UE configured with autonomous UL may use channel access Type 2 for autonomous UL transmissions corresponding to any priority class in subframes n+l+i where i=0, 1, . . . d−1, if the end of wireless device autonomous UL transmission occurs in or before subframe n+l+d−1 and the autonomous UL transmission between n+l and n+l+d−1 may be contiguous.

In an example, if the 'UL duration and offset' field indicates an 'UL offset' l and an 'UL duration' d for subframe n and the 'COT sharing indication for AUL' field is set to '0', then a UE configured with autonomous UL may not transmit autonomous UL in subframes n+l+i where i=0, 1, . . . d−1.

In an example, for contiguous UL transmission(s), if a wireless device is scheduled to transmit a set of w UL transmissions including PUSCH using a PDCCH DCI format, and if the wireless device cannot access the channel for a transmission in the set prior to the last transmission, the wireless device may attempt to transmit the next transmission according to the channel access type indicated in the DCI.

In an example, for contiguous uplink transmission(s), if a wireless device is scheduled to transmit a set of w consecutive uplink transmissions without gaps including PUSCH using one or more PDCCH DCI formats and the wireless device transmits one of the scheduled uplink transmissions in the set after accessing the channel according to one of uplink channel access procedures (e.g., Type 1 or Type 2), the wireless device may continue transmission the remaining uplink transmissions in the set, if any.

In an example, for contiguous UL transmission(s), a wireless device may not be expected to be indicated with different channel access types for any consecutive UL transmissions without gaps in between the transmissions.

In an example, for uplink transmission(s) with multiple starting positions scheduled by a base station, if a wireless device is scheduled by an base station to transmit transmissions including PUSCH Mode 1 using the Type 1 channel access procedure indicated in DCI, and if the wireless device cannot access the channel for a transmission according to the PUSCH starting position indicated in the DCI, the wireless device may attempt to make a transmission at symbol 7 in the same subframe according to Type 1 channel access procedure. In an example, there may be no limit on the number of attempts the UE can make using Type 1 channel access procedure.

In an example, for uplink transmission(s) with multiple starting positions scheduled by a base station, if a wireless device is scheduled by a base station to transmit transmissions including PUSCH Mode 1 using the Type 2 channel access procedure indicated in DCI, and if the wireless device cannot access the channel for a transmission according to the PUSCH starting position indicated in the DCI, the wireless device may attempt to make a transmission at symbol 7 in the same subframe and according to Type 2 channel access procedure. The number of attempts the wireless device may make within the consecutively scheduled subframes including the transmission may be limited to w+1, where w may be the number of consecutively scheduled subframes using Type 2 channel access procedure.

In an example, for contiguous uplink transmissions(s) including a transmission pause, if the wireless is scheduled to transmit a set of w consecutive uplink transmissions without gaps using one or more PDCCH DCI formats, and if the wireless device has stopped transmitting during or before of one of these uplink transmissions in the set and prior to the last uplink transmission in the set, and if the channel is sensed by the wireless device to be continuously idle after the wireless device has stopped transmitting, the wireless device may transmit a later uplink transmission in the set using Type 2 channel access procedure. If the channel sensed by the wireless device is not continuously idle after the wireless device has stopped transmitting, the wireless device may transmit a later uplink transmission in the set using Type 1 channel access procedure with the uplink channel access priority class indicated in the DCI corresponding to the uplink transmission.

In an example, for uplink transmission(s) following configured uplink transmission(s), if the wireless device is scheduled by a base station to transmit on channel $c_i$ by a uplink grant received on channel $c_1$, i≠j, and if the wireless device is transmitting using autonomous uplink on channel $c_i$, the wireless device may terminate the ongoing PUSCH transmissions using the autonomous uplink at least one subframe before the uplink transmission according to the received uplink grant.

In an example, if the wireless device is scheduled by an uplink grant received from a base station on a channel to transmit a PUSCH transmission(s) starting from subframe n on the same channel using Type 1 channel access procedure and if at least for the first scheduled subframe occupies $N_{RB}^{UL}$ resource blocks and the indicated 'PUSCH starting position is OFDM symbol zero, and if the wireless device starts autonomous uplink transmissions before subframe n using Type 1 channel access procedure on the same channel, the wireless device may transmit uplink transmission(s) according to the received uplink grant from subframe n without a gap, if the priority class value of the performed channel access procedure is larger than or equal to priority class value indicated in the uplink grant, and the autonomous uplink transmission in the subframe preceding subframe n may end at the last OFDM symbol of the subframe regardless of the higher layer parameter endingSymbolAUL. The sum of the lengths of the autonomous uplink transmission(s) and the scheduled uplink transmission(s) may not exceed the maximum channel occupancy time corresponding to the priority class value used to perform the autonomous uplink channel access procedure. Otherwise, the wireless device may terminate the ongoing autonomous uplink transmission at least one subframe before the start of the uplink transmission according to the received uplink grant on the same channel.

In an example, if a wireless device receives an uplink grant and a DCI indicating a PUSCH transmission using Type 1 channel access procedure, and if the wireless device has an ongoing Type 1 channel access procedure before the PUSCH transmission starting time, if the uplink channel access priority class value $p_1$ used for the ongoing Type 1 channel access procedure is same or larger than the uplink channel access priority class value $p_2$ indicated in the DCI, the wireless device may transmit the PUSCH transmission in response to the uplink grant by accessing the channel by using the ongoing Type 1 channel access procedure.

In an example, if a wireless device receives an uplink grant and a DCI indicating a PUSCH transmission using Type 1 channel access procedure, and if the wireless device has an ongoing Type 1 channel access procedure before the PUSCH transmission starting time, if the uplink channel access priority class value $p_1$ used for the ongoing Type 1 channel access procedure is smaller than the uplink channel access priority class value $p_2$ indicated in the DCI, the wireless device may terminate the ongoing channel access procedure.

In an example, a base station may indicate Type 2 channel access procedure in the DCI of an uplink grant scheduling transmission(s) including PUSCH on a channel when: the base station has transmitted on the channel according to a channel access procedure; or base station may indicate using the 'UL duration and offset' field that the wireless device may perform a Type 2 channel access procedure for transmissions(s) including PUSCH on a channel in subframe n when the base station has transmitted on the channel according to a channel access procedure described; or a base station may indicate using the 'UL duration and offset' field and 'COT sharing indication for AUL' field that a wireless device configured with autonomous uplink may perform a Type 2 channel access procedure for autonomous uplink transmissions(s) including PUSCH on a channel in subframe n when the base station has transmitted on the channel according to a channel access procedure and acquired the channel using the largest priority class value and the base station transmission includes PDSCH, or a base station may schedule uplink transmissions on a channel, that follows a transmission by the base station on that channel with a duration of $T_{short\_ul}=25$ us, if the uplink transmissions occurs within the time interval starting at $t_0$ and ending at $t_0+T_{CO}$, where $T_{CO}=T_{m\ cot,p}+T_g$, where $t_0$ is the time instant when the base station has started transmission, $T_{m\ cot,p}$ value is determined by the base station, $T_g$ is the total duration of all gaps of duration greater than 25 us that occur between the DL transmission of the base station and uplink transmissions scheduled by the base station, and between any two uplink transmissions scheduled by the base station starting from $t_0$.

In an example, the base station may schedule uplink transmissions between $t_0$ and $t_0+T_{CO}$ without gaps between consecutive uplink transmissions if they can be scheduled contiguously. For an uplink transmission on a channel that follows a transmission by the base station on that channel within a duration of $T_{short\_ul}=25$ us, the wireless device may use Type 2A channel access procedure for the UL transmission.

In an example, if the base station indicates Type 2 channel access procedure for the wireless device in the DCI, the base station may indicate the channel access priority class used to obtain access to the channel in the DCI.

For indicating a Type 2 channel access procedure, if the gap is at least 25 us, or 16 us, or up to 16 us, the base station may indicate Type 2A, or Type 2B, or Type 2C uplink channel procedures, respectively.

In an example, if a wireless device is scheduled to transmit on a set of channels C, and if Type 1 channel access procedure is indicated by the uplink scheduling grants for the uplink transmissions on the set of channels C, and if the uplink transmissions are scheduled to start transmissions at the same time on all channels in the set of channels C; or if the wireless device intends to perform an autonomous uplink transmission on configured resources on the set of channels C with Type 1 channel access procedure, and if UL transmissions are configured to start transmissions on the same time all channels in the set of channels C; and if the channel frequencies of set of channels C is a subset of one of the sets of channel frequencies, the wireless device may transmit on channel $c_i \in C$ using Type 2 channel access procedure, if Type 2 channel access procedure is performed on channel $c_j$ immediately before the wireless device transmission on channel $c_i \in C$, i≠j, and if the wireless device has accessed channel $c_j$ using Type 1 channel access procedure, where channel $c_j$ is selected by the wireless device uniformly randomly from the set of channels C before performing Type 1 channel access procedure on any channel in the set of channels C and the wireless device may not transmit on channel $c_i \in C$ within the bandwidth of a carrier, if the wireless device fails to access any of the channels, of the carrier bandwidth, on which the wireless device is scheduled or configured by UL resources.

In an example, a wireless device may transmit the transmission using Type 1 channel access procedure after first sensing the channel to be idle during the slot durations of a defer duration $T_d$; and after the counter N is zero in step 4. The counter N may be adjusted by sensing the channel for additional slot duration(s) according to the actions described below:

1) set $N=N_{init}$, where $N_{init}$ is a random number uniformly distributed between 0 and $CW_p$, and go to action 4;
2) if N>0 and the UE chooses to decrement the counter, set N=N−1;
3) sense the channel for an additional slot duration, and if the additional slot duration is idle, go to action 4; else, go to action 5;
4) if N=0, stop; else, go to action 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to action 4; else, go to action 5;

In an example, if a wireless device has not transmitted an uplink transmission on a channel on which uplink transmission(s) are performed after action 4 in the process above, the wireless device may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the wireless device first senses the channel after it is ready to transmit, or if the channel has not been sensed to be idle during any of the sensing slot durations of a defer duration $T_d$ immediately before the intended transmission, the wireless device may proceed to action 1 after sensing the channel to be idle during the slot durations of a defer duration $T_d$.

The defer duration $T_d$ may consist of duration $T_f=16$ us immediately followed by $m_p$ consecutive slot durations where each slot duration is $T_{sl}=9$ us, and $T_f$ includes an idle slot duration $T_{sl}$ at start of $T_f$. $CW_{min,p} \leq CW_p \leq CW_{max,p}$ may be the contention window. $CW_{min,p}$ and $CW_{max,p}$ may be chosen before step 1 of the procedure above. $m_p$, $CW_{min,p}$ and $CW_{max,p}$ may be based on a channel access priority class p as shown in FIG. 16, that is signalled to the wireless device.

In an example, if a wireless device is indicated to perform Type 2A UL channel access procedures, the wireless device may use Type 2A UL channel access procedure for a UL transmission. The UE may transmit the transmission immediately after sensing the channel to be idle for at least a sensing interval $T_{short\_ul}=25$ us. $T_{short\_ul}$ may consist of a duration $T_f=16$ us immediately followed by one slot duration $T_{sl}=9$ us and $T_f$ may include an idle slot duration $T_{sl}$ at start of $T_f$. The channel may be considered to be idle for $T_{short\_ul}$ if it is sensed to be idle during the slot durations of $T_{short\_ul}$.

In an example, if a wireless device is indicated to perform Type 2B UL channel access procedures, the wireless device may use Type 2B UL channel access procedure for a uplink transmission. The wireless device may transmit the transmission immediately after sensing the channel to be idle.

In an example, if a wireless device is indicated to perform Type 2C UL channel access procedures, the wireless device transmits immediately without sensing the channel.

In an example embodiment, a wireless device (e.g., a MAC entity of the wireless device) may employ one or more processes to handle the uplink LBT failures for uplink transmissions, such as uplink transmissions for one or more uplink channels (e.g., PUSCH, PUCCH and/or PRACH) and/or one or more signals (e.g., SRS). In an example, the wireless device may detect/determine consistent uplink LBT failures to detect/determine uplink LBT problems. A MAC entity of the wireless device may receive notifications of uplink LBT failures from the physical layer to detect consistent uplink LBT failures.

In an example, detection/determination of consistent uplink LBT failures may be based on a counter and/or timer. A value of the counter may be incremented based on detecting an uplink LBT failure. In an example, a threshold may be configured and a consistent uplink LBT failure may be determined based on the counter reaching the threshold. A consistent uplink LBT failure event may be triggered based on the uplink LBT failure counter reaching the threshold value. In an example, a timer may be started based on detecting a consistent uplink LBT failure and the value of the counter may be reset (e.g., reset to zero) based on an expiry of the timer. The wireless device may receive configuration parameters indicating the threshold value for the counter (e.g., a Max Count value) and a value of the timer. In an example, the threshold for the counter and/or the timer value may be configured per BWP and/or per cell. In an example, the threshold may be reset (e.g., reset to zero) based on the reconfiguration (e.g., in response to receiving an RRC reconfiguration message) of one or more parameters of the consistent uplink failure detection such as the threshold and/or timer value.

The wireless device may determine consistent LBT failure (e.g., for a cell and/or a BWP of the cell and/or an LBT sub-band of the BWP of the cell). The wireless device may indicate the consistent LBT failure (e.g., for a cell and/or a BWP of the cell and/or an LBT sub-band of the BWP of the cell) to the base station. The cell for which the wireless device may indicate consistent LBT failure may be a secondary cell or a primary cell (e.g., PCell or PSCell). In an example, the wireless device may autonomously take a recovery action. In an example, the wireless device may receive a command from the base station in response to indication of the consistent LBT failure to the base station. The recovery action may include switching the BWP and/or performing a random access process (e.g., in the new BWP after switching). In an example, the wireless device may stop one or more timers (e.g., BWP inactivity timer) based on the detecting/determining the consistent LBT failure.

In an example, the determining/detecting of the consistent uplink LBT failure on a cell/BWP may be based on a plurality of uplink transmissions (e.g., via one or more uplink channels and/or one or more uplink signals) on the cell/BWP. In an example, the determining/detecting of the consistent uplink LBT failure may be independent of uplink transmission type. The LBT failures for different uplink transmissions may be used to determine the consistent uplink LBT failure regardless of the uplink transmission types (e.g., PUSCH, PUCCH, etc.). The consistent uplink LBT failure mechanism may have the same recovery mechanism for all uplink LBT failures regardless of the uplink transmission type.

In an example, based on detecting/determining/declaring consistent uplink LBT failures on PCell or PSCell, the wireless device may switch a current active BWP (of PCell or PSCell) to a second BWP (of PCell or PSCell). The wireless device may initiate a random access process in the second BWP based on the second BWP being configured with random access resources. The wireless device may perform radio link failure (RLF) recovery based on the consistent uplink LBT failure being detected on the PCell and consistent uplink LBT failure being detected on N possible BWPs of the PCell. In an example, based on detecting/determining consistent uplink LBT failures on a PSCell and after detecting a consistent uplink LBT failure on N BWPs of the PSCell, the wireless device may indicate a failure to a master base station via a secondary cell group (SCG) failure information procedure. In an example, N may be the number of configured BWPs with configured random access resources. In an example, after detecting consistent uplink LBT failure on PCell or PSCell, the wireless device may determine which BWP to switch if N is larger than one. The value of N may be configurable (e.g., via RRC) or may be pre-determined/pre-configured.

In an example, based on detecting/determining consistent uplink LBT failures on a cell (e.g., a SCell or PCell), the wireless device may indicate the consistent LBT failure on the cell to the base station based on an LBT failure indication MAC CE. The MAC CE may report consistent uplink LBT failure on one or more Cells. The MAC CE format may support multiple entries to indicate the Cells which have already declared consistent uplink LBT failures. In an example, the LBT failure indication MAC CE may indicate/include cell index(es) where uplink LBT failure occurs. In an example, the format of the LBT failure indication MAC CE may be a bitmap to indicate whether corresponding serving cell has declared consistent uplink LBT failure or not.

The LBT failure indication MAC CE may be transmitted on a different serving cell than a SCell which has consistent UL LBT problem. In an example, the LBT failure indication MAC CE may indicate consistent uplink LBT failures on one or more cells and the wireless device may transmit the LBT failure indication MAC CE based on an uplink grant on a cell other than the one or more cells. The MAC CE for uplink LBT failure indication may have higher priority than data but lower priority than a beam failure recovery (BFR) MAC CE.

The wireless device may trigger scheduling request if there is no available uplink resource for transmitting the MAC CE for a SCell uplink LBT failure indication. The wireless device may receive configuration parameters of a SR configuration associated with uplink LBT failure indication. The configuration parameters may comprise an identifier indicating that the SR is associated with uplink LBT failure indication. In an example, when a SR configuration associated with uplink LBT failure indication is not configured for the wireless device and no resource is available for transmitting the MAC CE for indicating SCell uplink LBT failure, the wireless device may start a random access process.

In an example, when a SR for uplink LBT failure indication is triggered and the wireless device has an overlapping SR PUCCH resource with the SCell LBT failure SR PUCCH resource, the wireless device may select the SCell LBT failure SR PUCCH resource for transmission.

In an example, the wireless device may cancel the consistent LTB failure for a serving cell (or BWP(s)) (e.g., may not consider the cell as having consistent LBT failure) based on the wireless device successfully transmitting an LBT failure MAC CE indicating the serving cell.

In an example, when consistent UL LBT failure is declared on SpCell, the wireless device may trigger MAC CE to indicate where failure happened. The MAC CE may be sent on the BWP that the wireless device switched to during the random access process.

In an example, different LBT failures, irrespective of channel, channel access priority class, and LBT type, may be considered equivalent for the consistent UL LBT failure detection procedure at a MAC entity of a wireless device.

In an example, upon switching to a new BWP after detecting consistent LBT failures on a BWP of the PCell/PSCell, the wireless device may increment a counter (e.g., a BWP switching counter). The BWP switching counter may be used by the wireless device to initiate a radio link failure process based on the BWP switching counter reaching a value (e.g., N). The wireless device may reset the BWP switching counter when the random access process on a BWP of the PCell/PSCell being successfully completed.

In an example, in response to the BWP switching due to consistent uplink LBT failure on PCell/PSCell, the wireless device may indicate the consistent uplink LBT failure via a dedicated uplink resource (e.g. PRACH). For example, the PRACH resources used for indication of consistent uplink LBT failure may be dedicated to consistent uplink LBT failure indication In an example, the uplink LBT failure information reported by the UE may include one or more BWP indexes of BWPs with consistent uplink LBT failures, one or more cell indexes of one or more cells with consistent uplink LBT failures and/or one or more measurement results (e.g., RSRP/RSRQ/RSSI/CO) of the serving/neighbor cells In an example, the wireless device may perform an LBT for an uplink transmission comprising the uplink failure indication MAC CE based on a highest priority channel access priority class (e.g., lowest number channel access priority).

In an example, the wireless device may reset the uplink LBT counter for a cell/BWP based on expiry of an uplink LBT timer and/or based on receiving one or more messages indicating reconfiguration of uplink LBT configuration parameters for detecting consistent LBT failures and/or based on transmitting an uplink channel or uplink signal on the cell/BWP in response to successful uplink LBT. In an example, successful uplink LBT for the cell/BWP may indicate that the cell/BWP no longer has consistent LBT failures.

In an example, in response to BWP switching caused by detection of consistent uplink LBT failures on SpCell, a MAC entity may stop an ongoing random access procedure and may initiate a new random access procedure.

In an example, based on switching BWP due to detecting/declaring consistent LBT failure on a BWP of PCell or PSCell, the wireless device may initiate a random access process and may not perform other transmissions (e.g., may not resume suspended configured grants transmissions).

In an example, a wireless device may autonomously deactivate a configured grant for Sell(s) experiencing a consistent UL LBT failure.

In an example, based on detecting/declaring consistent uplink LBT failure for a cell/BWP, ongoing transmissions (e.g., PUSCH transmission, SRS transmission, PUCCH transmission, RACH transmission, etc.) on active BWP of a SCell with consistent uplink LBT failure may be suspended.

In an example, based on detecting/declaring consistent uplink LBT failure for a cell/BWP, type 2 configured grants on the cell/BWP may be cleared. In an example, based on detecting/declaring consistent uplink LBT failure for a cell/BWP, type 1 configured grants on the cell/BWP may be suspended. In an example, based on detecting/declaring consistent uplink LBT failure for a BWP, BWP inactivity for a downlink BWP associated with the BWP may be stopped.

In an example, based on switching BWP due to detecting/declaring consistent LBT failure on a BWP of PCell or PSCell, a counter for detection of consistent uplink LBT failure of the BWP may be reset and/or a timer for consistent uplink LBT failure detection of the BWP may be stopped.

In an example, based on an uplink transmission failure due to LBT, a physical layer of a wireless device may send LBT failure indication to a MAC entity of the wireless device. The MAC entity of the wireless device may, based on receiving an LBT failure indication, start an lbt-FailureDetectionTimer and increment an LBT_COUNTER. Based on the lbt-FailureDetectionTimer expiring, the LBT_COUNTER may be reset. Based on LBT_COUNTER reaching a configured threshold value before the lbt-FailureDetectionTimer expiring, the wireless device may trigger a consistent uplink LBT failure event. In an example, a "failureType" in SCG failure information may indicate consistent uplink LBT failures.

In an example, the Scheduling Request (SR) may be used for requesting UL-SCH resources for new transmission. A MAC entity of a wireless device may be configured with zero, one, or more SR configurations. An SR configuration may comprise of a set of PUCCH resources for SR across different BWPs and cells. In an example, for a logical channel, a PUCCH resource for SR may be configured per BWP.

In an example, a SR configuration may correspond to one or more logical channels. A logical channel may be mapped to zero or one SR configuration, which may be configured by RRC. The SR configuration of the logical channel that triggered the buffer status report (BSR) (if such a configuration exists) may be considered as corresponding SR configuration for the triggered SR.

In an example, RRC may configure the following parameters for the scheduling request procedure: sr-ProhibitTimer (e.g., per SR configuration); and sr-TransMax (e.g., per SR configuration). In an example, the following variables may be used for the scheduling request procedure: SR_COUNTER (e.g., per SR configuration).

In an example, if an SR is triggered and there are no other SRs pending corresponding to the same SR configuration, the MAC entity may set the SR_COUNTER of the corresponding SR configuration to 0.

In an example, when an SR is triggered, it may be considered as pending until it is cancelled. One or more pending SR(s) triggered prior to the MAC PDU assembly may be cancelled and respective sr-ProhibitTimer may be stopped when the MAC PDU is transmitted and this PDU includes a Long or Short BSR MAC CE which contains buffer status up to (and including) the last event that triggered a BSR prior to the MAC PDU assembly. One or more pending SR(s) may be cancelled and respective sr-ProhibitTimer may be stopped when the UL grant(s) can accommodate all pending data available for transmission.

In an example, PUCCH resources on a BWP which is active at the time of SR transmission occasion may be considered valid.

In an example, as long as at least one SR is pending, for each pending SR, if the MAC entity has no valid PUCCH resource configured for the pending SR, the MAC entity may initiate a Random Access procedure on the SpCell and cancel the pending SR.

In an example, based on at least one SR is pending, for each pending SR, if the MAC entity has valid PUCCH resource configured for the pending SR, for the SR configuration corresponding to the pending SR: when the MAC entity has an SR transmission occasion on the valid PUCCH resource for SR configured; and if sr-ProhibitTimer is not running at the time of the SR transmission occasion; and if the PUCCH resource for the SR transmission occasion does not overlap with a measurement gap; and if the PUCCH resource for the SR transmission occasion does not overlap with a UL-SCH resource: if SR_COUNTER<sr-TransMax: the wireless device may increment SR_COUNTER by 1; instruct the physical layer to signal the SR on one valid PUCCH resource for SR; and start the sr-ProhibitTimer. If SR_COUNTER=sr-TransMax: the wireless device may notify RRC to release PUCCH for all Serving Cells; notify RRC to release SRS for all Serving Cells; clear any configured downlink assignments and uplink grants; clear any PUSCH resources for semi-persistent CSI reporting; initiate a Random Access procedure on the SpCell and cancel all pending SRs.

In an example, the selection of which valid PUCCH resource for SR to signal SR on when the MAC entity has more than one overlapping valid PUCCH resource for the SR transmission occasion may be based on the wireless device implementation.

In an example, if more than one individual SR triggers an instruction from a MAC entity to a PHY layer to signal the SR on the same valid PUCCH resource, the SR_COUNTER for the relevant SR configuration may be incremented only once.

In an example, the MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR prior to the MAC PDU assembly, or when the UL grant(s) can accommodate all pending data available for transmission.

In an example, a wireless device may be configured by a higher layer parameter (e.g., SchedulingRequestResourceConfig) a set of configurations for SR in a PUCCH transmission for example using PUCCH format 0 or PUCCH format 1.

The wireless device may be configured a PUCCH resource by SchedulingRequestResourceId providing a PUCCH format 0 resource or a PUCCH format 1 resource. The wireless device may also be configured a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the UE may determine a SR transmission occasion in a PUCCH to be in a slot with number $n_{s,f}^\mu$ in a frame with number $n_f$ if $(n_f N_{slot}^{frame,\mu} + n_{s,f}^\mu - SR_{OFFSET}) \mod S\ R_{PERIODICITY} = 0$.

In an example, if $SR_{PERIODICITY}$ is one slot, the UE may expect that $SR_{OFFSET}=0$ and every slot may be a SR transmission occasion in a PUCCH.

In an example, if $SR_{PERIODICITY}$ is smaller than one slot, the UE may determine a SR transmission occasion in a PUCCH to start in a symbol with index l if $(l-l_0 \mod S\ R_{PERIODICITY}) \mod S\ R_{PERIODICITY}=0$ where $l_0$ may be the value of startingSymbolIndex.

In an example, if the UE determines that, for a SR transmission occasion in a PUCCH, the number of symbols available for the PUCCH transmission in a slot is smaller than the value provided by nrofSymbols, the UE may not transmit the PUCCH in the slot.

In an example, the IE SchedulingRequestConfig may be used to configure the parameters, for the dedicated scheduling request (SR) resources.

In an example, the parameter schedulingRequestToAddModList may indicate a list of Scheduling Request configurations to add or modify. The parameter schedulingRequestToReleaseList may indicate a list of Scheduling Request configurations to release. The parameter schedulingRequestId may be used to modify a SR configuration and to indicate, in LogicalChannelConfig, the SR configuration to which a logical channel is mapped and to indicate, in SchedulingRequestresourceConfig, the SR configuration for which a scheduling request resource is used. The parameter sr-ProhibitTimer may indicate a timer for SR transmission on PUCCH. Value is in ms. Value ms1 may correspond to 1 ms, value ms2 may correspond to 2 ms, and so on. When the field is absent, the UE may apply the value 0. The parameter sr-TransMax may indicate maximum number of SR transmissions. Value n4 may correspond to 4, value n8 may correspond to 8, and so on.

In an example, the IE SchedulingRequestId may be used to identify a Scheduling Request instance in the MAC layer.

In an example, the IE SchedulingRequestResourceConfig may determine physical layer resources on PUCCH where the UE may send the dedicated scheduling request (D-SR). A parameter periodicityAndOffset may indicate SR periodicity and offset in number of symbols or slots. A parameter resource may indicate an ID of the PUCCH resource in which the UE may send the scheduling request. The actual PUCCH-Resource may be configured in PUCCH-Config of the same UL BWP and serving cell as this SchedulingRequestResourceConfig. The network may configure a PUCCH-Resource of PUCCH-format0 or PUCCH-format1 (other formats not supported). The schedulingRequestID may indicate an ID of the SchedulingRequestConfig that uses this scheduling request resource.

In an example, the IE SchedulingRequestResourceId may be used to identify scheduling request resources on PUCCH.

Figure 17A:
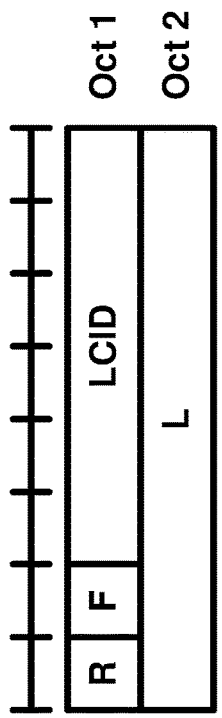
FIG. 17A, FIG. 17B and FIG. 17C show example MAC sub-headers in accordance with several of various embodiments of the present disclosure.
Figure 17B:
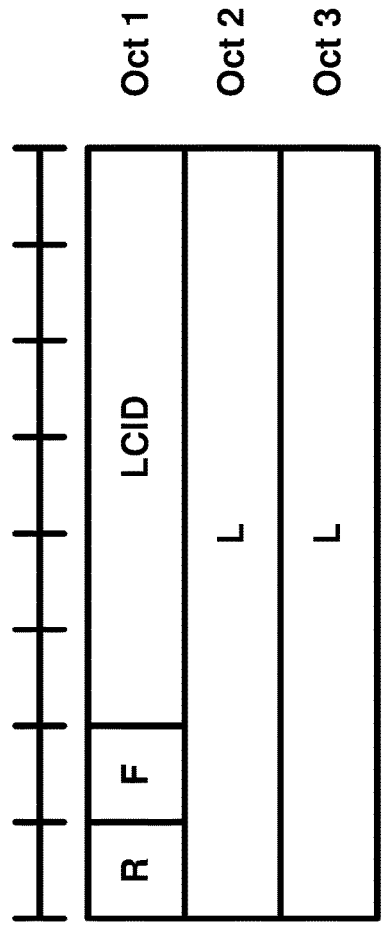
Figure 17C:
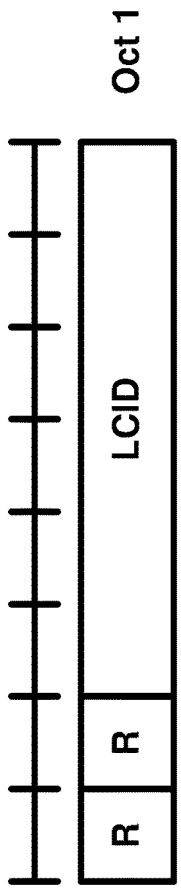

A MAC PDU may comprise of one or more MAC subPDUs. A MAC subPDU may comprise of one of the following: a MAC subheader only (including padding); a MAC subheader and a MAC SDU; a MAC subheader and a MAC CE; a MAC subheader and padding. The MAC SDUs may be of variable sizes. A MAC subheader may correspond to either a MAC SDU, a MAC CE, or padding. A MAC subheader except for fixed sized MAC CE, padding, and a MAC SDU containing UL CCCH may comprise of the four header fields R/F/LCID/L. A MAC subheader for fixed sized MAC CE, padding, and a MAC SDU containing UL CCCH may comprise of the two header fields R/LCID. FIG. 17A, FIG. 17B and FIG. 17C show example MAC subheaders. For example, FIG. 17A shows an example R/F/LCID/L MAC subheader with 8-bit L field. FIG. 17B shows an example R/F/LCID/L MAC subheader with 16-bit L field and FIG. 17C shows an example R/LCID MAC subheader. MAC CEs may be placed together. DL MAC subPDU(s) with MAC CE(s) may be placed before a MAC subPDU with MAC SDU and MAC subPDU with padding. The UL MAC subPDU(s) with MAC CE(s) may be placed after the MAC subPDU(s) with MAC SDU and before the MAC subPDU with padding in the MAC PDU. The size of padding may be zero.

Figure 18:
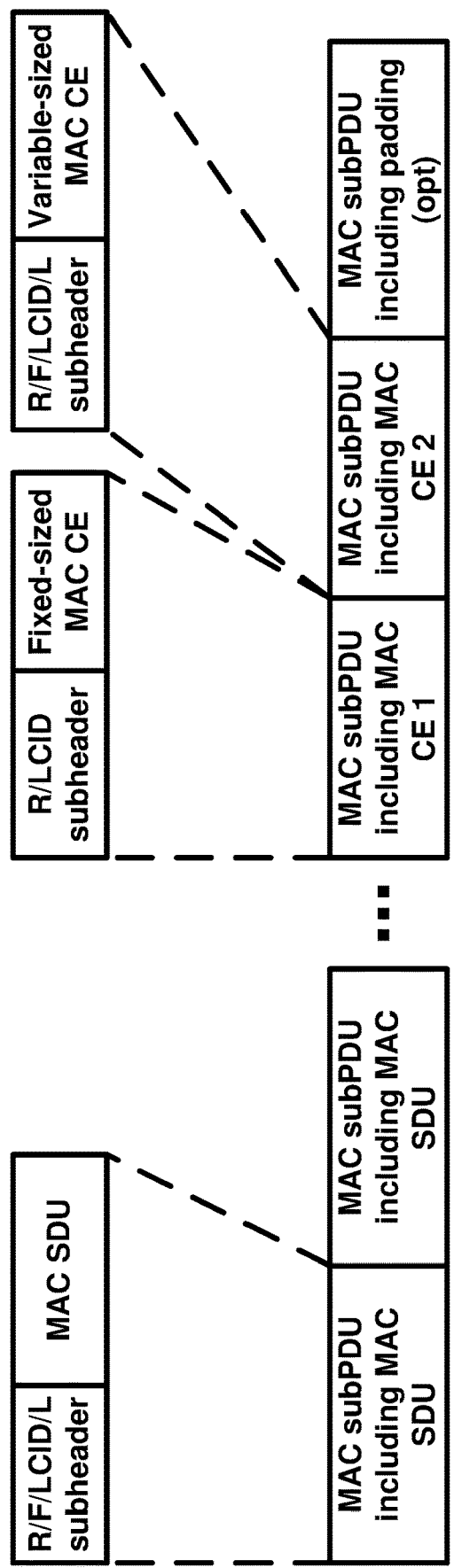
FIG. 18 shows an example MAC protocol data unit (MAC PDU) in accordance with several of various embodiments of the present disclosure.

FIG. 18 shows an example uplink MAC PDU (transport block) comprising a plurality of MAC subPDUs, wherein a MAC subPDU may comprise a subheader and MAC SDU (e.g. data from one or more logicals) or a MAC subPDU may comprise a subheader and a MAC control element (MAC CE). A MAC CE may be a fixed-size MAC CE wherein the length of the MAC CE may be a fixed value or may be a variable-sized MAC CE wherein the length of the MAC CE maybe variable.

The subheader of a MAC subPDU may comprise a logical channel identifier (LCID). The LCID field may identify the logical channel instance of the corresponding MAC SDU or the type of the corresponding MAC CE or padding. In an example, a MAC subheader may comprise one LCID field. The LCID field size may be 6 bits. One or more first LCIDs (e.g., LCIDs for MAC CEs included in MAC subPDUs) may have pre-defined values and one or more second LCIDs (e.g., LCIDs for MAC SDUs included in subPDUs) may be configured for a logical channel/bearer, the data of which is included in the MAC subPDU. For example, an RRC parameter logicalchannelidentity may indicate an LCID of a logical channel.

When a MAC subPDU comprises a MAC SDU or a variable-sized MAC CE, the subheader contained in the MAC subPDU may have a length field. The Length field may indicate the length of the corresponding MAC SDU or variable-sized MAC CE in bytes. There may be one L field per MAC subheader except for subheaders corresponding to fixed-sized MAC CEs, padding, and MAC SDUs containing UL CCCH. The size of the L field may be indicated by the F field.

The F field (Format field) may indicate the size of the Length field. There may be one F field per MAC subheader except for subheaders corresponding to fixed-sized MAC CEs, padding, and MAC SDUs containing UL CCCH. The size of the F field may be 1 bit. The value 0 may indicate 8 bits of the Length field. The value 1 may indicate 16 bits of the Length field.

Figure 19:
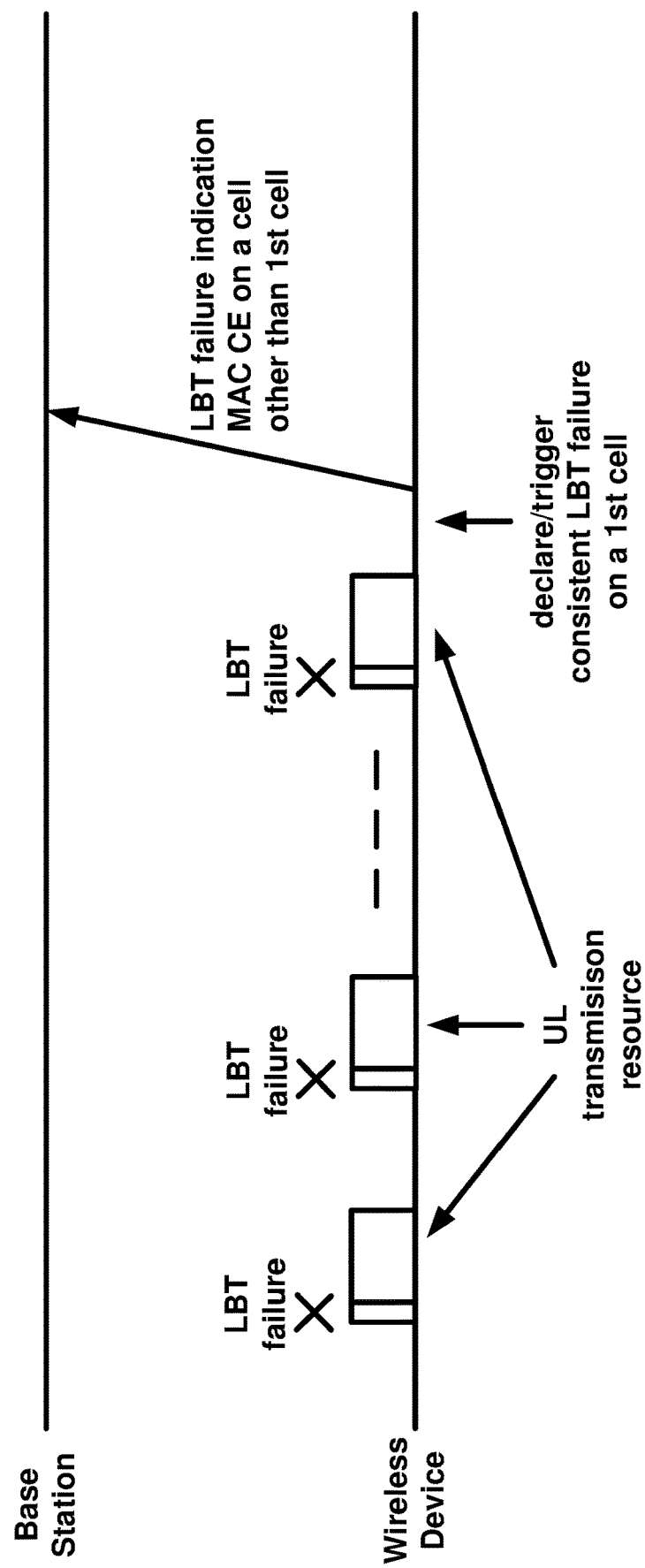
FIG. 19 shows an example process in accordance with several of various embodiments of the present disclosure.

In an example as shown in FIG. 19, a wireless device may determine consistent LBT failures on a cell and/or a BWP of a cell and/or an LBT subband of a BWP of a cell. The determination of consistent LBT failures on the cell/BWP/LBT subband may be based on counting a number of uplink LBT failures for uplink transmissions on the cell/BWP/LBT subband. The uplink transmission may be via an uplink channel (e.g., PUSCH, PUCCH, PRACH) or an uplink signal (e.g., SRS). For example, the wireless device may increment a counter based on determining/detecting an uplink LBT failure for an uplink transmission and may declare/trigger a consistent LBT failure indication based on the counter reaching a first value. The first value for the counter may be configurable (e.g., by RRC). The wireless device may receive configuration parameters comprising a first parameter indicating the first value. For example, a MAC entity of the wireless device may determine an LBT failure based on an indication of the LBT failure for the uplink transmission from the physical layer of the wireless device. The wireless device may start a timer based on receiving an LBT failure indication and may reset the LBT counter (e.g., reset to zero) based on the timer expiring. The wireless device may transmit an LBT failures indication MAC CE based on the triggering/declaring/determining a consistent LBT failure for a first cell/BWP/LBT subband. The LBT failures indication MAC CE may indicate consistent LBT failure on the first cell (and/or first BWP or first LBT subband of the first cell) and one or more other cells/BWPs/LB subbands that have consistent LBT failures.

Figure 20:
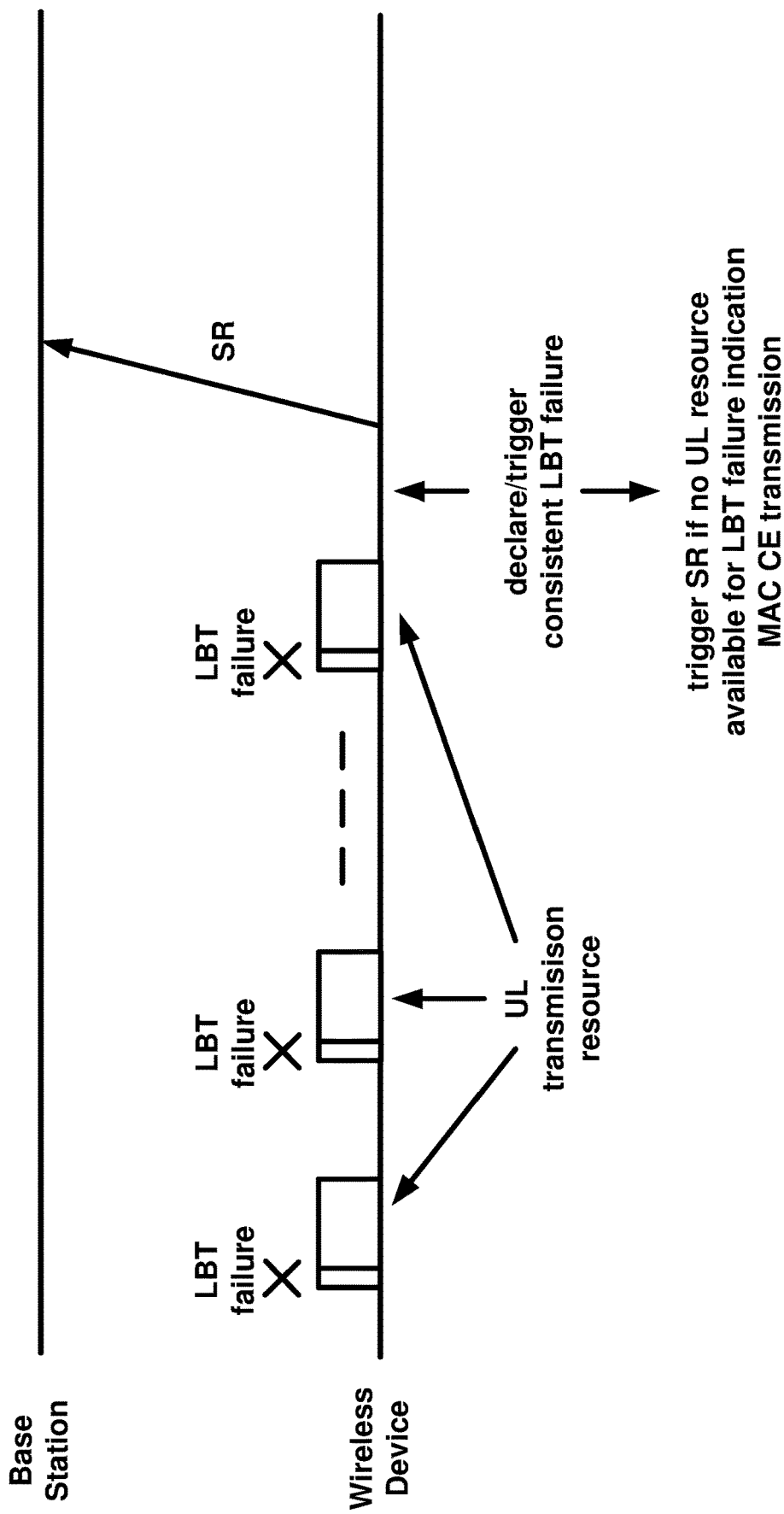
FIG. 20 shows an example process in accordance with several of various embodiments of the present disclosure.

In an example as shown in FIG. 20, the wireless device may declare/trigger consistent LBT failures on a cell/BWP/LBT subband based on a consistent LBT failure determination described earlier. The wireless device may determine that no uplink resource is available for transmission of an LBT failure indication MAC CE. Based on no uplink resource being available for transmission of the LBT failure indication MAC CE, the wireless device may trigger a scheduling request. The wireless device may transmit a scheduling request signal based on a scheduling request configuration. The scheduling request configuration may be for transmission of scheduling request signals related to uplink LBT failure recovery. In an example, the configuration parameters of the scheduling request configuration (e.g., a scheduling request identifier and/or other parameters) may indicate that the scheduling request configuration is for consistent LBT failure recovery. The scheduling request configuration may indicate resources comprising a first resource for transmission of the scheduling request signal.

Figure 21:
FIG. 21 shows example LBT failure indication MAC CE formats in accordance with several of various embodiments of the present disclosure.
Figure 22:
FIG. 22 shows example LBT failure indication MAC CE formats in accordance with several of various embodiments of the present disclosure.

The LBT failure indication MAC CE may have different formats, e.g., a short format and a long format as shown in FIG. 21 and FIG. 22. The LBT failure indication MAC CE may comprise of bitmaps. In an example, the short format may comprise one octet wherein a first bit of the octet may be a reserved bit (e.g., see FIG. 21) and each of the other seven bits may correspond to a cell and/or BWP of a cell and/or LBT subband of a cell. In an example, a first bit of the octet may correspond to a PCell and/or PSCell (e.g., see FIG. 22) and the other seven bits of the octet may correspond to secondary cells. A value of one for bit i of the octet may indicate that the cell/BWP/LBT subband corresponding to the bit i of the octet has consistent LBT failures and a value of zero for bit i of the octet may indicate that cell/BWP/LBT subband corresponding to the bit i of the octet does not have consistent LBT failures.

In an example, a long format for LBT failure indication MAC CE may comprise four octets wherein a first bit of a first octet of the four octets may be a reserved bit (e.g., see FIG. 21) and each of the other thirty one bits may correspond to a cell and/or BWP of a cell and/or LBT subband of a cell. In an example, a first bit of a first octet may correspond to a PCell and/or PSCell (e.g., see FIG. 22) and the other thirty one bits of the four octet may correspond to secondary cells. A value of one for bit i of the four octets may indicate that the cell/BWP/LBT subband corresponding to the bit i has consistent LBT failures and a value of zero for bit i may indicate that cell/BWP/LBT subband corresponding to the bit i does not have consistent LBT failures.

The format of the LBT failure indication MAC CE (e.g., long or short format) may be based on indexes of the serving cells that have consistent LBT failures. In an example, the short format may be used for LBT failure indication MAC CE based on indexes of serving cells experiencing consistent LBT failures being smaller than a first value (e.g., eight). In an example, the long format may be used for LBT failure indication MAC CE based on indexes of serving cells experiencing consistent LBT failures being larger than or equal to a second value (e.g., eight).

Figure 23:
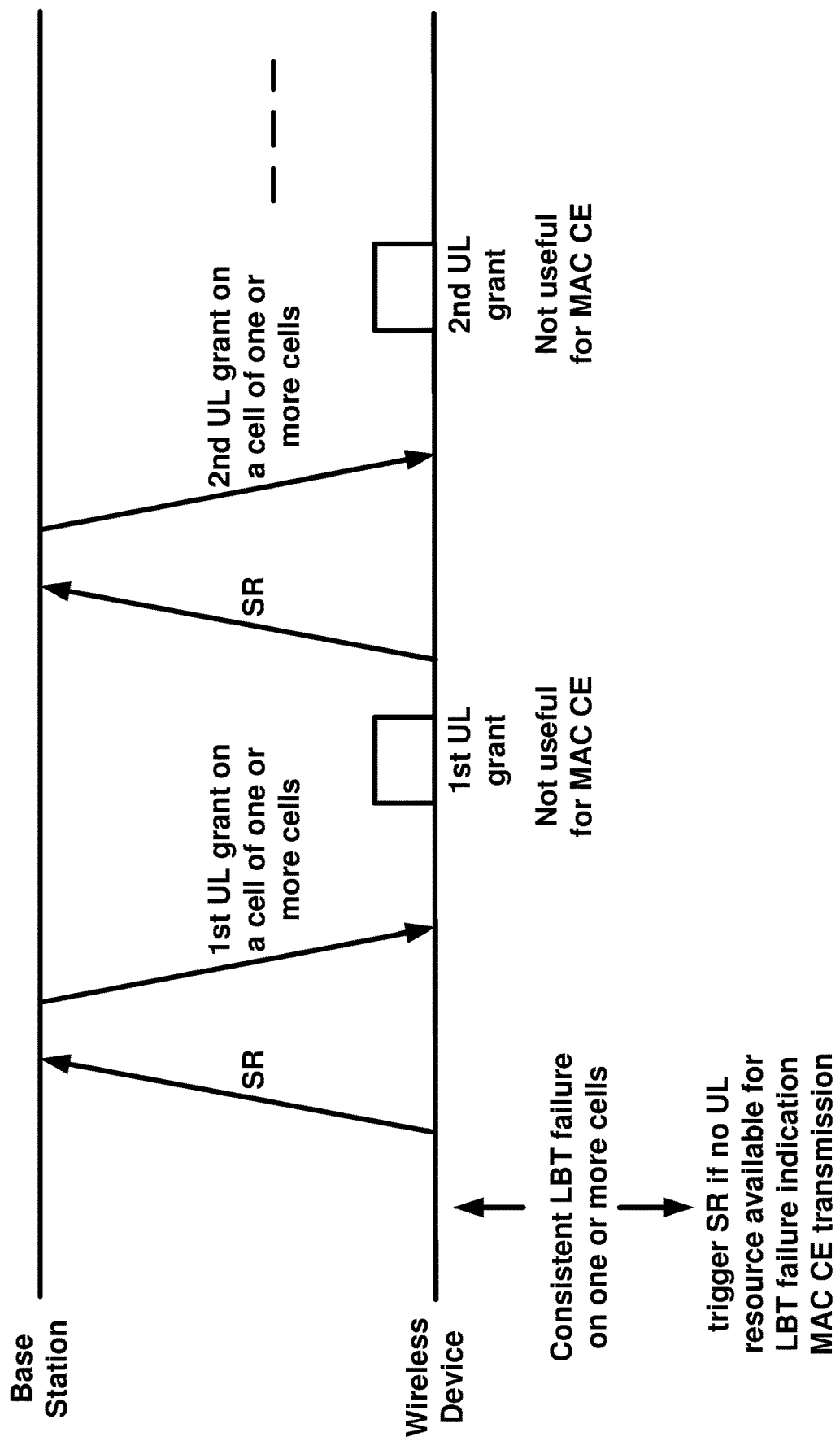
FIG. 23 shows example scheduling request transmission for recovery from consistent LBT failures on one or more cells.

A wireless device may be configured with a plurality of unlicensed cells. One or more of the plurality of unlicensed cells may experience/have consistent LBT failures triggering LBT failure indication. The wireless device may trigger a scheduling request based on triggering LBT failure indication and no uplink resource being available for transmission of an LBT failure indication MAC CE. Based on existing solutions and as shown in FIG. 23, transmission of the scheduling request signals by the wireless device may result in receiving uplink grants on the cells that experience consistent LBT failures which may be not be useful for transmission of LBT failure indication. Existing solutions for consistent LBT failure recovery may not be efficient leading to a slow recovery from consistent LBT failures. There is a need to enhance the existing uplink LBT failure recovery mechanisms to improve the speed of recovery from consistent LBT failures. Example embodiments enhance the recovery form consistent uplink LBT failures on unlicensed cells.

In an example embodiment, a wireless device may receive one or more messages comprising configuration parameters. The one or more messages may comprise one or more RRC messages. The one or more messages may comprise first configuration parameters of a plurality of cells. In an example, the plurality of cells may comprise a plurality of secondary cells. In an example, the plurality of cells may comprise a primary cell and one or more secondary cells. In an example, the plurality of cells may comprise a plurality of cell groups comprising a primary cell group provided to the wireless device by a master base station and a secondary cell group provided to the wireless device by a secondary base station, wherein the primary cell group may comprise a primary cell (PCell) and the secondary cell group may comprise a primary secondary cell (PSCell). In an example, the plurality of cells may comprise a secondary cell with uplink control channel (e.g., PUCCH SCell), wherein the secondary cell with uplink control channel carries uplink control information associated with a first plurality of cells (e.g., secondary PUCCH group) of the plurality of cells and the primary cell carries uplink control information associated with a second plurality of cells (e.g., a primary PUCCH group) of the plurality of cells.

The one or more messages may further comprise second configuration parameters of a scheduling request configuration. The scheduling request configuration may indicate a plurality of resources for transmission of scheduling request signals. The scheduling request configuration may indicate physical uplink control channel (PUCCH) resources for transmission of scheduling request signals. The PUCCH resources may be configured on a primary cell or a secondary cell configured with PUCCH resources (e.g., PSCell or PUCCH SCell). In an example, the second configuration parameters may comprise an identifier of the scheduling request configuration. In an example, the second configuration parameters may comprise one or more parameters indicating radio resources for transmission of the scheduling request signals. The one or more parameters may comprise a periodicity and offset parameter indicating the SR periodicity (e.g., in number of symbols or slots) and a resource parameter indicating an identifier of the PUCCH resource in which the wireless device may transmit the scheduling request signal.

The scheduling request configuration may be an uplink failure recovery scheduling configuration. In an example, the second configuration parameters of the uplink LBT failure recovery scheduling request configuration may comprise an identifier indicating that the scheduling request configuration is for uplink LBT failure recovery. The scheduling request configuration may indicate physical uplink control channel (PUCCH) resources for transmission of scheduling request signals for recovery from consistent LBT failures. The scheduling request configuration may be for recovery from consistent LBT failures, wherein the wireless device may transmit one or more scheduling request signals based the second configuration parameters for recovery from consistent LBT failures.

The wireless device may determine, as shown in FIG. 24-FIG. 29, consistent uplink LBT failures on one or more cells/BWPs/LBT sub-bands of the plurality of cells/BWPs/LBT sub-bands. The wireless device may determine/declare/trigger the consistent LBT failures on the one or more cells of the plurality of cells based on LBT failure indications received from the physical layer of the wireless device to a MAC entity of the wireless device and based on a consistent LBT failure determination process. The consistent LBT failure determination process may be based on one or more counters (e.g., LBT counter) and one or more timers. The wireless device may trigger an LBT failure indication MAC CE based on a determination of the consistent LBT failures on a cell/BWP/LBT sub-band.

The determination of consistent LBT failures on a cell/BWP/LBT sub-band may be based on notifications of LBT failures from physical layer of the wireless device to a MAC entity of the wireless device and based on a process that employs one or more counters (e.g., counting number of LBT failures) and one or more timers. For example, the determination of consistent LBT failures on a cell/BWP may be based on an LBT counter associated with the cell/BWP/LBT sub-band reaching a threshold value. The LBT counter may be incremented based on receiving a notification of LBT failure for an uplink transmission (e.g., for an uplink channel or uplink signal) from the physical layer. The one or more messages may comprise a parameter indicating the threshold value for the LBT counter. The wireless device may start a timer based on receiving a notification of LBT counter from the physical layer. The wireless device may start the timer with a value, wherein the value is configurable (e.g., by RRC). The wireless device may receive configuration parameters indicating the timer value. The wireless device may reset the LBT counter based on the timer expiring.

Based on the consistent LBT failures on the one or more cells of the plurality of cells, the wireless device may transmit a scheduling request signal. The wireless device may transmit the scheduling request signal based on the consistent LBT failures on the one or more cells and based on uplink resources not being available for an LBT failure indication MAC CE indicating the consistent LBT failures on the one or more cells.

Figure 24:
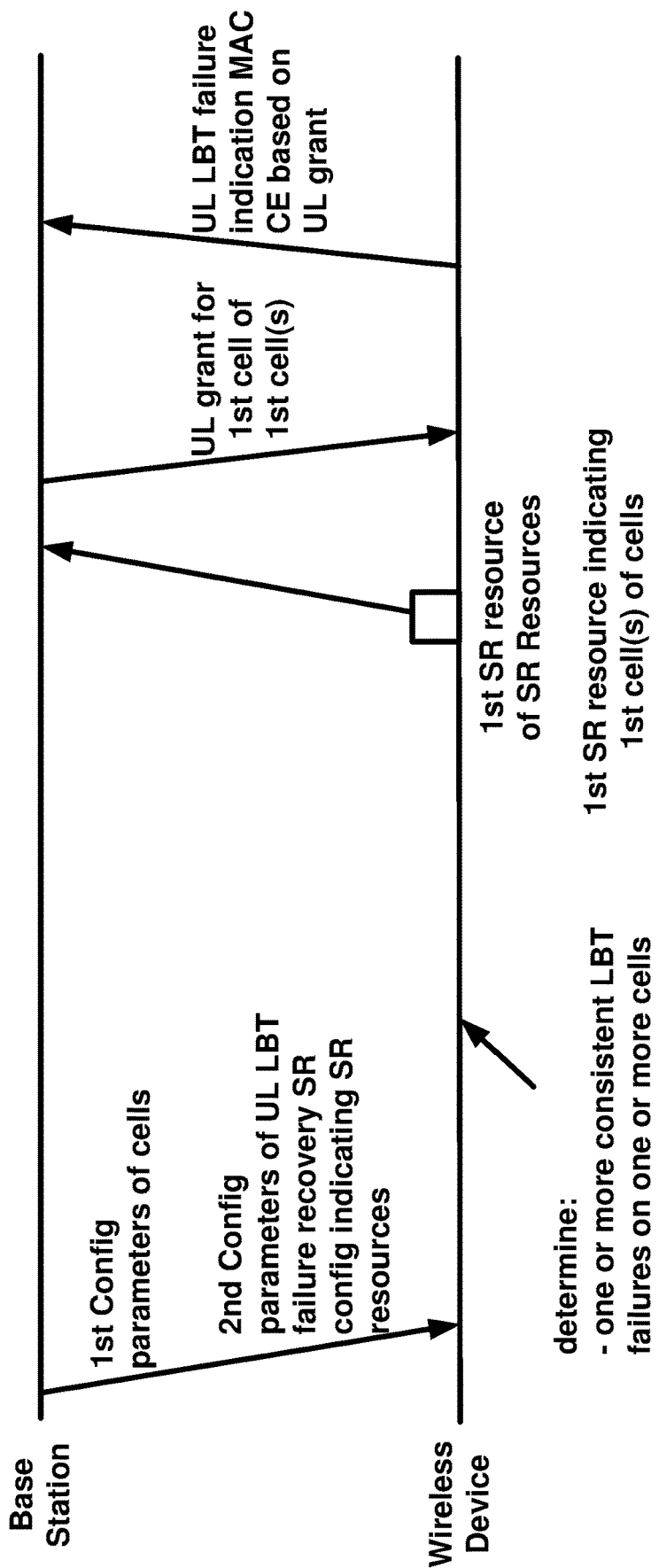
FIG. 24 shows an example process in accordance with several of various embodiments of the present disclosure.

In an example embodiment as shown in FIG. 24, based on the consistent uplink LBT failures on the one or more cells, the wireless device may transmit the scheduling request signal via a first resource of the plurality of resources indicated by the scheduling request configuration. The transmitting the scheduling request may be based on an uplink control channel (e.g., PUCCH) on a primary cell or a secondary cell configured with uplink control channel (e.g., PCell or PSCell). In an example embodiment, the first resource may indicate a request for an uplink grant on one or more first cells of the plurality of cells. In an example, the first resource may have a first position in a first plurality of resources of the plurality of resources. For example, the first resource may be the earliest resource in every K consecutive resource. The base station may receive the scheduling request signal via the first resource and may determine the one or more first cells of the plurality of cells based on receiving the scheduling request signal via the first resource.

The wireless device may receive an uplink grant for a first cell of the one or more first cells based on the transmitting the scheduling request signal via the first resource of the plurality of resources. The wireless device may transmit an uplink LBT failure indication MAC CE based on the uplink grant, wherein the uplink failure indication MAC CE may indicate the consistent uplink LBT failures on the one or more cells/BWPs/LBT subbands.

Figure 25:
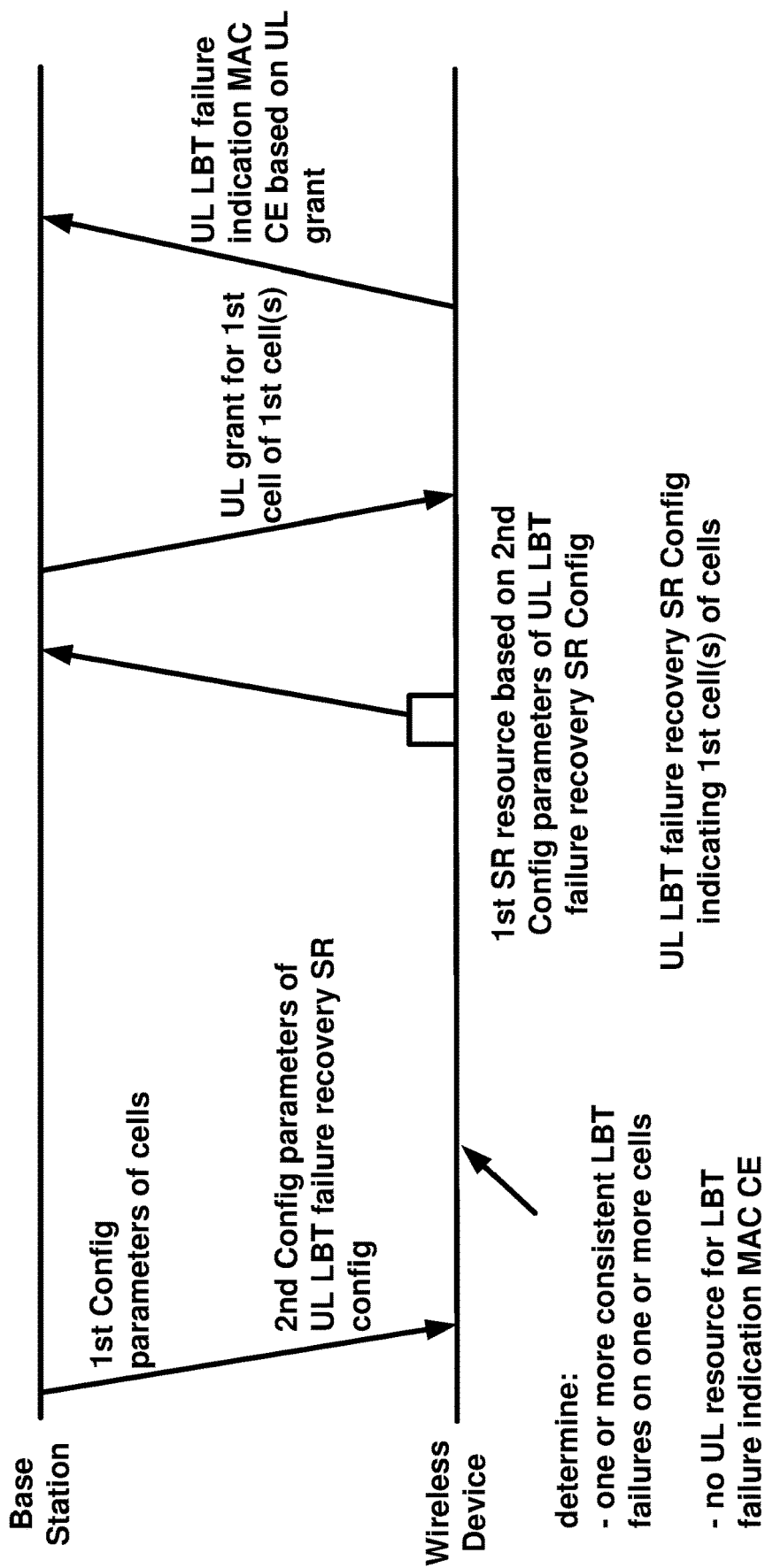
FIG. 25 shows an example process in accordance with several of various embodiments of the present disclosure.

In an example embodiment as shown in FIG. 25, based on the consistent uplink LBT failures on the one or more cells/BWPs/LBT subbands, the wireless device may transmit the scheduling request signal based on the second configuration parameters of the uplink LBT failure recovery scheduling request configuration, wherein the transmitting the scheduling request signal based on the second configuration parameters may indicate one or more first cells of the plurality of cells. The base station may receive the scheduling request signal via a resource associated with the second configuration parameters of the uplink LBT failure recovery scheduling request configuration and may determine the one or more first cells of the plurality of cells based on receiving the scheduling request signal via the resource associated with the second configuration parameter.

The wireless device may receive an uplink grant for a first cell of the one or more first cells based on the transmitting the scheduling request signal via the resource associated with the second configuration parameters of the uplink LBT failure recovery scheduling request configuration.

In an example, the size of the uplink grant may be based on the scheduling request being based on the transmitted scheduling request being based on the uplink LBT failure recovery scheduling request configuration. For example, the size of the uplink grant may be equal to or larger than a size of an uplink LBT failures indication MAC CE of a first format. The first format may be, for example, a long format. In an example, the wireless device may transmit a second scheduling request wherein the second scheduling request is associated with a scheduling request configuration that is not associated with recovery from consistent uplink LBT failures. The wireless device may receive a second uplink grant based on transmitting the second scheduling request wherein the size of the second uplink grant may or may not be larger than a size of an uplink LBT failures indication MAC CE of a first format and/or the size of the second uplink grant may be larger than or equal to a size of a buffer status report MAC CE.

The wireless device may transmit an uplink LBT failure indication MAC CE based on the uplink grant, wherein the uplink failure indication MAC CE may indicate the consistent uplink LBT failures on the one or more cells. In an example, the wireless device may transmit a transport block based on the uplink grant, wherein the transport block comprises the uplink LBT failure indication MAC CE. In an example, a subheader associated with the uplink LBT failure indication MAC CE may comprise an LCID indicating the uplink LBT failure indication MAC CE. In an example, the LCID may be one of the first LCID or the second LCID based on the uplink LBT failure indication having a short format or a long format.

In an example, the LBT failure indication MAC CE may indicate the consistent LBT failures on one or more second cells comprising the one or more cells. The one or more second cells may comprise the one or more cells and one or more other cells for which the consistent LBT failure is triggered after starting the scheduling request process (e.g., after transmitting a first scheduling request signal of one or more scheduling request signals of a scheduling request process for LBT failure recovery). In an example, the LBT failure indication MAC CE may indicate consistent LBT failures of one or more bandwidth parts of the one or more second cells. In an example, the LBT failure indication MAC CE may indicate consistent LBT failures of one or more sub-bands of the one or more bandwidth parts of the one or more second cells.

Figure 26:
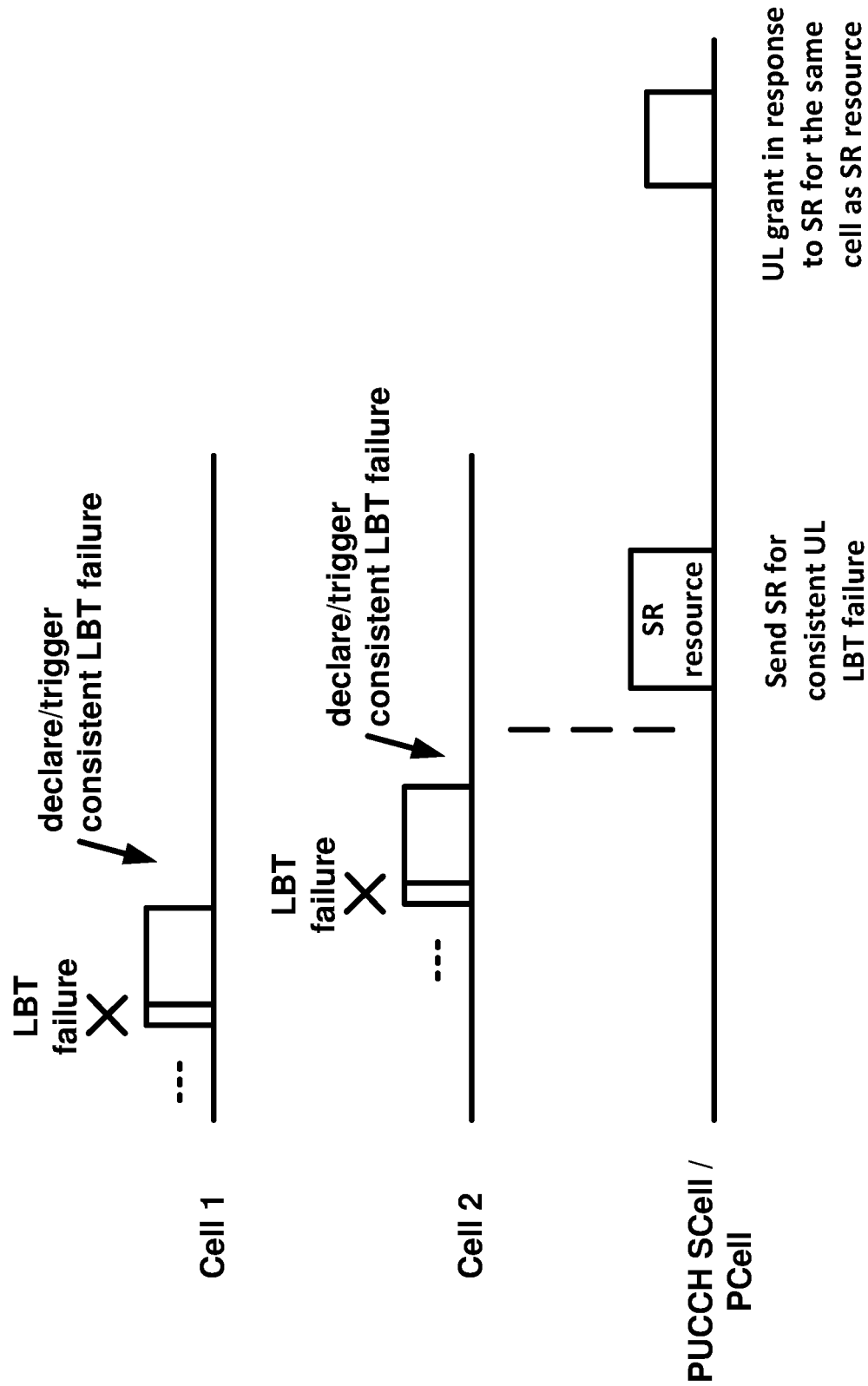
FIG. 26 shows an example process in accordance with several of various embodiments of the present disclosure.
Figure 27:
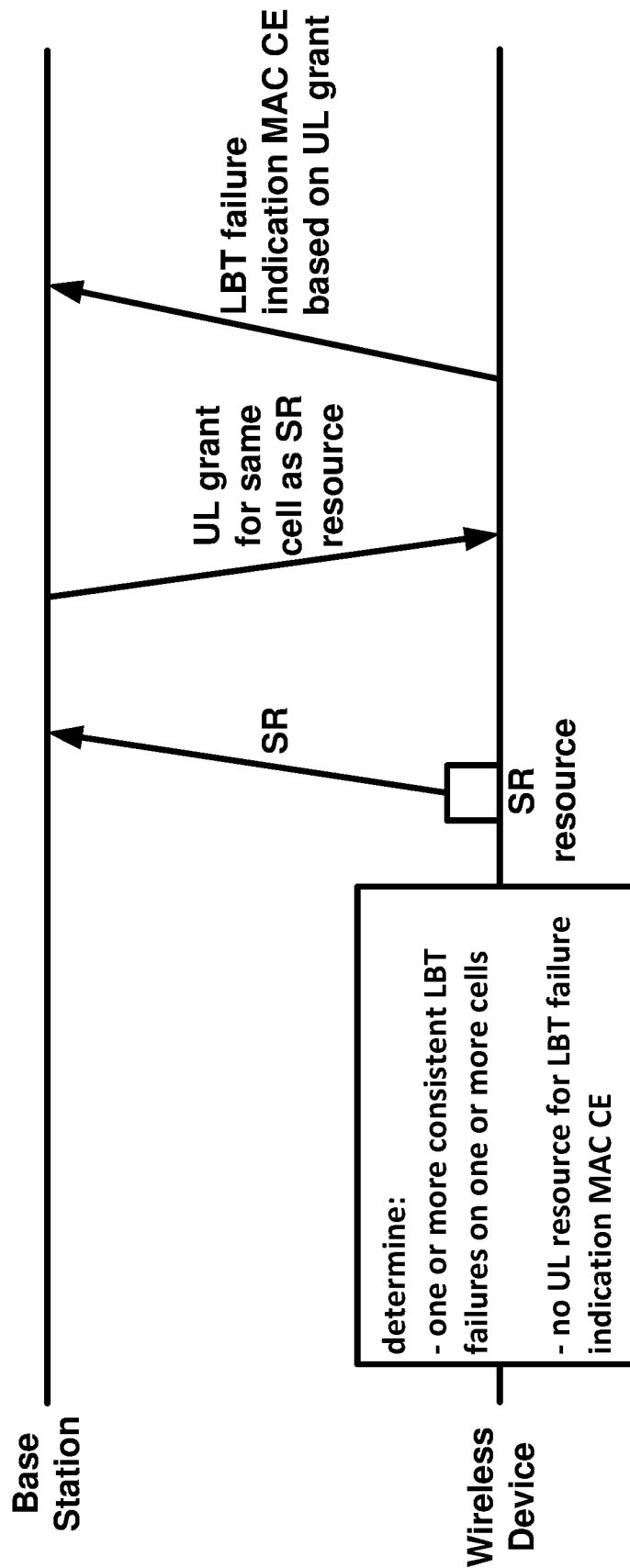
FIG. 27 shows an example process in accordance with several of various embodiments of the present disclosure.

In an example embodiment as shown in FIG. 26 and FIG. 27, the or more first cells (e.g., indicated by the scheduling request resource or scheduling request configuration used for transmission of the scheduling request signal) may comprise the cell on which the scheduling request signal is transmitted. For example, the base station may determine that the cell on which the scheduling request is transmitted may not be among the cells that have consistent uplink LBT failures.

In an example, the first cell on which the uplink grant is received, in response to the transmission of the scheduling request, may be the cell on which the scheduling request signal is transmitted. The base station may determine that the cell on which the wireless device transmits the scheduling request may not be among the cells that have consistent uplink LBT failures and may transmit the uplink grant to the wireless device for the cell on which the wireless device transmits the scheduling request signal.

In an example, the first cell on which the uplink grant is received, in response to the transmission of the scheduling request, may be determined based on the cell that the scheduling request signal is transmitted. In an example, the cell on which the scheduling request is transmitted may be associated with a cell that the uplink grant is transmitted. In an example, the association between the cell on which the scheduling request is transmitted and the cell on which an uplink grant is expected may be configurable (e.g., by RRC). The wireless device may receive configuration parameters indicating the association between the cell on which the scheduling request is transmitted and the cell on which the uplink grant is expected/received.

In an example, the one or more first cells or the first cell of the one or more first cells for which the uplink grant is received may not be among the one or more cells with consistent uplink LBT failures (e.g., may not have consistent uplink failures).

Figure 29:
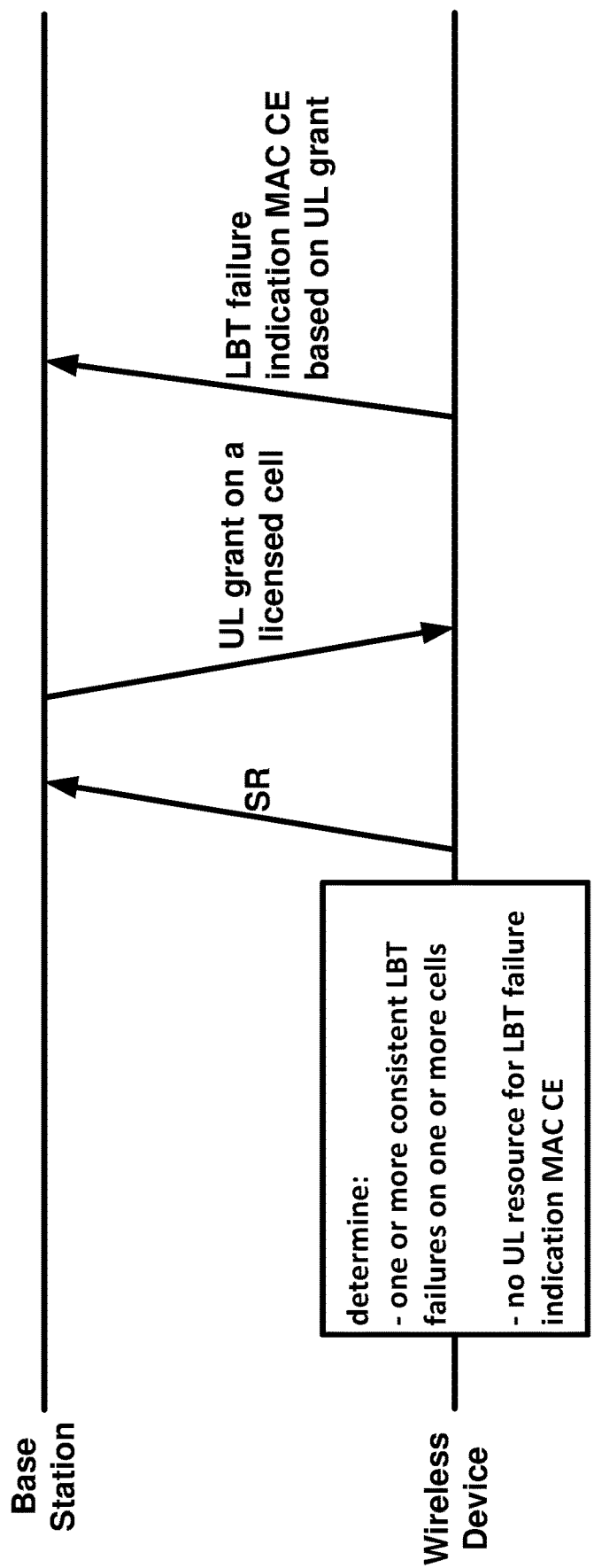
FIG. 29 shows an example process in accordance with several of various embodiments of the present disclosure.

In an example embodiment as shown in FIG. 29, the one or more first cells may comprise one or more licensed cells. The one or more first cells may comprise one or more licensed cells based on the plurality of cells configured for the wireless device comprising at least one licensed cell. The first cell of the one or more first cells on which the uplink grant is received may be a licensed cell. In an example, the licensed cell may be a primary cell or a primary secondary cell. In an example, the licensed cell may be a secondary cell.

Figure 28:
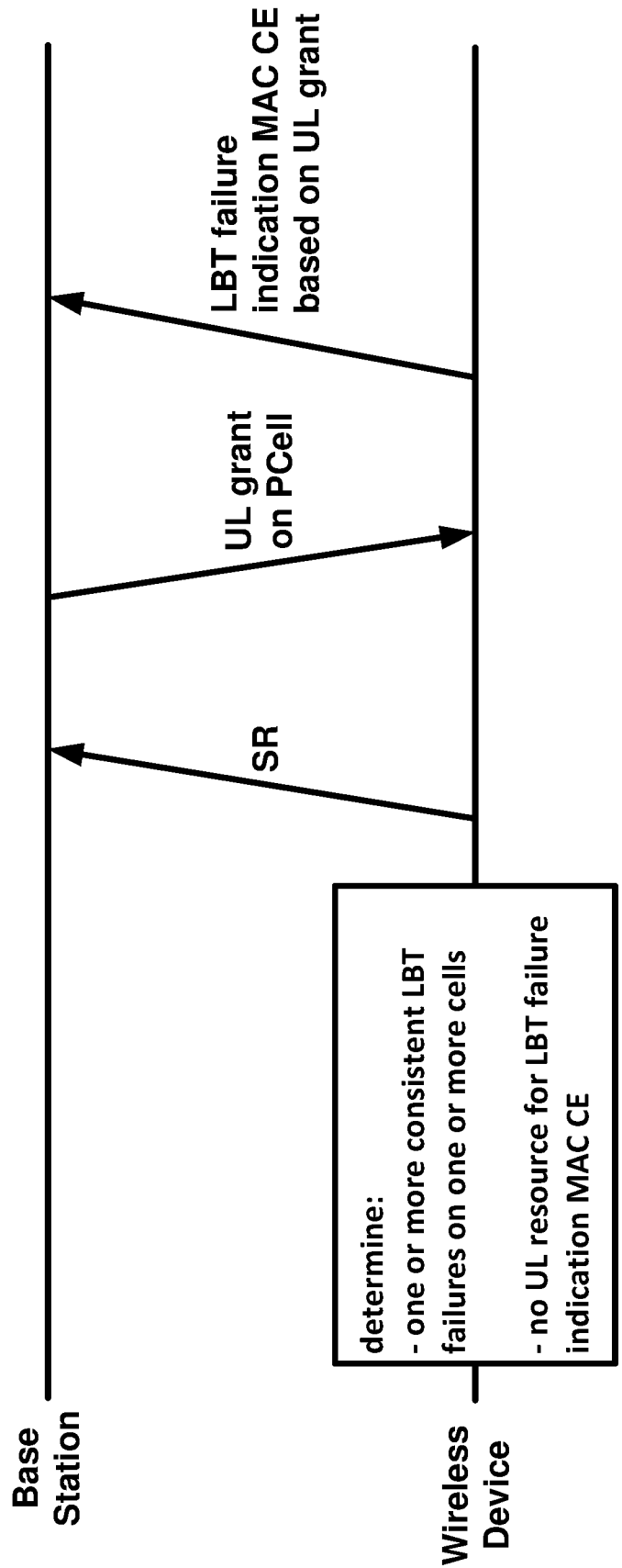
FIG. 28 shows an example process in accordance with several of various embodiments of the present disclosure.

In an example embodiment as shown in FIG. 28, the one or more first cells may comprise a primary cell or a primary secondary cell. The first cell of the one or more first cells on which the uplink grant is received may be the primary cell or the primary secondary cell.

In an example, the second configuration parameters of scheduling request for consistent uplink LBT recovery may be a multi-bit scheduling request wherein a scheduling request signal indicates a plurality of bits. The plurality of bits may indicate the one or more first cells that the wireless device may expect to receive the uplink grant.

Figure 30:
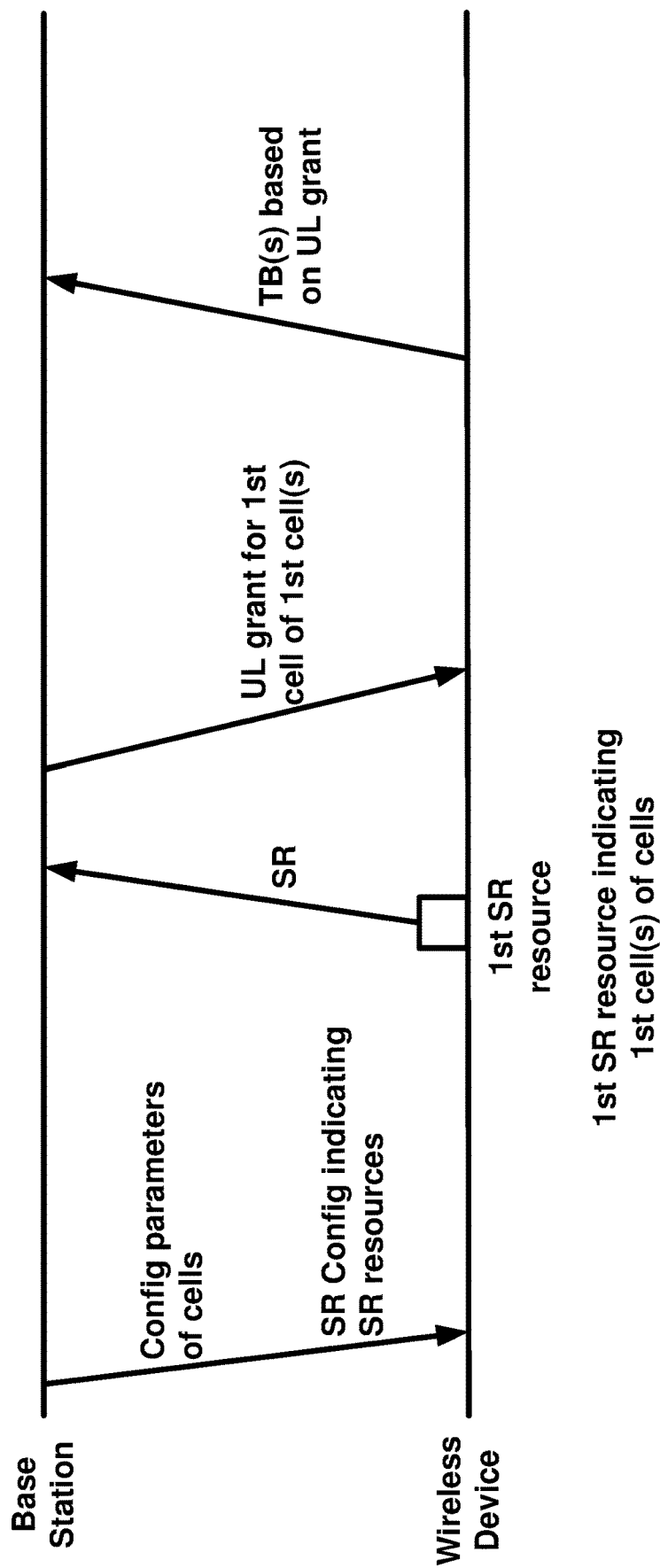
FIG. 30 shows an example process in accordance with several of various embodiments of the present disclosure.

In an example embodiment as shown in FIG. 30, the scheduling request configuration parameters may indicate a plurality of resources. The wireless device may transmit a scheduling request signal via a first resource of the plurality of resources, wherein the first resource may indicate request for an uplink grant on a cell of the one or more first cells of the plurality of cells. The base station may receive the scheduling request via the first resource and may determine the one or more first cells of the plurality of cells based on the transmitted scheduling request being via the first resource. Based on the transmitting the scheduling request being via the first resource, the wireless device may receive an uplink grant for a first cell of the one or more first cells. The wireless device may perform a transmission (e.g., transmit one or more transport blocks) based on the uplink grant.

Figure 31:
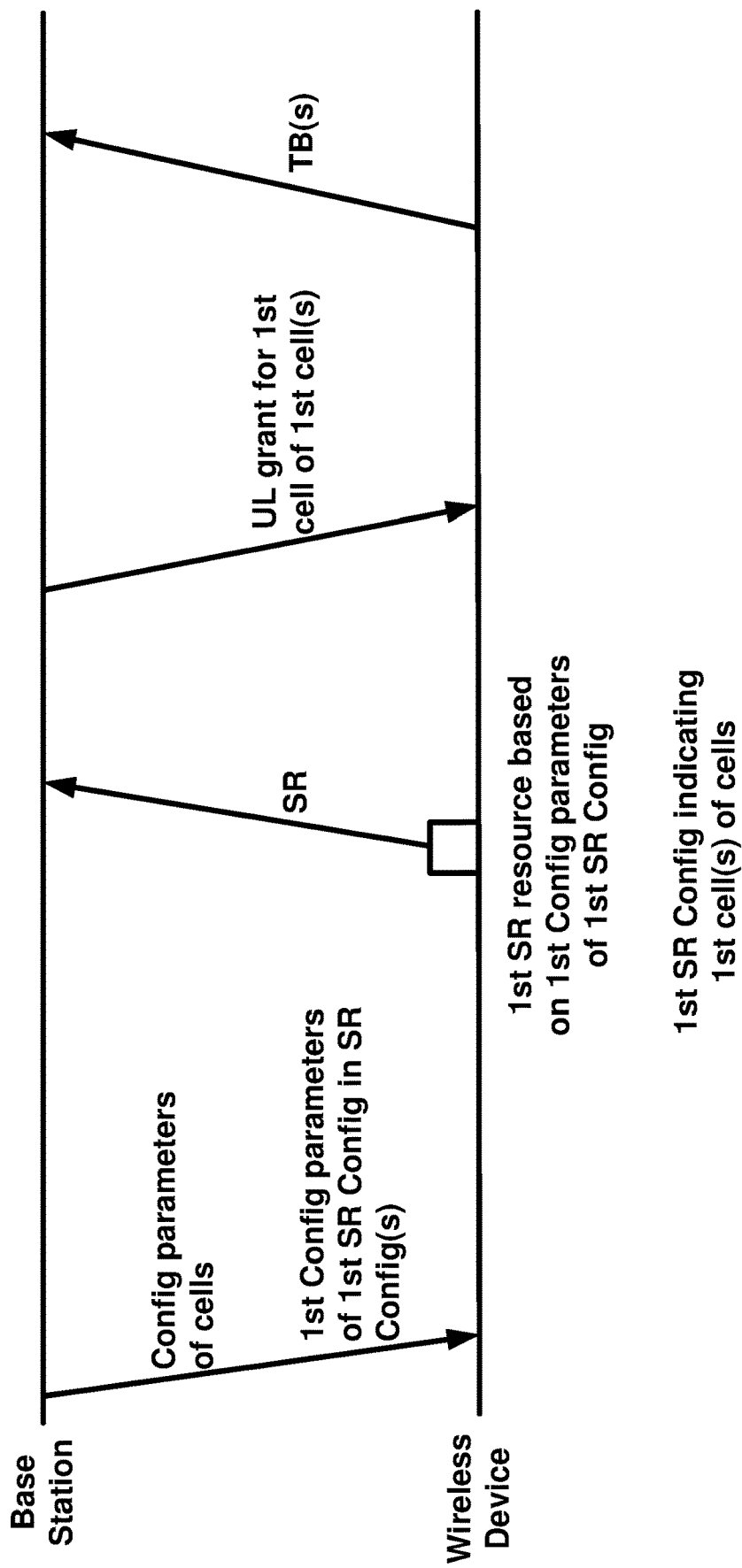
FIG. 31 shows an example process in accordance with several of various embodiments of the present disclosure.

In an example embodiment as shown in FIG. 31, the wireless device may receive first configuration parameters of a first scheduling request configuration in one or more scheduling request configurations. The wireless device may transmit a scheduling request signal based on the first configuration parameters of the first scheduling request configuration. The transmitting the scheduling request signal based on the first configuration parameters may indicate one or more first cells of the plurality of cells. The transmitting the scheduling request signal based on the first configuration parameters may indicate request for an uplink grant for one or more first cells of the plurality of cells. The base station may determine the one or more first cells of the plurality of cells based on the transmitted scheduling request being based on the first configuration parameters. Based on the transmitted scheduling request being based on the first configuration parameters of the first scheduling request configuration, the wireless device may receive an uplink grant for a first cell of the one or more first cells of the plurality of cells. The wireless device may perform a transmission (e.g., transmit one or more transport blocks) based on the uplink grant.

Figure 32:
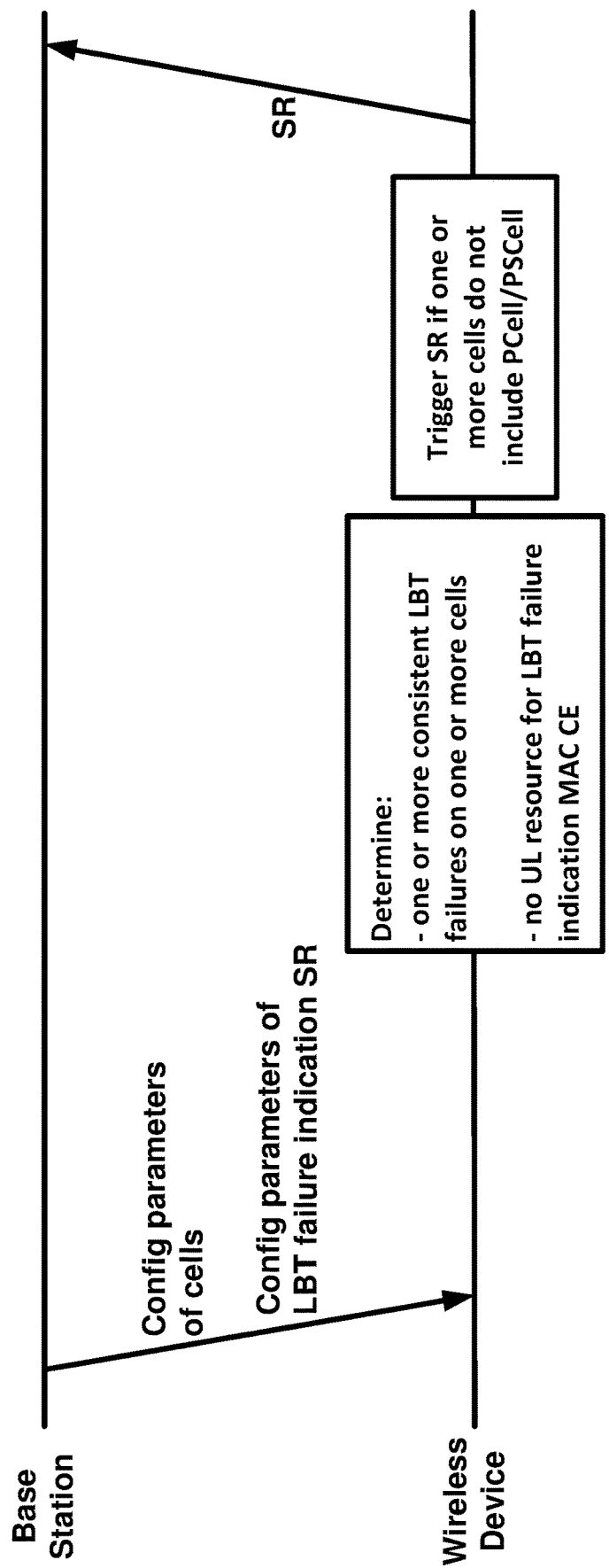
FIG. 32 shows an example process in accordance with several of various embodiments of the present disclosure.

In an example embodiment as shown in FIG. 32, a wireless device may determine one or more consistent LBT failures on one or more cells. The wireless device may determine that no uplink resource is available for transmission of an LBT failure indication MAC CE to indicate the one or more consistent LBT failures on the one or more cells and/or one or more consistent LBT failures on one or more bandwidth parts of the one or more cells and/or one or more consistent LBT failures on one or more LBT subbands of the one or more bandwidth parts of the one or more cells. Based on the one or more cells comprising a PCell and/or PSCell or the one or more cells not comprising the PCell and/or PSCell, the wireless device may trigger or not trigger a scheduling request.

The wireless device may trigger a scheduling request based on the determination of consistent LBT failures on the one or more cells, the determination of no uplink resource for transmission of an LBT failure indication MAC CE and determination that the one or more cells do not comprise a PCell and/or PSCell (e.g., the one or more cells only comprising secondary cells). The wireless device may transmit a scheduling request signal via a scheduling request resource. The wireless device may receive configuration parameters of scheduling request indicating a plurality of scheduling request resources comprising the scheduling request resource. Based on the transmission of the scheduling request signal, the wireless device may receive an uplink grant indicating uplink resources. The wireless device may transmit the LBT failure indication MAC CE based on the uplink resources indicated by the uplink grant.

Based on the determination that the one or more cells with consistent uplink LBT failure comprising a PCell and/or a PSCell (e.g., a PCell and/or PSCell and one or more secondary cells), the wireless device may not trigger a scheduling request. The wireless device may switch from a first BWP of the PCell/PSCell to a second BWP of the PCell/PSCell, as an active BWP, based on determining consistent LBT failures on the PCell/PSCell. The wireless device may start a random access process on the second BWP of the PCell/PSCell after switching to the second BWP. In an example, the random access in the second BWP may be a four-step random access. In an example, the random access in the second BWP may be a two-step random access process.

In an example and with a four-step random access process in the second BWP, the wireless device may transmit a random access preamble and may receive a random access response (RAR) comprising an uplink grant indicating uplink resources. The wireless device may transmit the LBT failures indication MAC CE indicating the consistent uplink LBT failures on the one or more cells based on the uplink resources indicated by the uplink grant of the RAR. In an example, the wireless device may transmit a transport block comprising the LBT failure indication MAC CE. In an example, the wireless device may transmit the LBT failure indication MAC CE based on Msg3 of the random access process. In an example and for a two-step random access process, the wireless device may transmit the LBT failure indication MAC CE based on MsgA.

In an example embodiment, a wireless device may receive one or more messages, from a base station, comprising: first configuration parameters of a plurality of cells; and second configuration parameters of an uplink LBT failure recovery scheduling request configuration indicating a plurality of resources. Based on consistent uplink LBT failures on one or more cells of the plurality of cells, the wireless device may transmit a scheduling request via a first resource of the plurality of resources, wherein the first resource indicates request for an uplink grant on one or more first cells of the plurality of cells. The base station may determine the one or more first cells based on the first resource used for transmission of the scheduling request. The wireless device may receive, based on the transmitting the scheduling request, an uplink grant for a first cell of the one or more first cells. The wireless device may transmit an uplink LBT failures indication MAC CE, based on the uplink grant, indicating the consistent uplink LBT failures on the one or more cells.

In an example embodiment, a wireless device may receive one or more messages, from a base station, comprising: first configuration parameters of a plurality of cells; and second configuration parameters of an uplink LBT failure recovery scheduling request configuration. Based on consistent uplink LBT failures on one or more cells of plurality of cells, transmitting a scheduling request based on the second configuration parameters, wherein the transmitted scheduling request being based on the second configuration parameters indicates one or more first cells. The base station may determine the one or more first cells based on the transmitted scheduling request being based on the second configuration parameters. The wireless device may receive, based on the transmitted scheduling request being based on the second configuration parameters, an uplink grant for a first cell of the one or more first cells of the plurality of cells. The wireless device may transmit an uplink LBT failures indication MAC CE, based on the uplink grant, indicating the consistent uplink LBT failures on the one or more cells.

In an example, the one or more first cells may comprise the cell on which the scheduling request is transmitted. In an example, the first cell, for which the wireless device receives the uplink grant, may be the cell on which the scheduling request is transmitted. The cell on which the scheduling request is transmitted may be a primary cell or a secondary cell configured with uplink control channel. In an example, the cell on which the scheduling request is transmitted indicates the one or more first cells. In an example, the transmitting the scheduling request may be via an uplink control channel.

In an example, the one or more first cells may not be among the one or more cells with consistent LBT failures. In an example, the one or more first cells may not have consistent uplink LBT failures.

In an example, the one or more first cells may comprise at least one licensed cell. In an example, the plurality of cells may comprise one or more licensed cells and the one or more first cells may comprise at least one licensed cell.

In an example, the one or more first cells may comprise a primary cell (PCell) or a primary secondary cell (PSCell). In an example, the first cell of the one or more first cells may be a PCell or a PSCell.

In an example, the wireless device may further determine/declare/trigger the consistent LBT failures on the one or more cells of the plurality of cells. In an example, the determining the consistent LBT failures may comprise counting a number of uplink LBT failures; and the number reaching a first threshold. In an example, the one or more messages comprises a parameter indicating the first threshold. In an example, the determining the consistent LBT failures may comprise starting a timer based on an indication of uplink LBT failure (e.g., from the physical layer) and resetting a counter based on the timer expiring.

In an example, the transmitting the scheduling request may be further based on an uplink resource not being available for transmission of an LBT failure indication MAC CE. In an example, uplink resources indicated by uplink grants for the one or more cells may not available resources.

In an example, the LBT failure indication MAC CE may indicate consistent LBT failure on one or more second cells comprising the one or more cells. In an example, the LBT failure indication MAC CE may indicate consistent LBT failure on one or more bandwidth parts of the one or more second cells. In an example, the LBT failure indication MAC CE may indicate consistent LBT failure on one or more sub-bands of the one or more bandwidth parts of the one or more second cells.

In an example, the second configuration parameters of the uplink LBT failure recovery scheduling request configuration may comprise an identifier indicating that the scheduling request configuration is for uplink LBT failure recovery.

In an example, the second configuration parameters of the uplink LBT failure recovery scheduling request configuration may comprise one or more parameters indicating radio resources for transmission of the scheduling request signals. In an example, the one or more parameters may comprise a periodicity and offset parameter, a resource parameter indicating an identifier of the PUCCH resource in which the wireless device may send the scheduling request, a scheduling resource identifier indicating an identifier of the scheduling request configuration.

In an example, the first resource used for transmission of the scheduling request may indicate one or more first cells based on a position of the first SR resource in a plurality of SR resources.

In an example, the plurality of cells comprise a plurality of secondary cells. In an example, the plurality of cells may comprise a primary cell and one or more secondary cells. In an example, the uplink grant may indicate uplink resources for transmission of a transport block comprising the uplink LBT failures indication MAC CE. In an example, a subheader associated with the uplink LBT failures indication MAC CE may comprise a logical channel identifier (LCID) indicating the uplink LBT failures indication MAC CE. In an example, the LCID may be a first LCID or a second LCID based on the uplink LBT failures indication MAC CE having a short format or a long format.

In an example, the transmitting the scheduling request may be based on an uplink control channel on a primary cell or a secondary cell configured with uplink control channel.

In an example, a size of the uplink grant may be based on the transmitted scheduling request being based on the uplink LBT failure recovery scheduling request configuration. In an example, the size of the uplink grant may be equal to or larger than a size of an uplink LBT failures indication MAC CE of a first format. In an example, the first format may be a long format.

In an example, the scheduling request may be a multi-bit SR indicating a plurality of bits, the plurality of bits indicating the one or more first cells.

In an example embodiment, a wireless device may receive one or more messages from a base station comprising: configuration parameters of a plurality of cells; and scheduling request configuration parameters indicating a plurality of resources. The wireless device may transmit a scheduling request via a first resource of the plurality of resources, wherein the first resource may indicate a request for an uplink grant on a cell of one or more first cells of the plurality of cells. The base station may determine one or more first cells of the plurality of cells based on transmitted scheduling resource being via the first resource. The wireless device may receive, based on the transmitting the scheduling request via the first resource, an uplink grant for a first cell of the one or more first cells. The wireless device may transmit a transport block based on the uplink grant.

In an example embodiment, a wireless device may receive one or more messages from a base station comprising: configuration parameters of a plurality of cells; and first configuration parameters of a first scheduling request configuration in one or more scheduling request configurations. The wireless device may transmit a scheduling request based on the first configuration parameters, wherein the first scheduling request configuration indicates one or more first cells of the plurality of cells. The base station may determine one or more first cells of the plurality of cells based on the transmitted scheduling request being based on the first configuration parameters. The wireless device may receive, based on the transmitted scheduling request being based on the first configuration parameters, an uplink grant for a first cell of one or more first cells of the plurality of cells. The wireless device may transmit a transport block based on uplink grant.

In an example, a wireless device may transmit, based on consistent LBT failures on one or more cell, a scheduling request. The wireless device may receive an uplink grant for transmission of a transport block. The wireless device may cancel a trigger for the scheduling request based on the transport block comprising a MAC CE indicating the consistent LBT failures on the one or more cells, otherwise, the wireless device may not cancel the trigger.

In an example embodiment, a wireless device may determine consistent LBT failures on one or more cells. The wireless device may determine that no uplink resources are available for transmission of a LBT failure indication MAC CE indicating the consistent LBT failures. The wireless device may trigger a scheduling request based on whether the one or more cells comprising a primary cell or not.

Figure 33:
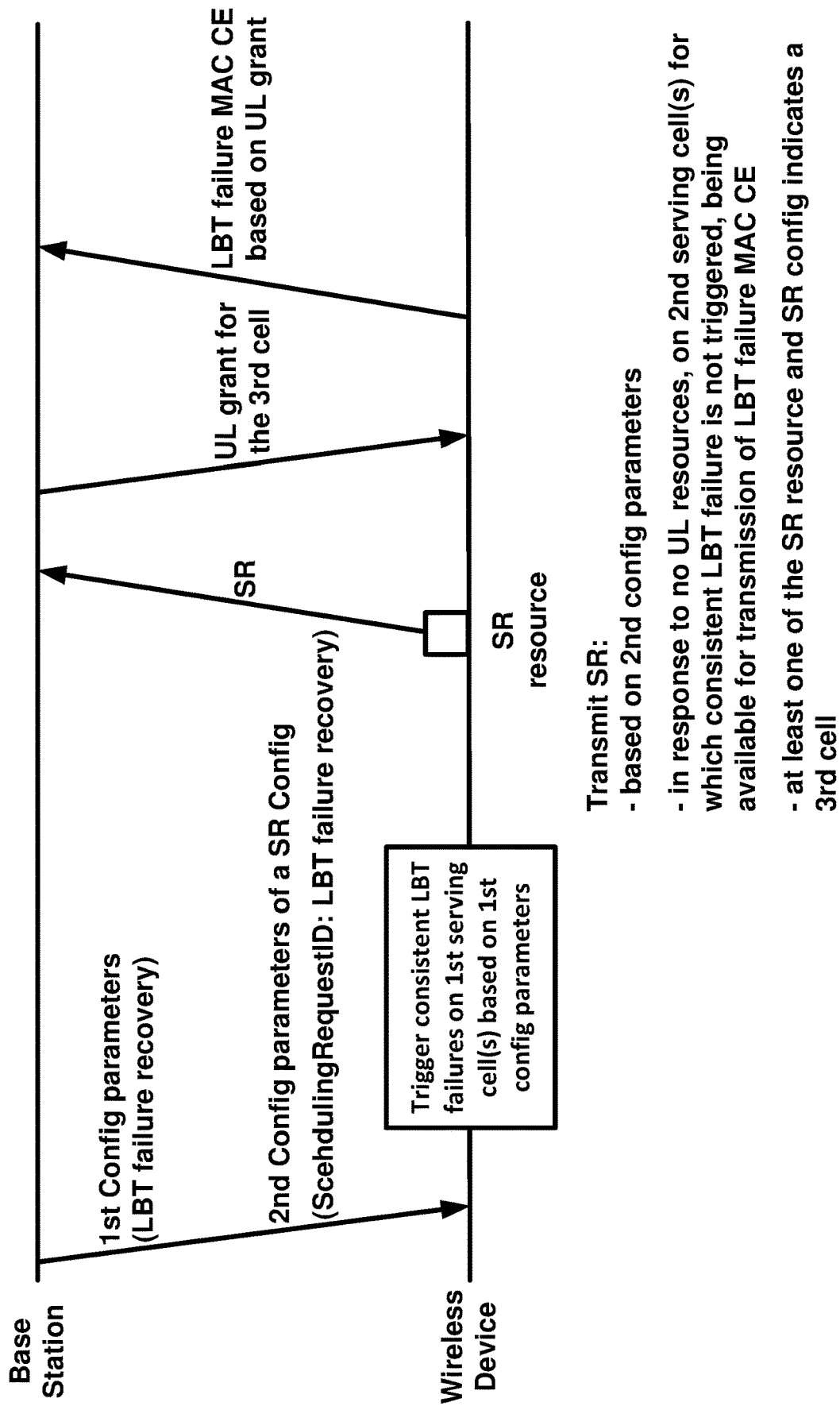
FIG. 33 shows an example consistent listen-before-talk (LBT) failure recovery process in accordance with several of various embodiments of the present disclosure.

In an example embodiment as shown in FIG. 33, a wireless device may receive, from one or more base stations, configuration parameters comprising first configuration parameters and second configuration parameters. The wireless device may receive one or more messages (e.g., one or more RRC messages) comprising the configuration parameters.

The first configuration parameters may be for LBT failure recovery. In an example, the LBT failure recovery configuration parameters may be bandwidth part (BWP) specific and may be separately configured for different BWPs. In an example, the configuration parameters of a BWP (e.g., a BWP of a cell in unlicensed or shared spectrum) may comprise associated LBT failure recovery configuration parameters. In an example, the first configuration parameters may comprise a first parameter indicating a first number of LBT failure instances (e.g., a maximum count value of LBT failure instances). The first number may be a threshold for an LBT counter and may be used for determining consistent LBT failure for a BWP. The wireless device may determine after how many consistent uplink LBT failure events the UE triggers uplink LBT failure recovery for a cell (e.g., for the active BWP of the cell). An LBT counter variable may be defined for a cell (e.g., an active BWP of the cell) and the wireless device may increment the LBT counter by based on an LBT failure of an LBT procedure performed for an uplink transmission (e.g., based on receiving a notification of an LBT failure from lower layers) on the cell (e.g., on the active BWP of the cell). The wireless device may trigger a consistent LBT failure for a cell based on an LBT counter, associated with the cell, reaching the first number. The first configuration parameters may further comprise a second parameter indicating a value of an LBT failure detection timer. The wireless device may use the LBT failure detection timer for consistent uplink LBT failure detection for a cell (e.g., for the active BWP of the cell). The wireless device may start/restart the LBT failure detection timer of a cell (e.g., of the active BWP of the cell), with the configured value, based on an LBT failure of an LBT procedure performed for an uplink transmission (e.g., based on receiving a notification of an LBT failure from lower layers). The wireless device may reset the LBT counter based on the LBT failure detection timer expiring. In an example, the wireless device may reset the LBT counter in response to receiving an RRC reconfiguration message indicating reconfiguration of the LBT failure recovery configuration parameters.

The second configuration parameters may be for a scheduling request configuration. The second configuration parameters may comprise a scheduling request identifier of the scheduling request configuration. The configuration parameters may indicate that the scheduling request ID associated with the scheduling request is for LBT failure recovery. In an example, the wireless device may be configured with a plurality of scheduling request configurations and the configuration parameters may indicate the identifier of the scheduling request configuration, in the plurality of scheduling request configurations, that may be used by the wireless device for LBT failure recovery.

The wireless device may trigger consistent LBT failures for one or more first serving cells (e.g., one or more first serving cells of a plurality of serving cells configured for the wireless device). The wireless device may trigger the consistent LBT failures for the one or more first serving cells (e.g., active bandwidth parts of the one or more serving cells) based on the first configuration parameters. The wireless device may trigger the consistent LBT failures for the one or more first serving cells based on an LBT detection procedure. For example, an LBT counter may be defined for each cell (e.g., for an active bandwidth part of each cell) in the one or more first serving cells and the wireless device may trigger/determine consistent LBT failure for the cell based on the LBT counter for the cell (e.g., for the active bandwidth part of the cell) reaching a threshold (e.g., maximum count of LBT failure instances) configured for the cell (e.g., for active bandwidth part of the cell).

The wireless device my determine that that no uplink resources, on one or more second serving cells for which consistent LBT failure is not triggered, are available for transmission of an LBT failure MAC CE. The wireless device may determine that no uplink resources, on one or more second serving cells for which consistent LBT failure is not triggered, are available that may accommodate an LBT failure MAC CE plus its subheader as a result of a logical channel prioritization procedure. The wireless device may trigger a scheduling request based on the determination. The wireless device may transmit a scheduling request via a scheduling request resource. The transmission of the scheduling request and the determination of the scheduling request resource may be based on the scheduling request configuration configured for LBT failure recovery and using the second configuration parameters. At least one of the scheduling request configuration and the scheduling request resource may indicate one or more third serving cells comprising a third serving cell. The one or more third serving cells may be the serving cells that the wireless device expects to receive an uplink grant. In an example, the one or more third serving cells may be the serving cells that the wireless device expects to receive an uplink grant in response to determination of consistent LBT failure and transmission of the scheduling request for consistent LBT failure. For example, the one or more third serving cells may comprise a cell (e.g., the scheduling request resource) via which the scheduling request is transmitted. For example, the one or more third serving cells may be determined based on the cell used for transmission of the scheduling request (e.g., the scheduling request that indicates the consistent LBT failure). In an example, the one or more third serving cells may comprise licensed cells (e.g., cells in the licensed spectrum). In an example, the one or more third serving cells may comprise a PCell or a PSCell.

In response to the transmission of the scheduling request via the scheduling request resource that is associated with the scheduling request configuration configured for LBT failure recovery, the base station may determine the one or more third serving cells based on at least one of the scheduling request resource and the scheduling request configuration. In an example, the one or more third serving cells may not have consistent LBT failure and/or consistent LBT failure may not be triggered for the one or more third serving cells. The wireless device may receive an uplink grant for the third serving cell in the one or more third serving cells. The uplink grant may comprise transmission parameters of a TB. The wireless device may multiplex the LBT failure MAC CE in the TB and may transmit the TB based on the transmission parameters indicated by the uplink grant.

The LBT failure MAC CE may have one of a short format (e.g., one octet) and a long format (e.g., four octets) wherein the format used for the LBT failure MAC CE may be based on a number of serving cells configured for the wireless device. For example, if the number of serving cells configured for the wireless device is less than or equal to eight, the short LBT Failure MAC CE format may be used and if the number of serving cells configured for the wireless device is more than eight, a long format MAC CE may be used. The logical channel identifier (LCID) for the short format LBT failure MAC CE may be a first LCID and the LCID for the long format LBT failure MAC CE may be a second LCID. The LBT failure MAC CE may comprise a plurality of bits and each bit may be associated with a serving cell. A first value (e.g., one) of the bit may indicate that consistent LBT failure is triggered for the corresponding serving cell. A second value (e.g., zero) of the bit may indicate that consistent LBT failure is not triggered for the corresponding serving cell.

Figure 34:
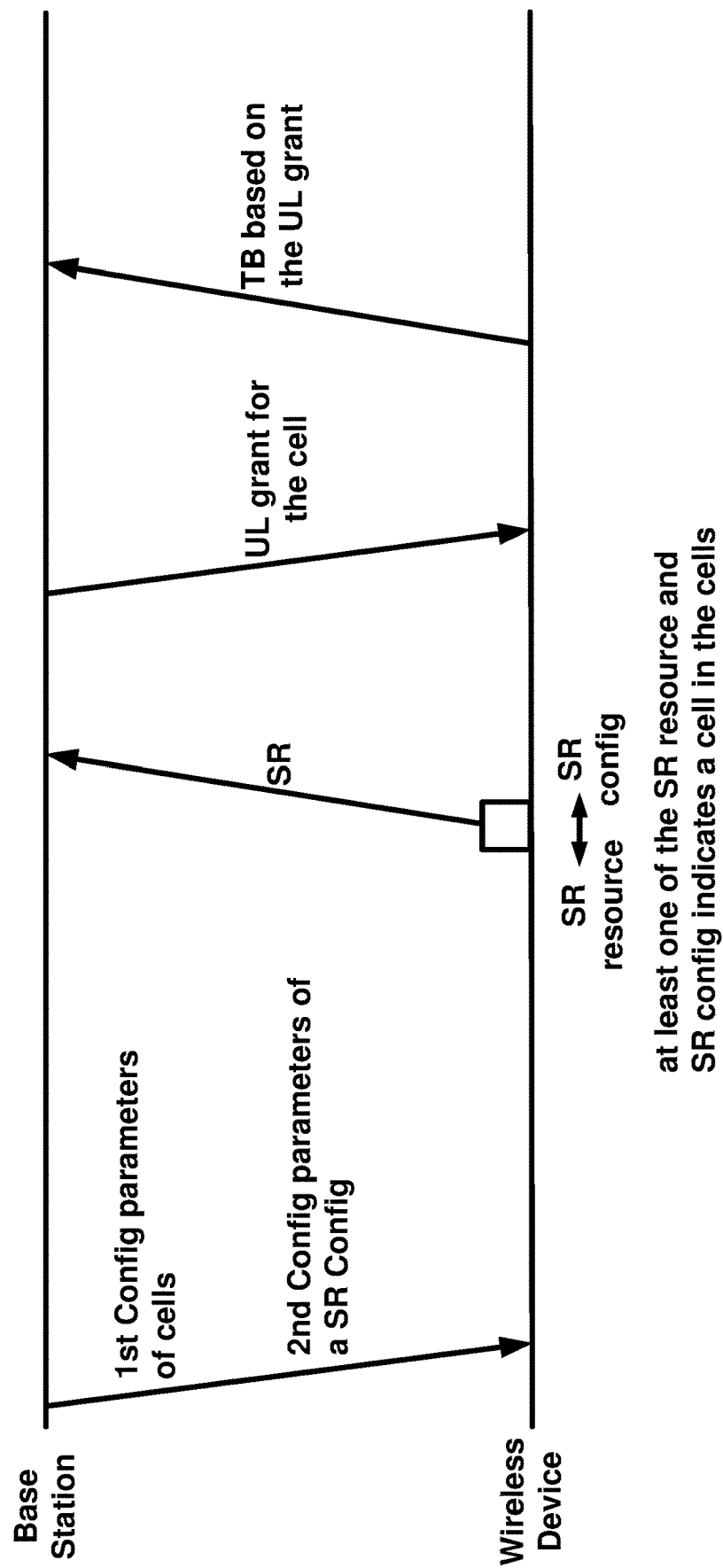
FIG. 34 shows an example consistent listen-before-talk (LBT) failure recovery process in accordance with several of various embodiments of the present disclosure.

In an example embodiment as shown in FIG. 34, a wireless device may receive one or more messages (e.g., RRC messages) comprising first configuration parameters of a plurality of cells and second configuration parameters of a scheduling request configuration. The wireless device may transmit a scheduling request via a radio resource that is associated with the scheduling request configuration. The radio resource may be on a serving cell that is configured with uplink control channel (e.g., a PCell/PSCell or a PUCCH SCell). At least one of the scheduling request configuration and the scheduling request resource may indicate one or more cells that the wireless device expects to receive an uplink grant. The base station may determine the one or more cells, that the wireless device expects to receive an uplink grant, based on at least the scheduling request resource and the scheduling request configuration. The wireless device may receive an uplink grant from the base station on a cell of the one or more cells. The uplink grant may comprise transmission parameters for transmission of a TB. The wireless device may transmit the TB based on the transmission parameters indicated by the uplink grant.

Figure 35:
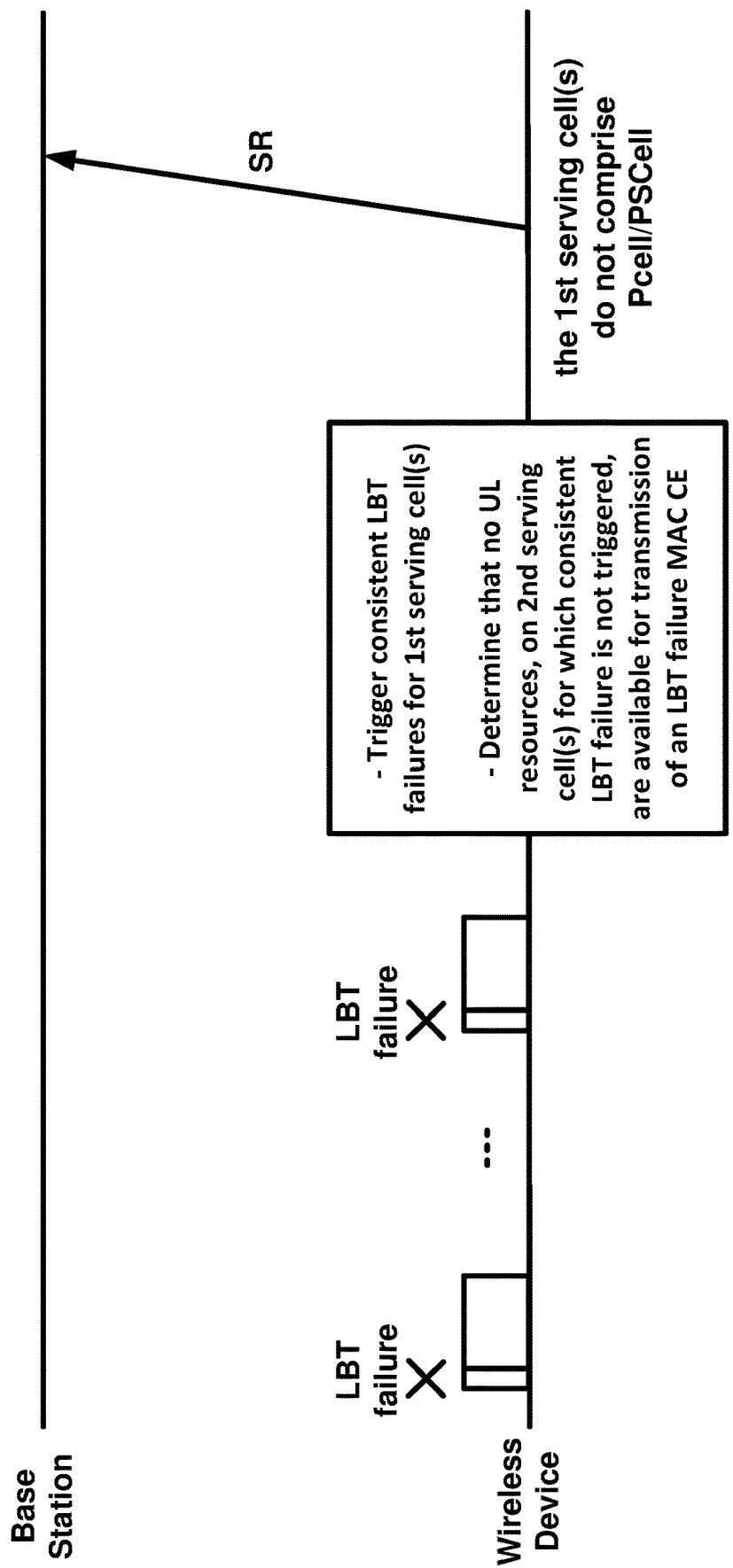
FIG. 35 shows an example consistent listen-before-talk (LBT) failure recovery process in accordance with several of various embodiments of the present disclosure.

In an example embodiment as shown in FIG. 35, a wireless device may trigger consistent LBT failures for one or more first serving cells (e.g., one or more active bandwidth parts of one or more first serving cells of a plurality of serving cells configured for the wireless device). The wireless device may trigger the consistent LBT failures for the one or more first serving cells based on an LBT detection procedure. For example, an LBT counter may be defined for each cell (e.g., for an active bandwidth part of each cell) in the one or more first serving cells and the wireless device may trigger/determine consistent LBT failure for the cell based on the LBT counter for the cell (e.g., for the active bandwidth part of the cell) reaching a threshold (e.g., maximum count of LBT failure instances) configured for the cell (e.g., for active bandwidth part of the cell). The wireless device my determine that that no uplink resources, on one or more second serving cells for which consistent LBT failure is not triggered, are available for transmission of an LBT failure MAC CE. The wireless device may determine that no uplink resources, on one or more second serving cells for which consistent LBT failure is not triggered, are available that may accommodate an LBT failure MAC CE plus its subheader as a result of a logical channel prioritization procedure. The wireless device may trigger a scheduling request based on the determination. The wireless device may transmit a scheduling request based on the one or more first serving cells, for which consistent LBT failure is triggered, not comprising a PCell/PSCell. The wireless device may receive an uplink grant and may transmit an LBT failure MAC CE based on the uplink grant. In an example, if the one or more first serving cells, for which consistent LBT failure is triggered, comprise the PCell/PSCell, the wireless device may not trigger/transmit the scheduling request and may transmit the LBT failure MAC CE based on an uplink grant received (e.g., included in a RAR message) based on a random access process (e.g., random access process initiated in response to triggering consistent LBT failure for PCell/PSCell) on the PCell/PSCell.

Figure 36:
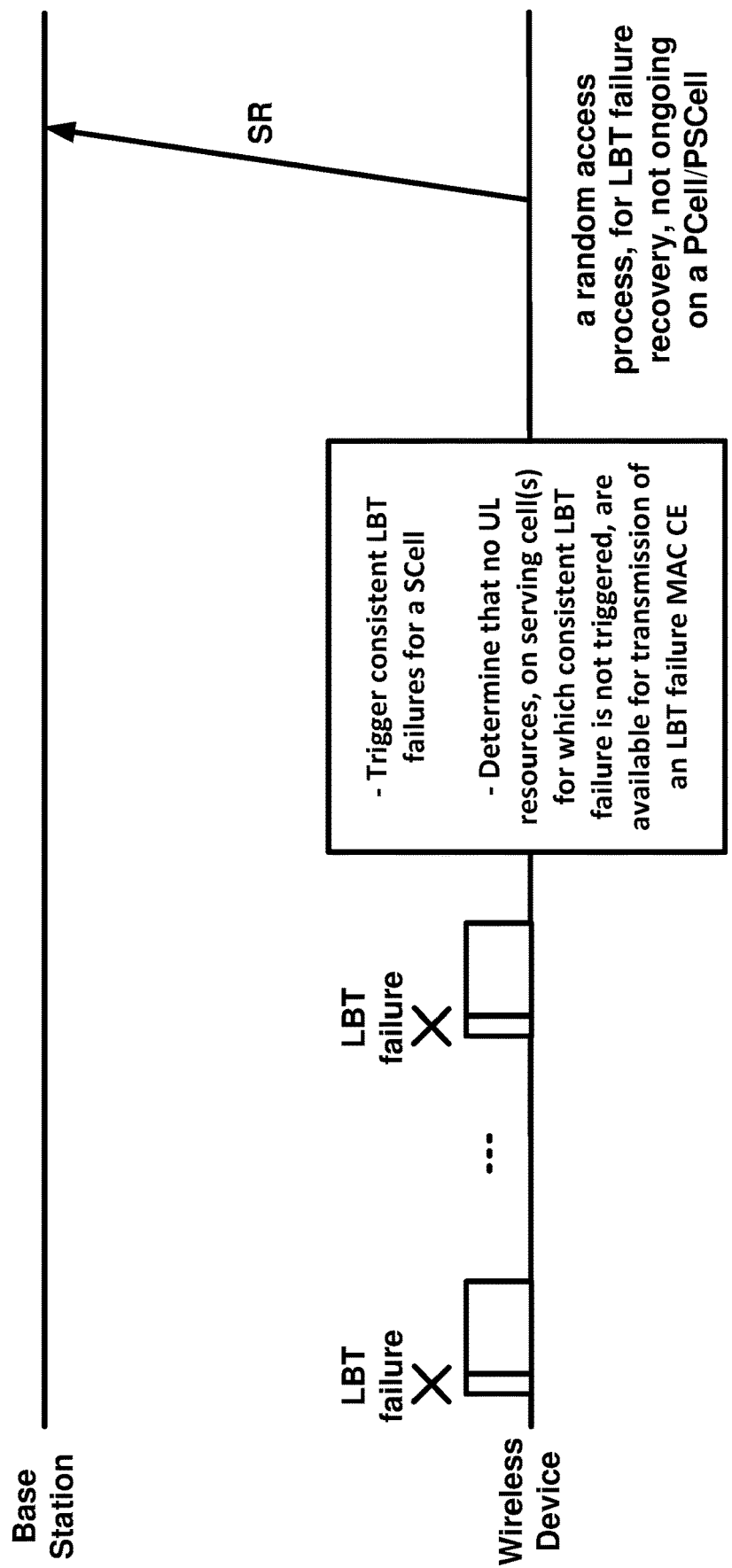
FIG. 36 shows an example consistent listen-before-talk (LBT) failure recovery process in accordance with several of various embodiments of the present disclosure.

In an example embodiment as shown in FIG. 36, the wireless device may trigger consistent LBT failures for a secondary cell (e.g., an active bandwidth parts of the secondary of a plurality of serving cells configured for the wireless device). The wireless device may trigger the consistent LBT failures for the secondary cell based on an LBT detection procedure. For example, an LBT counter may be defined for the secondary cell (e.g., for an active bandwidth part of the secondary cell) and the wireless device may trigger/determine consistent LBT failure for the secondary cell based on the LBT counter for the secondary cell (e.g., for the active bandwidth part of the secondary cell) reaching a threshold (e.g., maximum count of LBT failure instances) configured for the secondary cell (e.g., for active bandwidth part of the secondary cell). The wireless device my determine that that no uplink resources, on one or more second serving cells for which consistent LBT failure is not triggered, are available for transmission of an LBT failure MAC CE. The wireless device may determine that no uplink resources, on one or more serving cells for which consistent LBT failure is not triggered, are available that may accommodate an LBT failure MAC CE plus its subheader as a result of a logical channel prioritization procedure. The wireless device may trigger a scheduling request based on the determination. The wireless device may transmit a scheduling request based on a random access process, for LBT failure recovery, not ongoing on a PCell/PSCell. The wireless device may receive an uplink grant in response to transmission of scheduling request and may transmit an LBT failure recovery MAC CE based on the uplink grant. In an example, if a random access process is ongoing on the PCell/PSCell, the wireless device may not trigger/transmit the scheduling request and may transmit the LBT failure MAC CE based on an uplink grant received based on the random access process (e.g., included in the RAR received based on the random access process).

Figure 37:
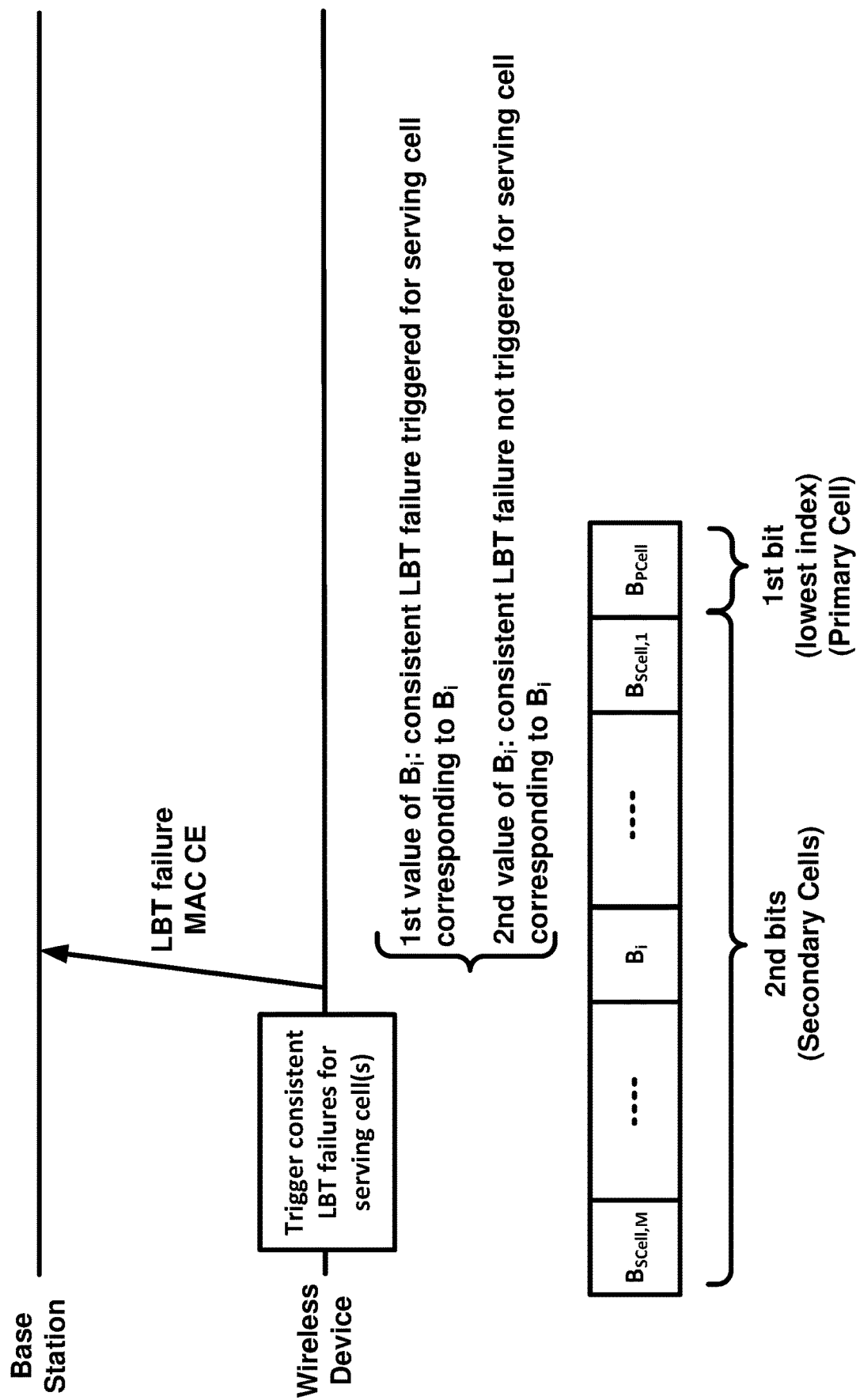
FIG. 37 shows an example consistent listen-before-talk (LBT) failure recovery process in accordance with several of various embodiments of the present disclosure.

In an example embodiment as shown in FIG. 37, a wireless device may trigger consistent LBT failures for one or more serving cells (e.g., one or more active bandwidth parts of one or more serving cells of a plurality of serving cells configured for the wireless device). The wireless device may trigger the consistent LBT failures for the one or more serving cells based on an LBT detection procedure. For example, an LBT counter may be defined for each cell (e.g., for an active bandwidth part of each cell) in the one or more serving cells and the wireless device may trigger/determine consistent LBT failure for the cell based on the LBT counter for the cell (e.g., for the active bandwidth part of the cell) reaching a threshold (e.g., maximum count of LBT failure instances) configured for the cell (e.g., for active bandwidth part of the cell). The wireless device may transmit an LBT failure MAC CE. The LBT failure MAC CE may be one of a short format (e.g., one octet) or of a long format (e.g., four octets). The wireless device may receive an uplink grant comprising transmission parameters for transmission of a TB and may multiplex the LBT failure MAC CE in the TB and using a logical channel prioritization procedure. The LBT failure MAC CE may comprise a plurality of bits. The plurality of bits may comprise a first bit and a second plurality of bits. The plurality of bits may be associated with a plurality of indexes. Each bit in the plurality of bits may be associated with a corresponding index. The first bit may be associated with a lowest index in the plurality of indexes (e.g., index 0) and may correspond to a primary cell (PCell or PSCell). The second plurality of bits may correspond to a second plurality of secondary cells and each bit in the second plurality of bits may be associated with a corresponding index. A first value (e.g., one) of a bit (e.g., the first bit or the second plurality of bits) in the plurality of bits may indicate that consistent LBT failure is triggered for a serving cell corresponding to the bit. A second value (e.g., zero) of a bit (e.g., the first bit or the second plurality of bits) in the plurality of bits may indicate that consistent LBT failure is not triggered for a serving cell corresponding to the bit. In an example, the wireless device may receive a DCI indicating switching an active bandwidth part of a cell, in the one or more cells, from a first bandwidth part (for which consist LBT failure is triggered) of the cell to a second bandwidth part of the cell.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 38:
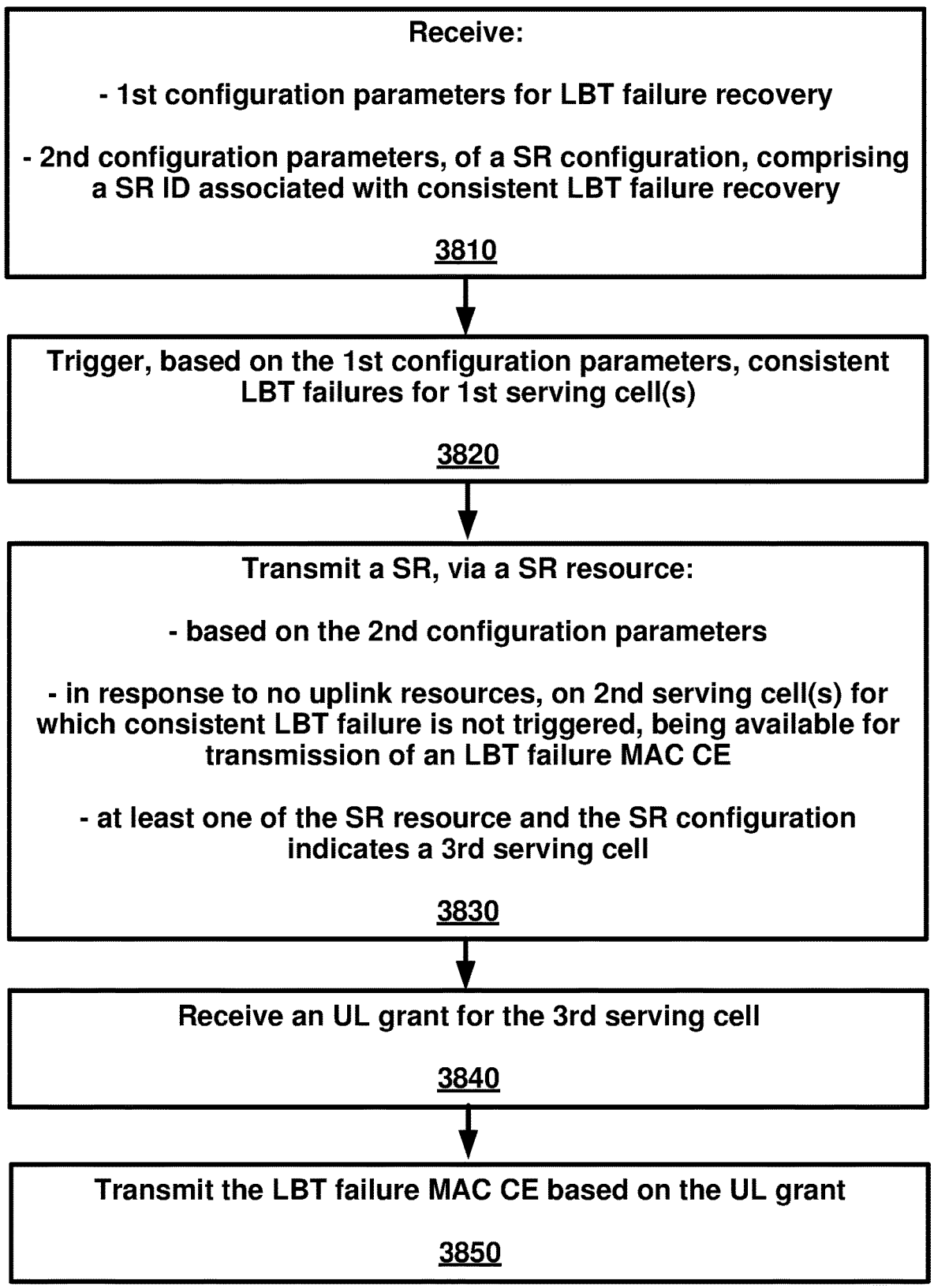
FIG. 38 shows an example flow diagram in accordance with several of various embodiments of the present disclosure.

FIG. 38 shows an example flow diagram in accordance with several of various embodiments of the present disclosure. At 3810, a wireless device may receive: first configuration parameters for listen-before-talk (LBT) failure recovery; and second configuration parameters, of a scheduling request configuration, comprising a scheduling request identifier associated with consistent LBT failure recovery. At 3820, the wireless device may trigger, based on the first configuration parameters, consistent LBT failures for one or more first serving cells. At 3830, the wireless device may transmit a scheduling request, via a scheduling request resource: based on the second configuration parameters; in response to no uplink resources, on one or more second serving cells for which consistent LBT failure is not triggered, being available for transmission of an LBT failure medium access control (MAC) control element (CE); and wherein at least one of the scheduling request resource and the scheduling request configuration may indicate a third serving cell. At 3840, the wireless device may receive an uplink grant for the third serving cell. At 3850, the wireless device may transmit the LBT failure MAC CE based on the uplink grant.

In an example embodiment, the first configuration parameters, received at 3810, may comprise: a first parameter indicating a first number of LBT failure instances; and a second parameter indicating a first value of an LBT failure detection timer. In an example embodiment, the wireless device may increment an LBT counter by one based on an LBT failure of an LBT procedure for an uplink transmission. In an example embodiment, triggering a consistent LBT failure may be based on the LBT counter reaching the first number. In an example embodiment, the wireless device may start the LBT failure detection timer, with the first value, based on the LBT failure.

In an example embodiment, the at least one of the scheduling request resource and the scheduling request configuration, at 3830, may indicate one or more third serving cells, comprising the third serving cell, without consistent uplink LBT failure.

In an example embodiment, the scheduling request resource via which the scheduling request is transmitted at 3830, may be on the third serving cell; and the third serving cell, for which the uplink grant is received at 3840, may be the same cell that the scheduling request is transmitted.

In an example embodiment, the scheduling request resource via which the scheduling request is transmitted at 3830, may be on a cell; and the third serving cell, for which the uplink grant is received at 3840, may be based on the cell that the scheduling request is transmitted.

In an example embodiment, the third serving cell, at 3830, may be a licensed cell.

In an example embodiment, the third serving cell, at 3830, may be a primary cell.

In an example embodiment, the LBT failure MAC CE, at 3850, may comprise a plurality of bits. Each bit, of the plurality of bits, may correspond to a serving cell. A first value of the bit may indicate consistent LBT failure for the corresponding serving cell.

In an example embodiment, the triggering the consistent LBT failures, at 3820, may be for active bandwidth parts of the one or more first serving cells.

In an example embodiment, the LBT failure MAC CE, at 3850, may be of one octet or four octets. A logical channel identifier (LCID) associated with the LBT failure MAC CE may be: a first LCID if the LBT failure MAC CE is of one octet; and a second LCID if the LBT failure MAC CE is of four octets.

Figure 39:
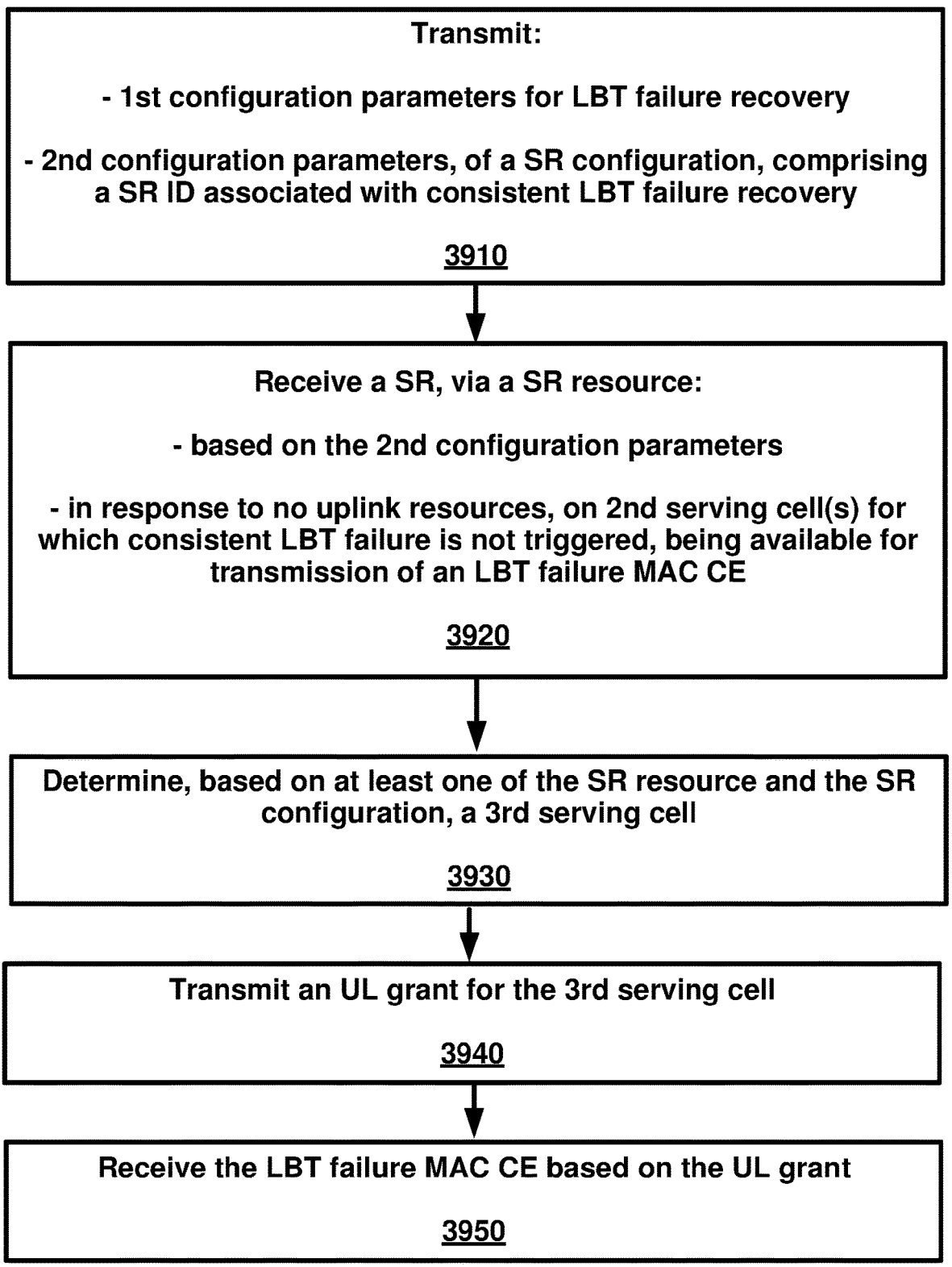
FIG. 39 shows an example flow diagram in accordance with several of various embodiments of the present disclosure.

FIG. 39 shows an example flow diagram in accordance with several of various embodiments of the present disclosure. At 3910, a base station may transmit first configuration parameters for listen-before-talk (LBT) failure recovery; and second configuration parameters, of a scheduling request configuration, comprising a scheduling request identifier associated with consistent LBT failure recovery. At 3920, the base station may receive a scheduling request, via a scheduling request resource: based on the second configuration parameters; and in response to no uplink resources, on one or more second serving cells for which consistent LBT failure is not triggered, being available for transmission of an LBT failure medium access control (MAC) control element (CE). At 3930, the base station may determine, based on at least one of the scheduling request resource and the scheduling request configuration, a third serving cell. At 3940, the base station may transmit an uplink grant for the third serving cell. At 3950, the base station may receive the LBT failure MAC CE based on the uplink grant.

In an example embodiment, the determining the third serving cell, at 3930, may comprise determining that the third serving cell is without consistent LBT failure.

In an example embodiment, the scheduling request resource, via which the scheduling request is received at 3920, may be on the third serving cell.

In an example embodiment, the scheduling request resource, via which the scheduling request is received at 3920, may be on on a cell. The third serving cell, for which the uplink grant is transmitted at 3940, may be based on the cell that the scheduling request is received at 3920.

In an example embodiment, the third serving cell, at 3930, may be a primary cell.

In an example embodiment, the third serving cell, at 3930, may be an unlicensed cell.

Figure 40:
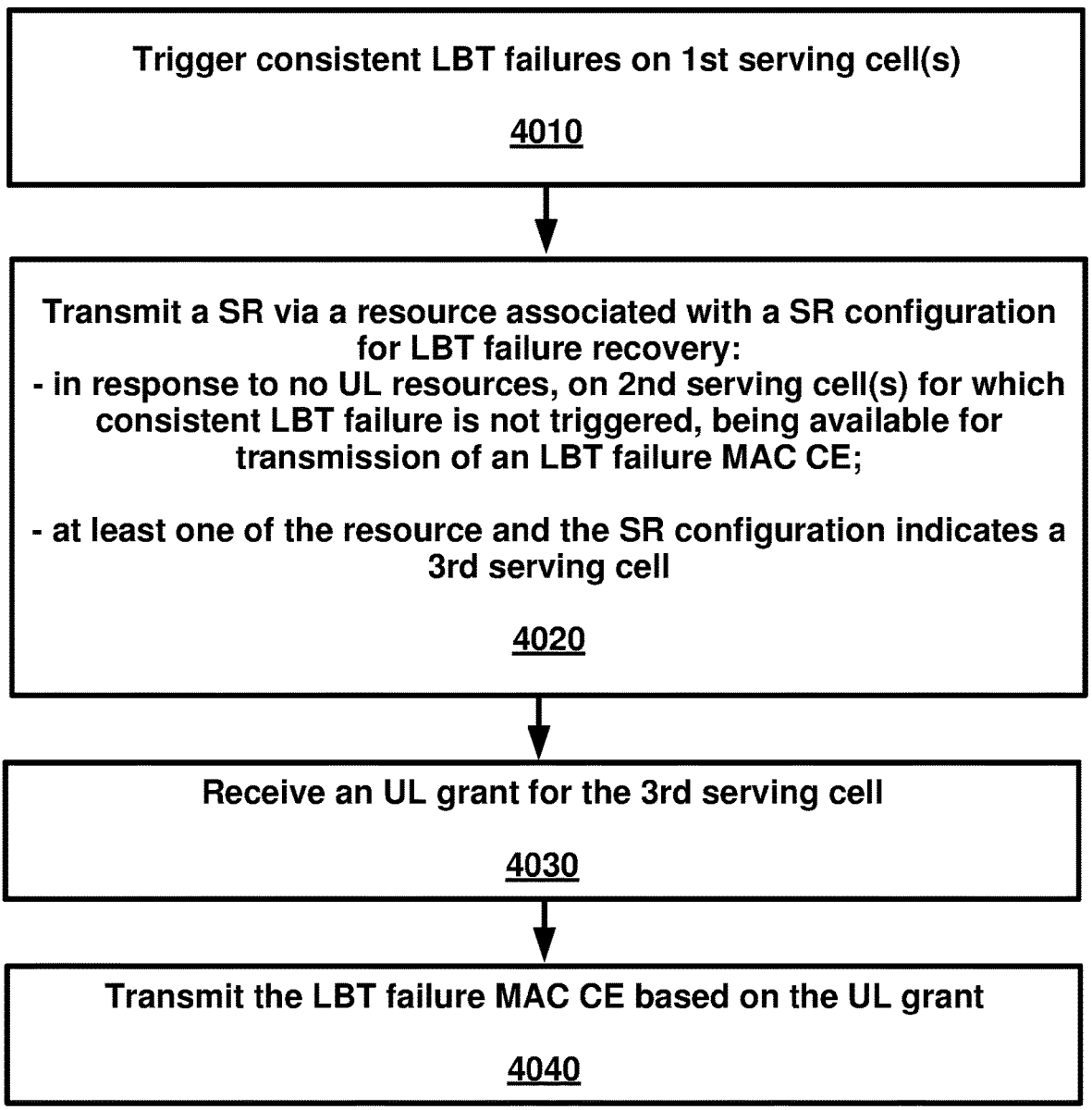
FIG. 40 shows an example flow diagram in accordance with several of various embodiments of the present disclosure.

FIG. 40 shows an example flow diagram in accordance with several of various embodiments of the present disclosure. At 4010, a wireless device may trigger consistent listen-before-talk (LBT) failures for one or more first serving cells. At 4020, the wireless device may transmit a scheduling request via a resource associated with a scheduling request configuration for LBT failure recovery: in response to no uplink resources, on one or more second serving cells for which consistent LBT failure is not triggered, being available for transmission of an LBT failure medium access control (MAC) control element (CE); and wherein at least one of the resource and the scheduling request configuration may indicate a third serving cell. At 4030, the wireless device may receive an uplink grant for the third serving cell. At 4040, the wireless device may transmit the LBT failure MAC CE based on the uplink grant.

Figure 41:
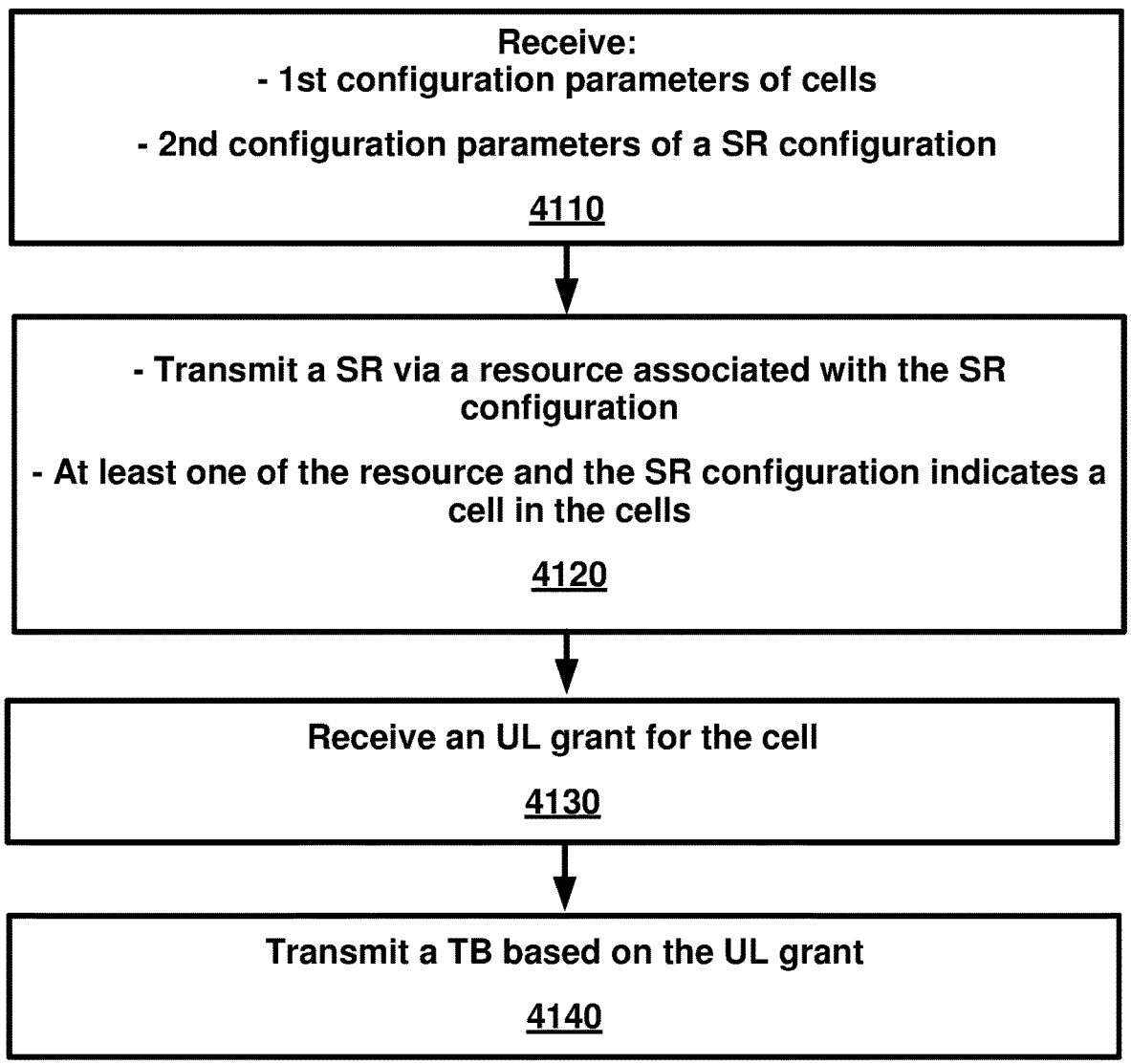
FIG. 41 shows an example flow diagram in accordance with several of various embodiments of the present disclosure.

FIG. 41 shows an example flow diagram in accordance with several of various embodiments of the present disclosure. At 4110, a wireless device may receive: first configuration parameters of a plurality of cells; and second configuration parameters of a scheduling request configuration. At 4120, the wireless device may transmit a scheduling request via a resource associated with the scheduling request configuration, wherein at least one of the resource and the scheduling request configuration indicates a cell in the plurality of cells. At 4130, the wireless device may receive an uplink grant for the cell. At 4140, the wireless device may transmit a transport block based on the uplink grant.

Figure 42:
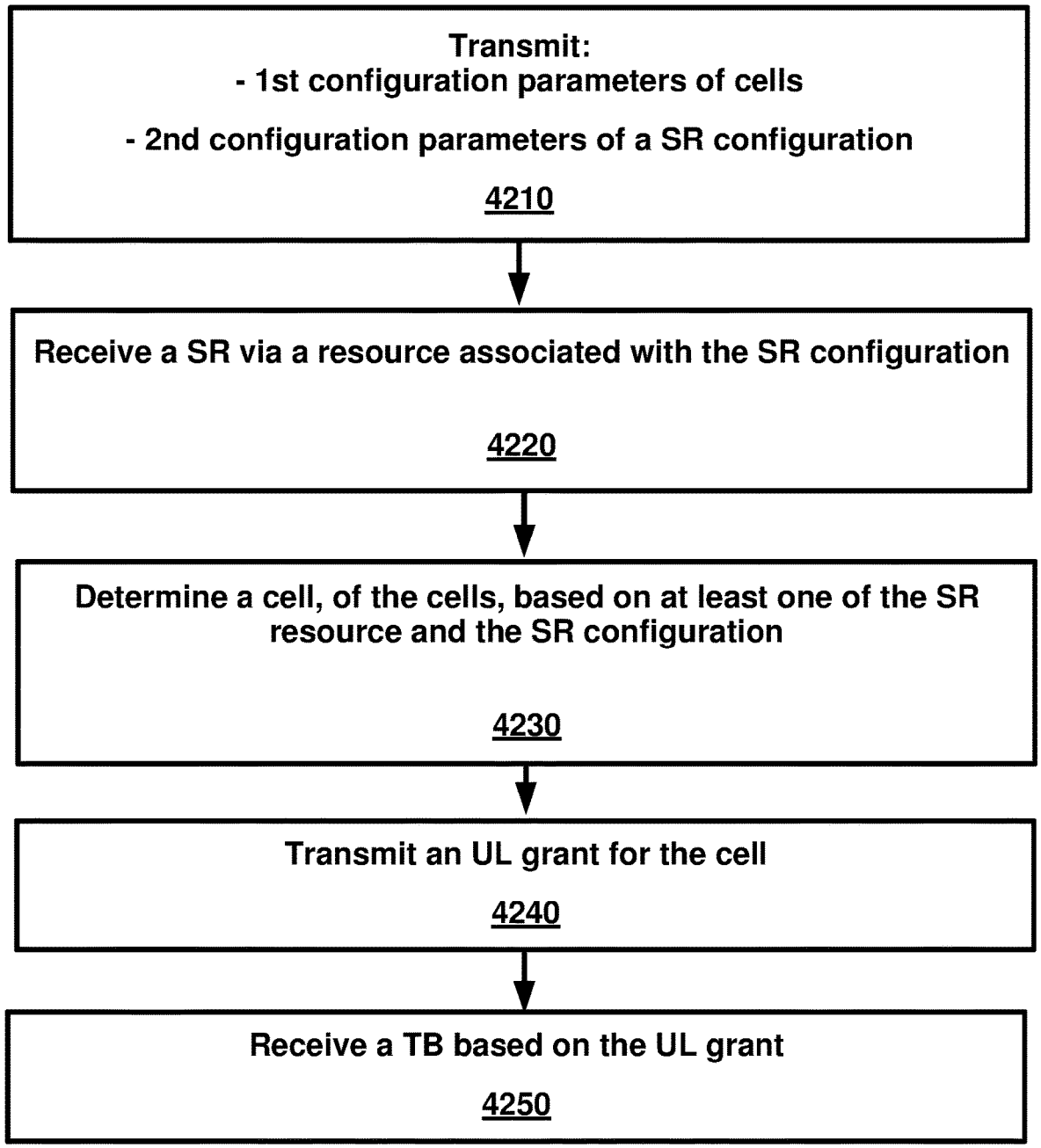
FIG. 42 shows an example flow diagram in accordance with several of various embodiments of the present disclosure.

FIG. 42 shows an example flow diagram in accordance with several of various embodiments of the present disclosure. At 4210, a base station may transmit: first configuration parameters of a plurality of cells; and second configuration parameters of a scheduling request configuration. At 4220, the base station may receive a scheduling request via a resource associated with the scheduling request configuration. At 4230, the base station may determine a cell, of the plurality of cells, based on at least one of the scheduling request resource and the scheduling request configuration. At 4240, the base station may transmit an uplink grant for the cell. At 4250, the base station may receive a transport block based on the uplink grant.

Figure 43:
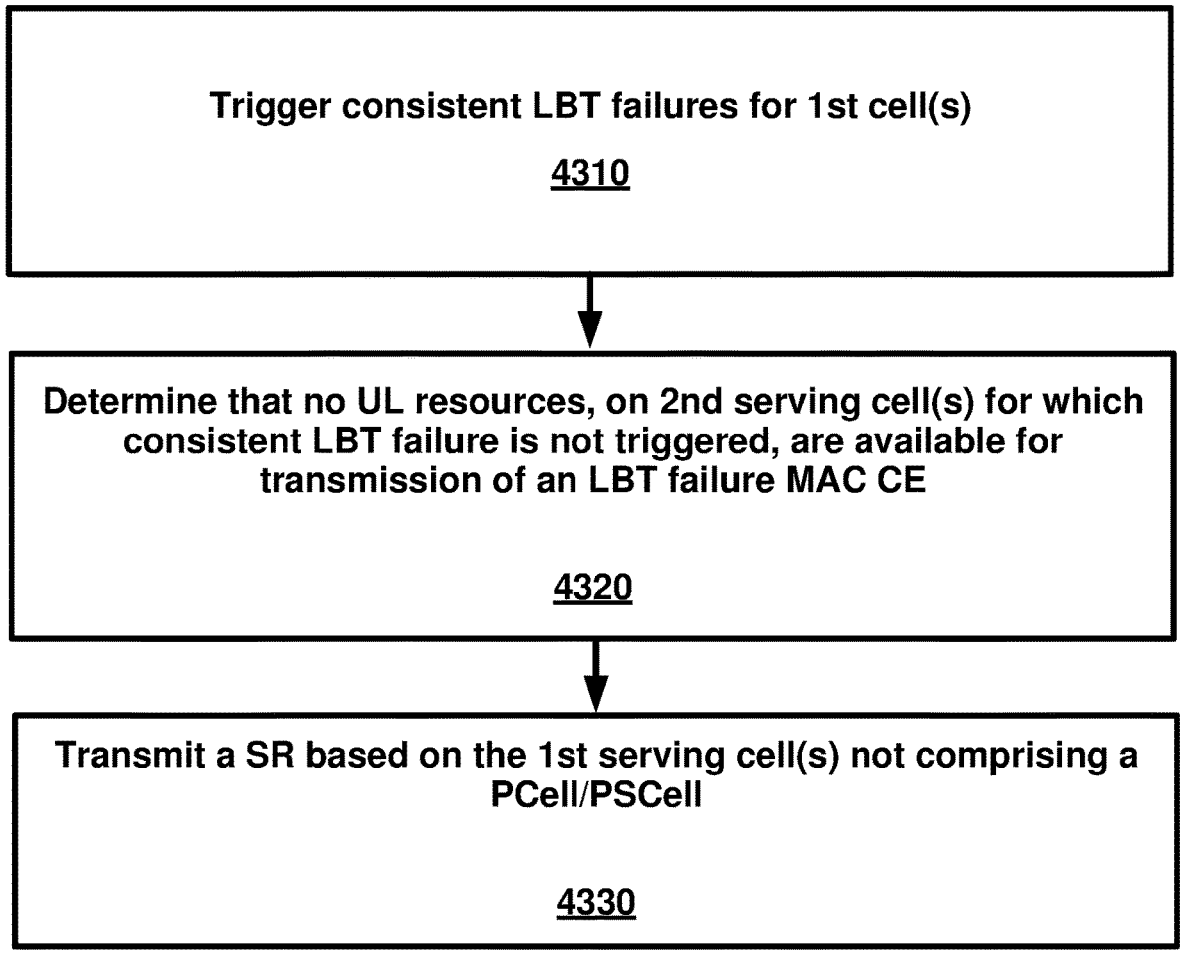
FIG. 43 shows an example flow diagram in accordance with several of various embodiments of the present disclosure.

FIG. 43 shows an example flow diagram in accordance with several of various embodiments of the present disclosure. At 4310, a wireless device may trigger consistent listen-before-talk (LBT) failures for one or more first serving cells. At 4320, the wireless device may determine that no uplink resources, on one or more second serving cells for which consistent LBT failure is not triggered, are available for transmission of an LBT failure medium access control (MAC) control element (CE). At 4330, the wireless device may transmit a scheduling request based on the one or more first serving cells not comprising a primary cell.

Figure 44:
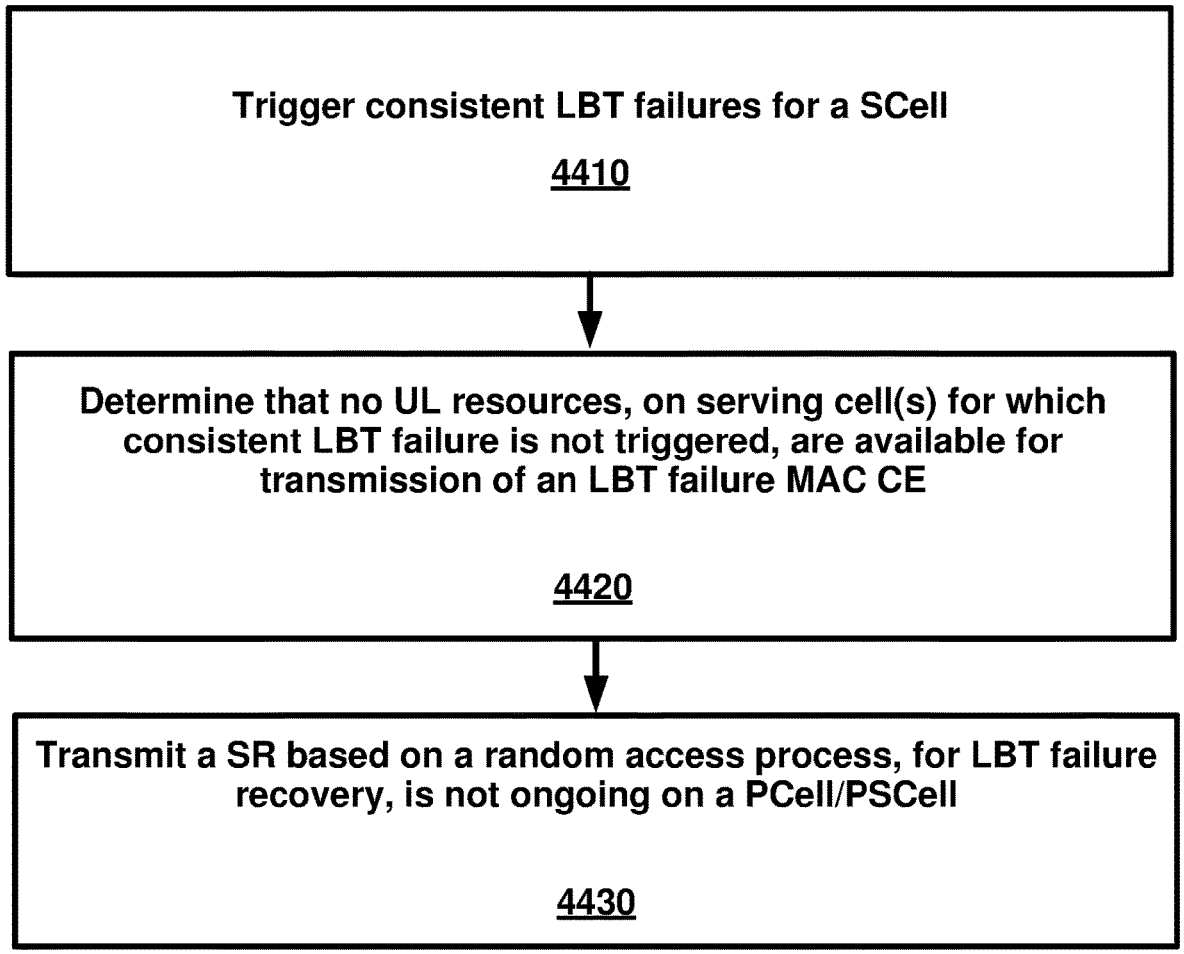
FIG. 44 shows an example flow diagram in accordance with several of various embodiments of the present disclosure.

FIG. 44 shows an example flow diagram in accordance with several of various embodiments of the present disclosure. At 4410, a wireless device may trigger consistent listen-before-talk (LBT) failure for a secondary cell. At 4420, the wireless device may determine that no uplink resources, on one or more serving cells for which consistent LBT failure is not triggered, are available for transmission of an LBT failure medium access control (MAC) control element (CE). At 4430, the wireless device may transmit a scheduling request based on a random access process, for LBT failure recovery, is not ongoing on a primary cell.

In an example embodiment, the random access process, at 4430, may be for LBT failure recovery based on consistent LBT failure on the primary cell.

In an example embodiment, the wireless device may receive configuration parameters of a scheduling request configuration for LBT failure recovery wherein the transmitting the scheduling request, at 4430, may be via a scheduling request resource associated with the scheduling request configuration.

In an example embodiment, the wireless device may receive an uplink grant. The wireless device may transmit the LBT failure MAC CE based on the uplink grant.

Figure 45:
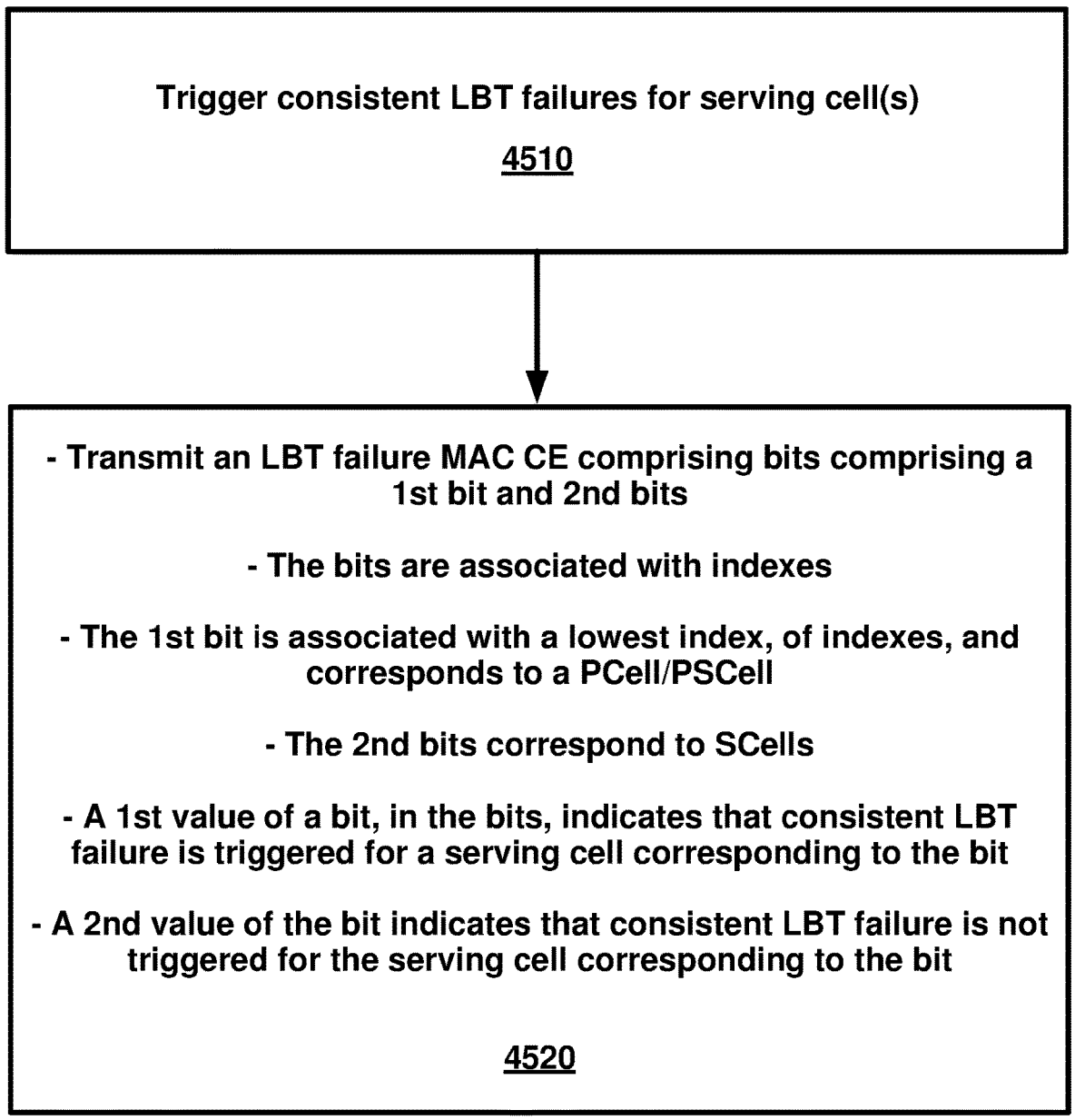
FIG. 45 shows an example flow diagram in accordance with several of various embodiments of the present disclosure.

FIG. 45 shows an example flow diagram in accordance with several of various embodiments of the present disclosure. At 4510, a wireless device may trigger consistent listen-before-talk (LBT) failure for one or more serving cells. At 4520, the wireless device may transmit an LBT failure medium access control (MAC) control element (CE) comprising a plurality of bits comprising a first bit and a second plurality of bits. The plurality of bits may be associated with a plurality of indexes. The first bit may be associated with a lowest index, in the plurality of indexes, and may correspond to a primary cell. The second plurality of bits may correspond to a plurality of secondary cells. A first value of a bit, in the plurality of bits, may indicate that consistent LBT failure is triggered for a serving cell corresponding to the bit. A second value of the bit may indicate that consistent LBT failure is not triggered for the serving cell corresponding to the bit.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, configuration parameters of:
   a plurality of cells; and
   a scheduling request (SR) configuration associated with recovery from consistent listen-before-talk (LBT) failure and for requesting resources:
   on one or more first cells of the plurality of cells; and
   excluding resources on other cells of the plurality of cells;
   in response to no resources, on one or more cells for which the consistent LBT failure is not triggered, being available for transmission of an LBT failure control element, transmitting a SR based on the SR configuration;
   receiving an uplink grant for a first cell of the one or more first cells;
   transmitting the LBT failure control element based on the uplink grant; and
   wherein:
   the LBT failure control element is of one octet or four octets; and
   a logical channel identifier (LCID) associated with the LBT failure control element is:
   a first LCID if the LBT failure control element is of one octet; and
   a second LCID if the LBT failure control element is of four octets.

2. The method of claim 1, wherein the one or more first cells comprise a licensed cell.

3. The method of claim 1, wherein the one or more first cells comprise a primary cell.

4. The method of claim 1, wherein the one or more first cells comprise a serving cell on which the SR is transmitted.

5. The method of claim 1, further comprising:
receiving second configuration parameters, for LBT failure recovery, comprising:
a first parameter indicating a first number of LBT failure instances; and
a second parameter indicating a first value of an LBT failure detection timer;
incrementing an LBT counter by one based on an LBT failure of an LBT procedure for an uplink transmission; and
starting the LBT failure detection timer, with the first value, based on the LBT failure.

6. The method of claim 5, further comprising triggering a consistent LBT failure based on the LBT counter reaching the first number.

7. A wireless device comprising:
one or more processors; and
memory storing instructions that, when executed by the one or more processors, cause the wireless device to:
receive configuration parameters of:
a plurality of cells; and
a scheduling request (SR) configuration associated with recovery from consistent listen-before-talk (LBT) failure and for requesting resources:
on one or more first cells of the plurality of cells; and
excluding resources on other cells of the plurality of cells;
in response to no resources, on one or more cells for which the consistent LBT failure is not triggered, being available for transmission of an LBT failure control element, transmit a SR based on the SR configuration;
receive an uplink grant for a first cell of the one or more first cells;
transmit the LBT failure control element based on the uplink grant; and
wherein:
the LBT failure control element is of one octet or four octets; and
a logical channel identifier (LCID) associated with the LBT failure control element is:
a first LCID if the LBT failure control element is of one octet; and
a second LCID if the LBT failure control element is of four octets.

8. The wireless device of claim 7, wherein the one or more first cells comprise a licensed cell.

9. The wireless device of claim 7, wherein the one or more first cells comprise a primary cell.

10. The wireless device of claim 7, wherein the one or more first cells comprise a serving cell on which the SR is transmitted.

11. The wireless device of claim 7, wherein the instructions, when executed by the one or more processors, further cause the wireless device to:
receive second configuration parameters, for LBT failure recovery, comprising:
a first parameter indicating a first number of LBT failure instances; and
a second parameter indicating a first value of an LBT failure detection timer;
increment an LBT counter by one based on an LBT failure of an LBT procedure for an uplink transmission; and
start the LBT failure detection timer, with the first value, based on the LBT failure.

12. The wireless device of claim 11, wherein the instructions, when executed by the one or more processors, further cause the wireless device to trigger a consistent LBT failure based on the LBT counter reaching the first number.

13. A system comprising:
a base station; and
a wireless device comprising: one or more processors; and memory storing instructions that, when executed by the one or more processors, cause the wireless device to:
receive, from the base station, configuration parameters of: a plurality of cells; and a scheduling request (SR) configuration associated with recovery from consistent listen-before-talk (LBT) failure and for requesting resources: on one or more first cells of the plurality of cells; and excluding resources on other cells of the plurality of cells; in response to no resources, on one or more cells for which the consistent LBT failure is not triggered, being available for transmission of an LBT failure control element, transmit a SR based on the SR configuration; receive an uplink grant for a first cell of the one or more first cells; transmit the LBT failure control element based on the uplink grant; and wherein: the LBT failure control element is of one octet or four octets; and a logical channel identifier (LCID) associated with the LBT failure control element is: a first LCID if the LBT failure control element is of one octet; and a second LCID if the LBT failure control element is of four octets.

14. The system of claim 13, wherein the one or more first cells comprise a licensed cell.

15. The system of claim 13, wherein the one or more first cells comprise a primary cell.

16. The system of claim 13, wherein the one or more first cells comprise a serving cell on which the SR is transmitted.

17. The system of claim 13, wherein the instructions, when executed by the one or more processors, further cause the wireless device to:
receive second configuration parameters, for LBT failure recovery, comprising:
a first parameter indicating a first number of LBT failure instances; and
a second parameter indicating a first value of an LBT failure detection timer;
increment an LBT counter by one based on an LBT failure of an LBT procedure for an uplink transmission; and
start the LBT failure detection timer, with the first value, based on the LBT failure.

18. The system of claim 17, wherein the instructions, when executed by the one or more processors, further cause the wireless device to trigger a consistent LBT failure based on the LBT counter reaching the first number.

* * * * *